(12) United States Patent
Fujioka

(10) Patent No.: US 7,624,644 B2
(45) Date of Patent: Dec. 1, 2009

(54) SEMICONDUCTOR PRESSURE SENSOR AND METHOD FOR MANUFACTURING SEMICONDUCTOR PRESSURE SENSOR

(75) Inventor: Yasuhide Fujioka, Tama-Shi (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 0 days.

(21) Appl. No.: 12/196,367

(22) Filed: Aug. 22, 2008

(65) Prior Publication Data
US 2009/0056463 A1 Mar. 5, 2009

(30) Foreign Application Priority Data
Aug. 27, 2007 (JP) ............... 2007-219997

(51) Int. Cl.
*G01L 9/02* (2006.01)
(52) U.S. Cl. ............... 73/725; 73/753; 73/754; 257/414; 438/50
(58) Field of Classification Search .......... None
See application file for complete search history.

(56) References Cited

U.S. PATENT DOCUMENTS

| | | | | |
|---|---|---|---|---|
| 4,314,226 A | * | 2/1982 | Oguro et al. ............... | 338/4 |
| 5,335,550 A | * | 8/1994 | Satou ............... | 73/727 |
| 5,932,809 A | * | 8/1999 | Sparks et al. ............... | 73/727 |
| 6,876,048 B2 | * | 4/2005 | Fischer et al. ............... | 257/417 |
| 7,404,247 B2 | * | 7/2008 | Eriksen et al. ............... | 29/595 |
| 7,540,198 B2 | * | 6/2009 | Ichikawa ............... | 73/754 |

FOREIGN PATENT DOCUMENTS

| | | | |
|---|---|---|---|
| JP | 62124778 A | * | 6/1987 |
| JP | 06-140640 | | 5/1994 |

* cited by examiner

*Primary Examiner*—Andre J Allen
*Assistant Examiner*—Jermaine Jenkins
(74) *Attorney, Agent, or Firm*—IPUSA, PLLC

(57) ABSTRACT

A semiconductor pressure sensor includes a diaphragm; a resistor provided on a top surface of the diaphragm; an insulating film formed on the diaphragm and the resistor having a penetrating part exposing a top surface of the resistor; and a wiring pattern formed from the top surface of the resistor exposed by the penetrating part to a top surface of the insulating film; wherein a distance between a first crossing part where a plane orthogonal to the top surface of the diaphragm meets a top end of a side plane of the penetrating part and a second crossing part where the plane orthogonal to the top surface of the diaphragm meets a bottom of the side plane of the penetrating part is equal or greater than a thickness of the insulating film by a factor of a square root of two.

9 Claims, 44 Drawing Sheets

SEMICONDUCTOR PRESSURE SENSOR AND METHOD FOR MANUFACTURING SEMICONDUCTOR PRESSURE SENSOR

BACKGROUND OF THE INVENTION

1. Field of the Invention

The present invention is related to a semiconductor pressure sensor including a wiring pattern formed to contact a part of a resistor provided on a diaphragm exposed at a penetrating hole and the wiring pattern is formed on an insulating film and the diaphragm, and a method for manufacturing the semiconductor pressure sensor.

The present invention may apply to a semiconductor pressure sensor including a wiring pattern formed on part of a resistor provided on a diaphragm exposed at a penetrating hole and the wiring pattern is formed on an insulating film and the diaphragm, and a method for manufacturing the semiconductor pressure sensor.

2. Description of the Related Art

FIG. 1 shows a cross-sectional view of a related art semiconductor pressure sensor, and FIG. 2 is a plan view of the semiconductor pressure sensor indicated in FIG. 1.

Referring to FIG. 1 and FIG. 2, a related art semiconductor pressure sensor 100 includes a diaphragm 101, a diaphragm support part 102, first resistors 104 and 105, second resistors 106 and 107, an insulating film 109, wiring patterns 111 through 114, and a protective film 120.

The diaphragm 101 has a plate shape for being flexible when external pressure is applied. The diaphragm support part 102 has a frame shape provided at peripheral parts of the diaphragm 101. The diaphragm support part 102 is thicker than the diaphragm 101. The diaphragm support part 102 supports the diaphragm 101. For examples a semiconductor substrate may be used as a base material of the diaphragm 101 and the diaphragm support part 102.

The first and second resistors 104 through 107 are formed on a top surface 101A of the diaphragm 101. The first resistors 104 and 105 are base resistors and arranged approximately at the center of the diaphragm 101. The second resistors 106 and 107 are arranged at peripheral parts of the diaphragm 101.

The insulating film 109 is formed to cover the top surface 101A of the diaphragm 101, a top surface 102A of the diaphragm support part 102, and part of the top surface of the first and second resistors 104 through 107. The insulating film 109 includes penetrating parts 116-1, 116-2, 117-1, 117-2, 118-1, 118-2, 119-1 and 119-2. The penetrating parts 116-1 and 116-2 are formed to expose the top surface of the first resistor 104. The penetrating parts 117-1 and 117-2 are formed to expose the top surface of the first resistor 105. The penetrating parts 118-1 and 118-2 are formed to expose the top surface of the second resistor 106. The penetrating parts 119-1 and 119-2 are formed to expose the top surface of the second resistor 107. The penetrating parts 116-1, 116-2, 117-1, 117-2, 118-1, 118-2, 119-1, and 119-2 are formed by isotropic etching of the insulating film 109.

The wiring pattern 111 is formed at bottom parts of the penetrating parts 116-1 and 118-1, side parts 116-1A and 118-1A of the penetrating parts 116-1 and 118-1, and on the top part 109A of the insulating film 109. Thereby, the wiring pattern 111 electrically connects the part of the first resistor 104 exposed by the penetrating part 116-1 and the part of the second resistor 106 exposed by the penetrating part 118-1. The wiring pattern 111 is electrically connected to a ground terminal (not shown).

The wiring pattern 112 is formed at bottom parts of the penetrating parts 117-1 and 118-2, side parts 117-1A and 118-2A of the penetrating parts 117-1 and 118-2, and on the top part 109A of the insulating film 109. Thereby, the wiring pattern 112 electrically connects the part of the first resistor 105 exposed by the penetrating part 117-1 and the part of the second resistor 106 exposed by the penetrating part 118-2. The wiring pattern 112 is electrically connected to a first output terminal (not shown).

The wiring pattern 113 is formed at bottom parts of the penetrating parts 116-2 and 119-2, side parts 116-1A and 118-2A of the penetrating parts 116-2 and 119-2, and on the top part 109A of the insulating film 109. Thereby, the wiring pattern 113 electrically connects the part of the first resistor 104 exposed by the penetrating part 116-2 and the part of the second resistor 107 exposed by the penetrating part 119-2. The wiring pattern 113 is electrically connected to a second output terminal (not shown).

The wiring pattern 114 is formed at bottom parts of the penetrating parts 117-2 and 119-1, side parts 117-2A and 119-1A of the penetrating parts 117-2 and 119-1, and on the top part 109A of the insulating film 109. Thereby, the wiring pattern 114 electrically connects the part of the first resistor 105 exposed by the penetrating part 117-2 and the part of the second resistor 107 exposed by the penetrating part 119-1. The wiring pattern 114 is electrically connected to a power source terminal (not shown).

FIG. 3 through FIG. 8 show a fabrication process of a related art semiconductor pressure sensor. For the parts of the semiconductor pressure sensor 100 indicated in FIG. 1 and FIG. 2, the same reference symbols are used for the identical parts in FIG. 3 through FIG. 8. Further, in FIG. 3 through FIG. 8, the first resistor 105 and the penetrating parts 117-2 and 117-2 are omitted.

The method for fabricating a related art semiconductor pressure sensor 100 will be described by referring FIG. 3 through FIG. 8. In FIG. 3, at first, first resistors and second resistors 104 through 107 are formed on a top surface 125A of a semiconductor substrate 125, which is a base material of a diaphragm 101 and a diaphragm support part 102, followed by forming an insulating film 109 for covering the top surface 125A of the semiconductor substrate 125 and the first and second resistors 104 through 107.

Next, in FIG. 4, a resist film 126 having opening parts 126A and 126B is formed on the insulating film 109. The opening parts 126A are formed to expose the top part 109A of the insulating film 109 corresponding to positions where penetrating parts 116-1, 117-1, 118-1 and 119-1 are to be formed.

In the process of FIG. 5, parts of the insulating film 109 exposed through the openings 126A and 126B of the resist film 126 are etched by wet etching to form penetrating parts 116-1, 116-2, 117-1, 117-2, 118-1, 118-2, 119-1 and 119-2. The penetrating parts 116-1, 116-2, 117-1, 117-2, 118-1, 118-2, 119-1 and 119-2 formed in this manner have circular arc shapes. Thereby, the angles formed by the bottom plane 109B of the insulating film 109 and the side planes 116-1A, 116-2A, 117-1A, 117-2A, 118-1A, 118-2A, 119-1A and 119-2A of the penetrating parts 116-1, 116-2, 117-1, 117-2, 119-1, 118-2, 119-1 and 119-2 approach being approximately right angles when seen from the bottom plane 109B toward the top plane 109A of the insulating film 109.

At the process in FIG. 6, the resist film 126 of FIG. 5 is removed. In FIG. 7, a metallic film (e.g. an Al film) is deposited by a sputtering method to cover the top part of the structure indicated in FIG. 6, and patterning of the metallic film is performed by etching to form the wiring patterns 111 through 114.

Successively, in the process of FIG. 8, the semiconductor substrate 125 is etched from the backside 125B of the semiconductor substrate 125 for forming a diaphragm 101 and a diaphragm support part 102. Thereby, a semiconductor pressure sensor 100 is fabricated (for example, Japanese Patent Application Publication H06-140640).

The penetrating parts 116-1, 116-2, 117-1, 117-2, 118-1, 118-2, 119-1, and 119-2 of the related art semiconductor pressure sensor 100 exhibit shapes such that, when moving from the bottom part 109B of the insulating film 109 toward the top part 109A of the insulating film 109, angles formed by the bottom part 109B of the insulating film 109 and the side planes 116-1A, 116-2A, 117-1A, 117-2A, 118-1A, 118-2A, 119-1A, 119-2A of the penetrating parts 116-1, 116-2, 117-1, 117-2, 118-1, 118-2, 119-1, and 119-2 approach being right angles.

Thereby, it is difficult to form sufficiently thick metallic films over the side planes 116-1A, 116-2A, 117-1A, 117-2A, 118-1A, 118-2A, 119-1A, and 119-2A of the penetrating parts 116-1, 116-2, 117-1, 117-2, 118-1, 118-2, 119-1, and 119-2 located near the top surface 109A of the insulating film 109, so that there is a problem that the wiring patterns 111 through 114 formed on the side planes 116-1A, 116-2A, 117-1A, 117-2A, 118-1A, 118-2A, 119-1A, and 119-2A of the penetrating parts 116-1, 116-2, 117-1, 117-2, 118-1, 118-2, 119-1, and 119-2 located near the top surface 109A of the insulating film 109 are easily broken.

Therefore the present invention takes into account the issue above and may prevent breaking wiring patterns formed on the side planes of the penetrating part, and may provide a semiconductor pressure sensor and a method for fabricating the semiconductor pressure sensor.

SUMMARY OF THE INVENTION

According to one of aspect of the present embodiment of the invention, a semiconductor pressure sensor includes a diaphragm; a resistor provided on a top surface of the diaphragm; an insulating film formed on the diaphragm and the resistor having a penetrating part exposing a top surface of the resistor; and a wiring pattern formed from the top surface of the resistor exposed by the penetrating part to a top surface of the insulating film; wherein a distance between a first crossing part where a plane orthogonal to the top surface of the diaphragm meets a top end of a side plane of the penetrating part and a second crossing part where the plane orthogonal to the top surface of the diaphragm meets a bottom of the side plane of the penetrating part is equal or greater than a thickness of the insulating film by a factor of a square root of two.

According to another aspect of the present embodiment related to the inventions a semiconductor pressure sensor includes a diaphragm; a resistor provided on a top surface of the diaphragm; an insulating film formed on the diaphragm and the resistor having a penetrating part exposing a top surface of the resistor; and a wiring pattern formed from the top surface of the resistor exposed by the penetrating part to a top surface of the insulating film; wherein the wiring pattern is formed on the top surface of the resistor and a part of the side plane of the penetrating part from which the wiring pattern is extended to a pull-out direction, and a distance at the part of the side plane of the penetrating part between a first crossing part where a plane orthogonal to the top surface of the diaphragm meets a top end of the side plane of the penetrating part and a second crossing part where the plane orthogonal to the top surface of the diaphragm meets a bottom of the side plane of the penetrating part is equal or greater than a thickness of the insulating film by a factor of a square root of two.

According to another aspect of the present embodiment related to the invention, a semiconductor pressure sensor manufacturing method includes the steps of: (a) providing a diaphragm and a resistor formed on a top of the diaphragm and a wiring pattern electrically connected to the resistor; (b) forming the resistor on a top side of a semiconductor substrate to be used for the diaphragm; (c) forming an insulating film to cover the resistor and the top of the semiconductor substrate; (d) doping an impurity into the insulating film from a top side of the insulating film to form an impurity doped insulating film formed of the insulating film and the impurity; (e) forming a resist film having an opening to expose a top surface of the impurity doped insulating film and the opening is positioned to correspond to a formation region of a penetrating part; (f) etching the impurity doped insulating film by a wet etching process using the resist film as a mask until the resistor is exposed to form the penetrating part; (g) forming a metallic film to cover a part of the impurity doped insulating film and the resistor exposed by the penetrating part and the top surface of the impurity doped insulating film, after removing the resist film; and (h) patterning the metallic film to form the wiring pattern.

Further, the referenced reference symbols are used for convenience, and this invention is not limited to the above embodiment.

According to this invention, the wiring patterns formed at side parts of the penetrating parts may be prevented from forming discontinuities.

DETAILED DESCRIPTION OF THE PREFERRED EMBODIMENTS

Embodiments of the present invention will be described in the following with reference to figures.

First Embodiments

Figure 1:
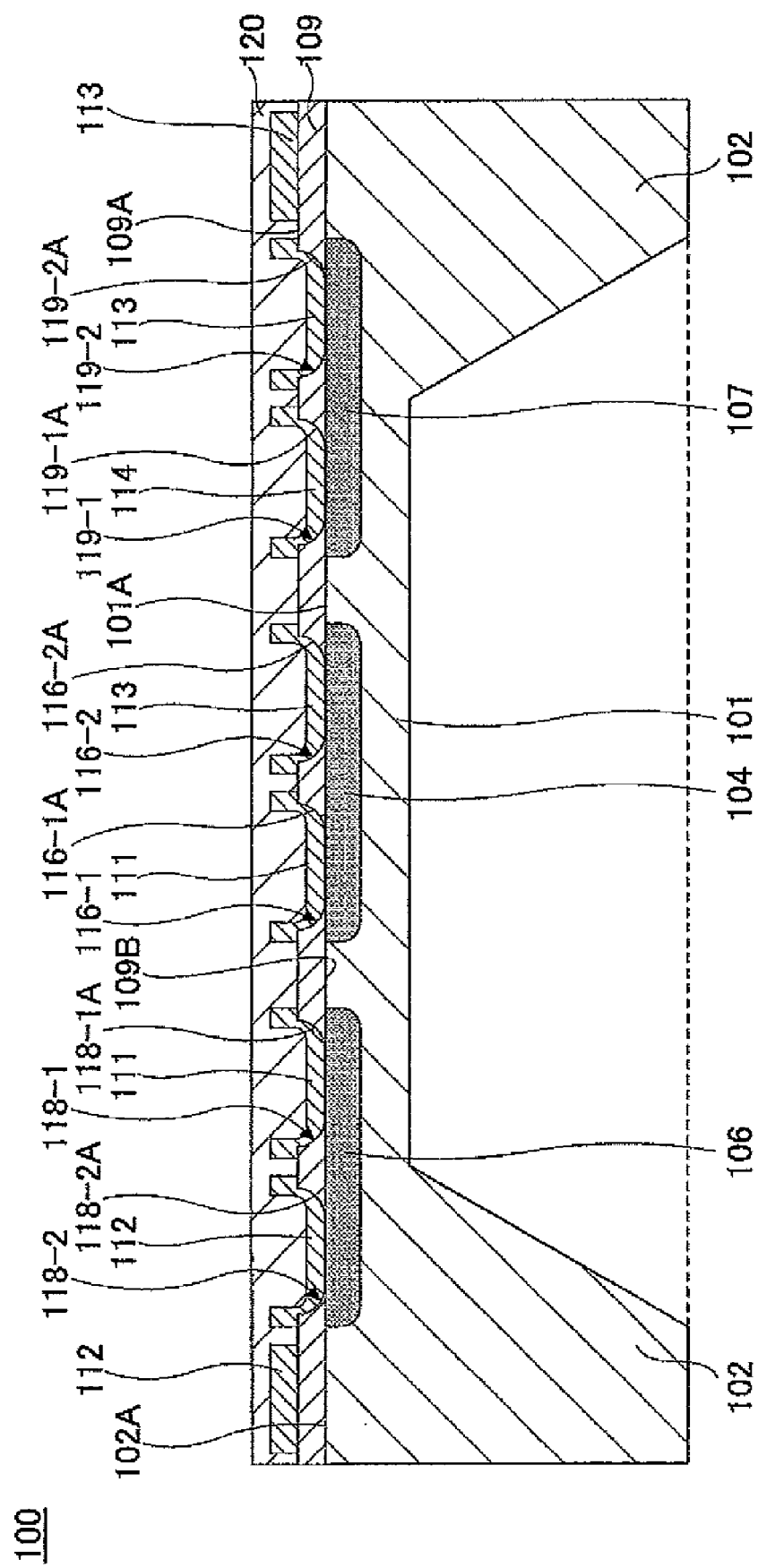
FIG. 1 is an illustration showing a cross section of a related art semiconductor pressure sensor.
Figure 2:
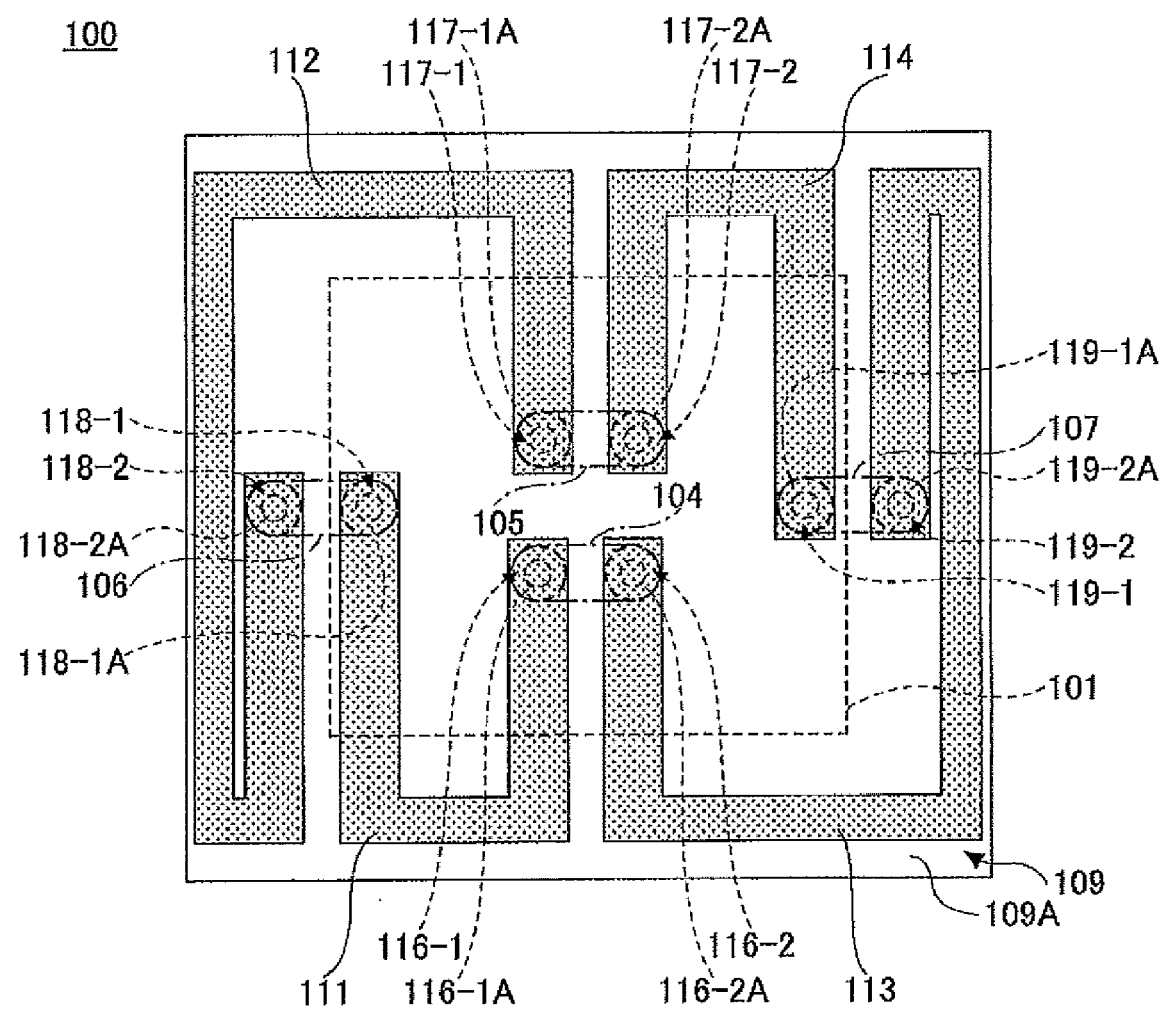
FIG. 2 shows a plan view of the semiconductor pressure sensor indicated in FIG. 1.
Figure 3:
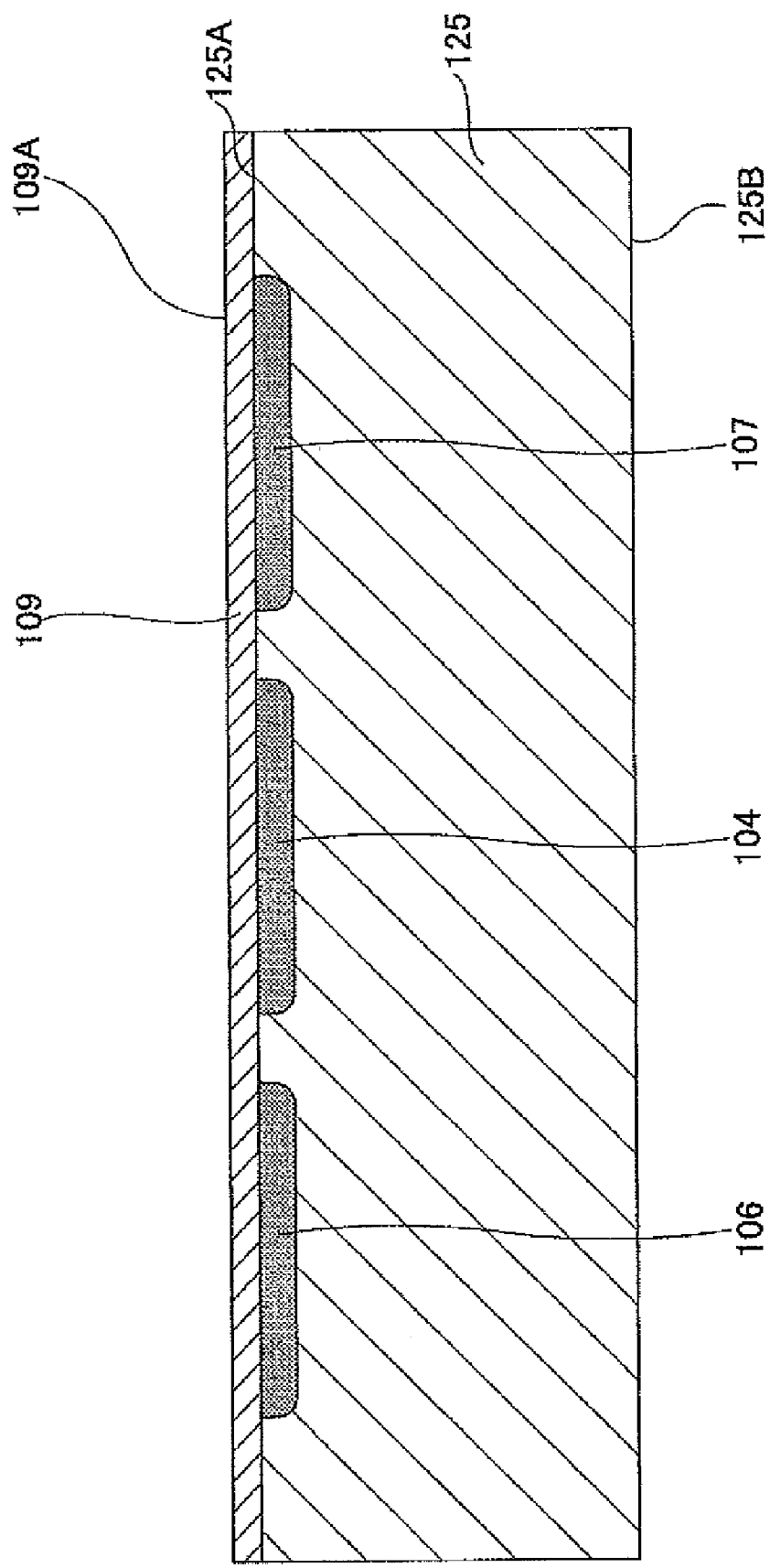
FIG. 3 is an illustration (example 1) showing a fabrication process of the related art semiconductor pressure sensor.
Figure 4:
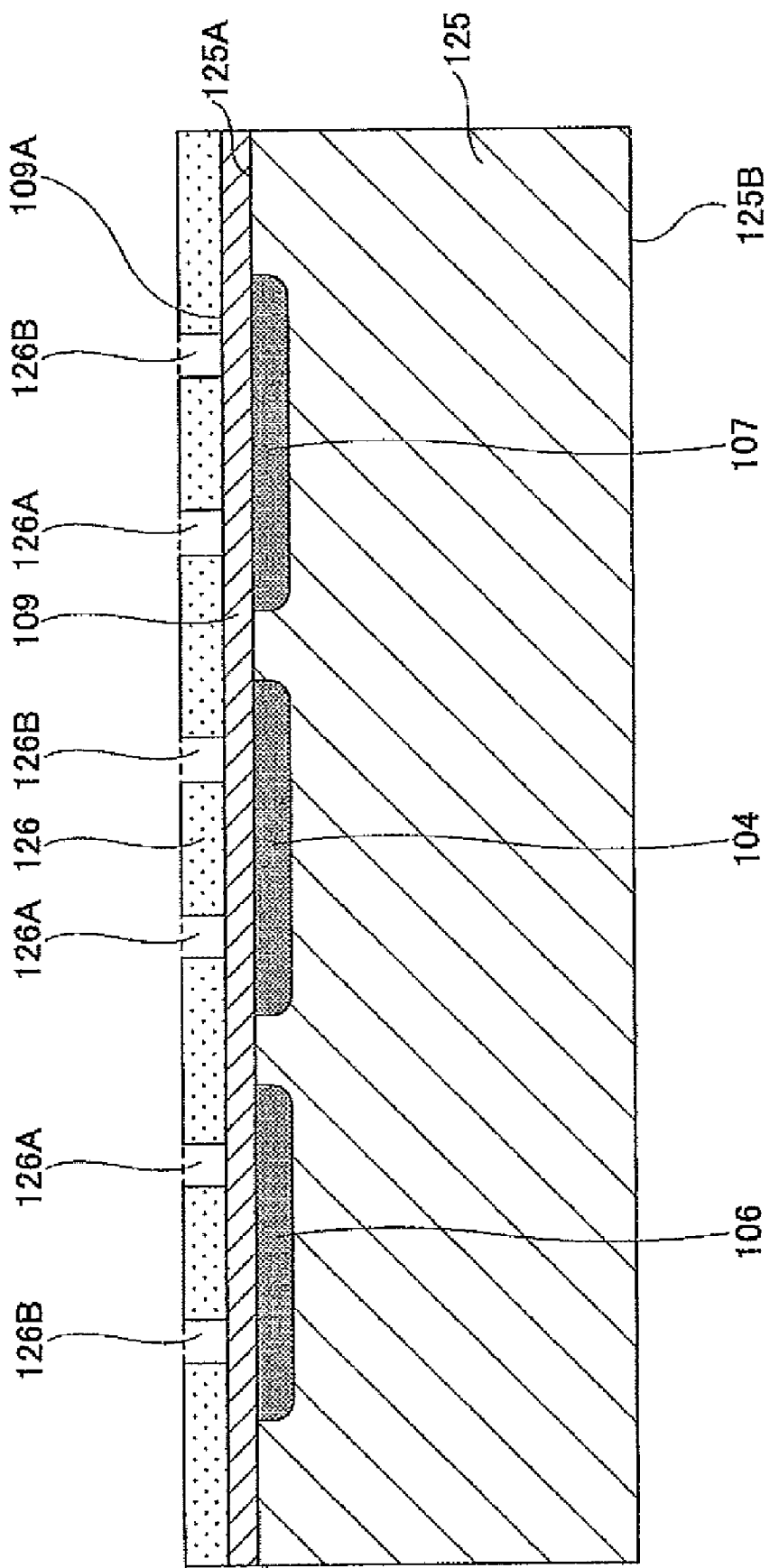
FIG. 4 is an illustration (example 2) showing a fabrication process of the related art semiconductor pressure sensor.
Figure 5:
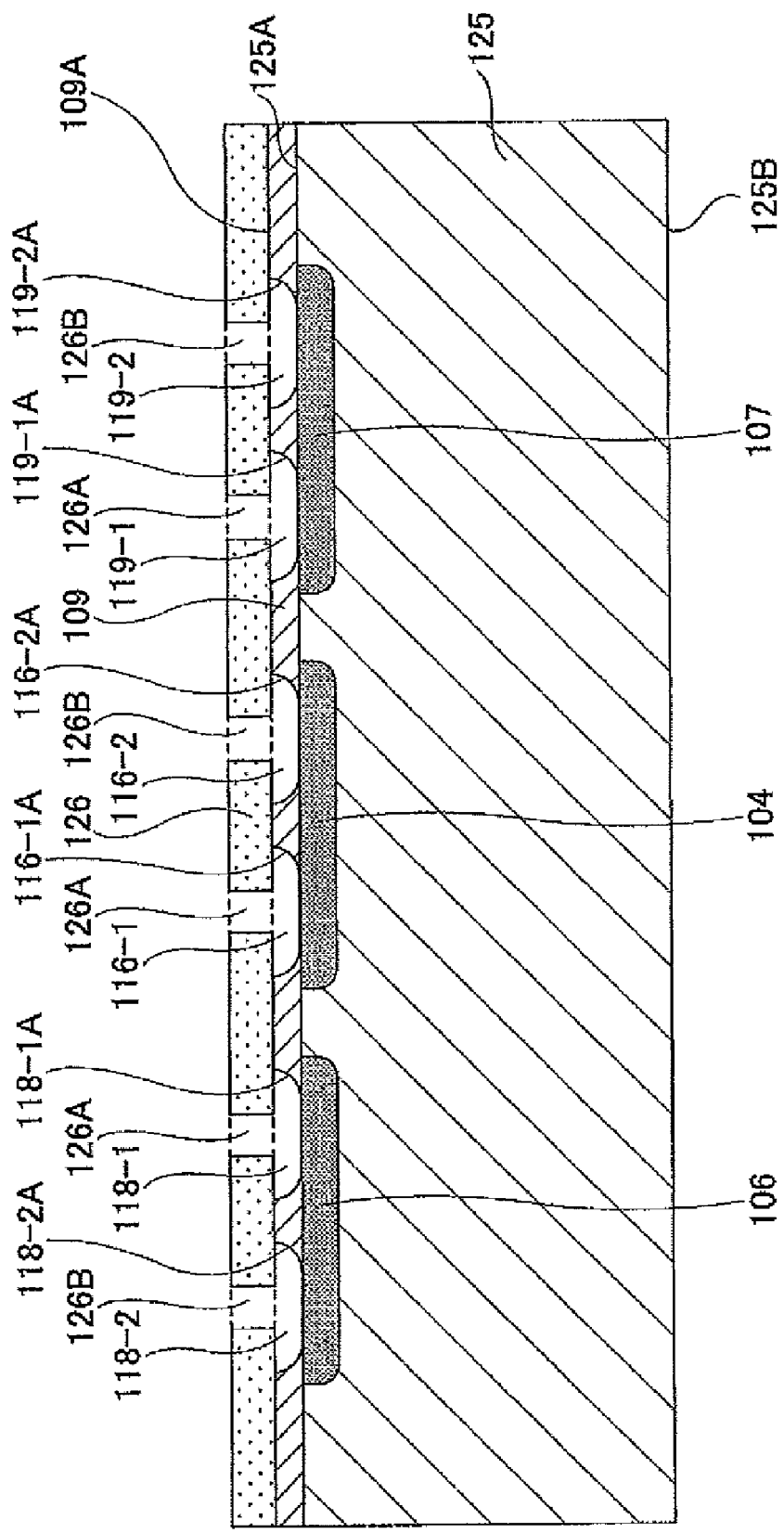
FIG. 5 is an illustration (example 3) showing a fabrication process of the related art semiconductor pressure sensor.
Figure 6:
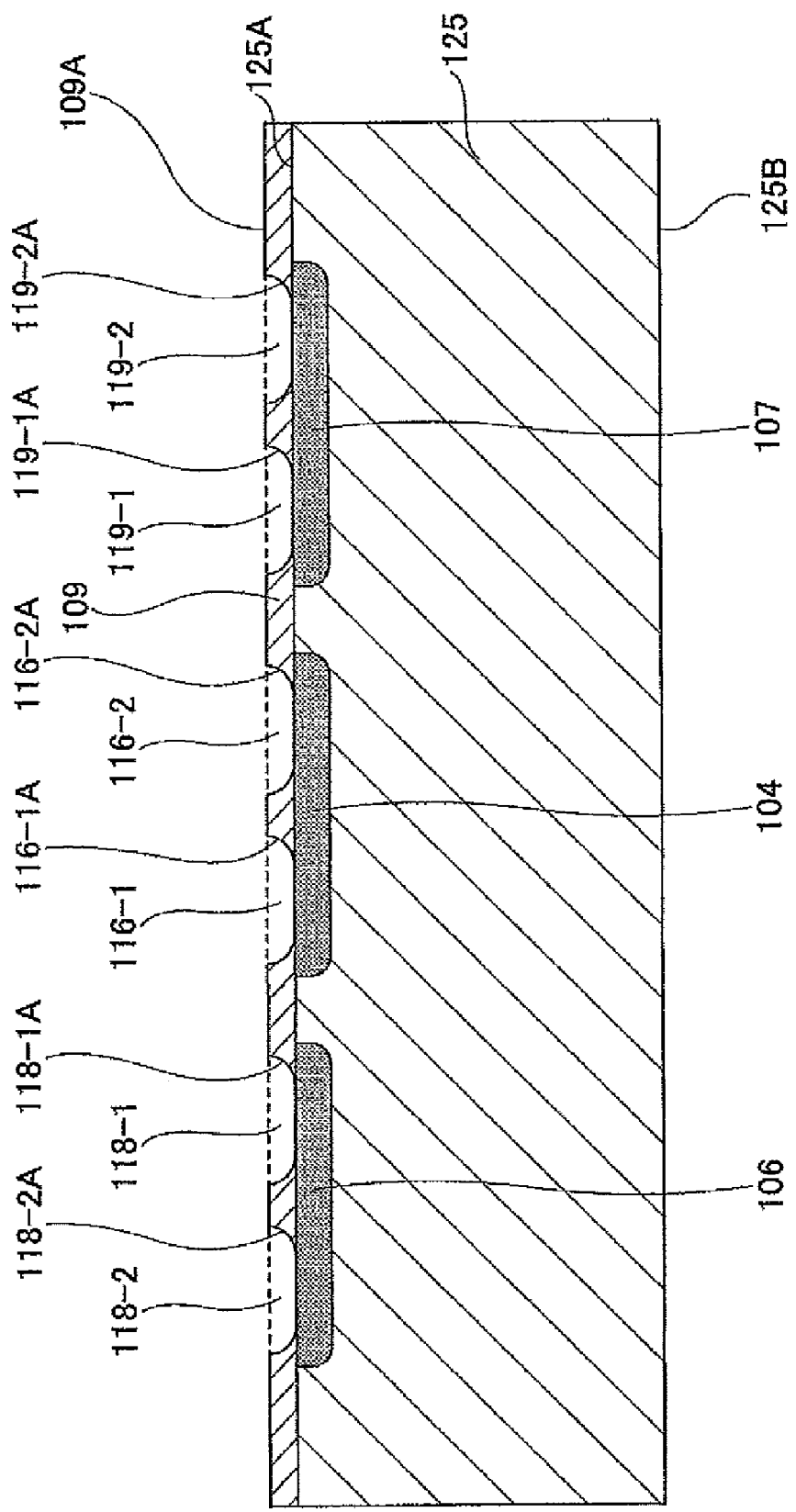
FIG. 6 is an illustration (example 4) showing a fabrication process of the related art semiconductor pressure sensor.
Figure 7:
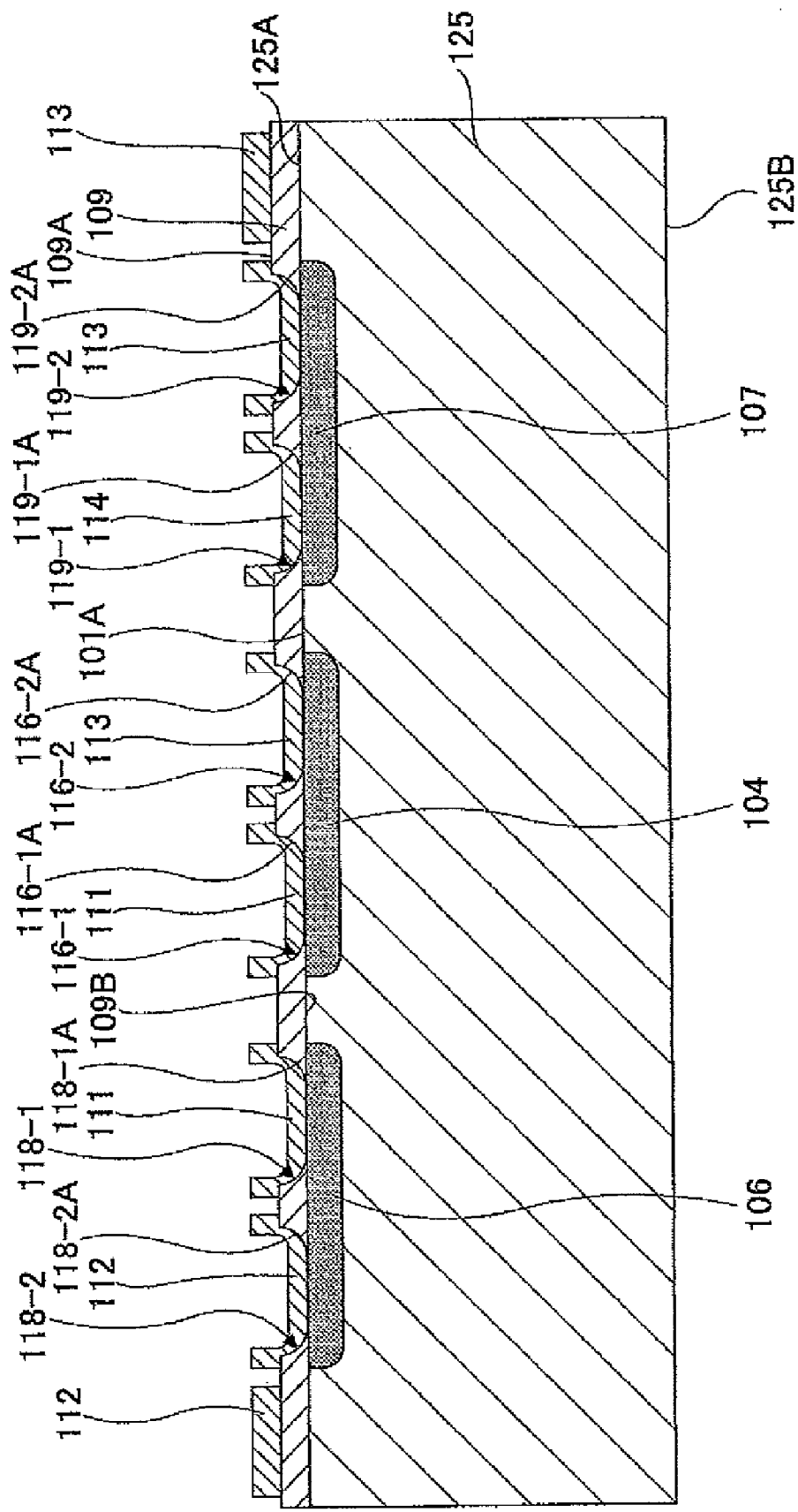
FIG. 7 is an illustration (example 5) showing a fabrication process of the related art semiconductor pressure sensor.
Figure 8:
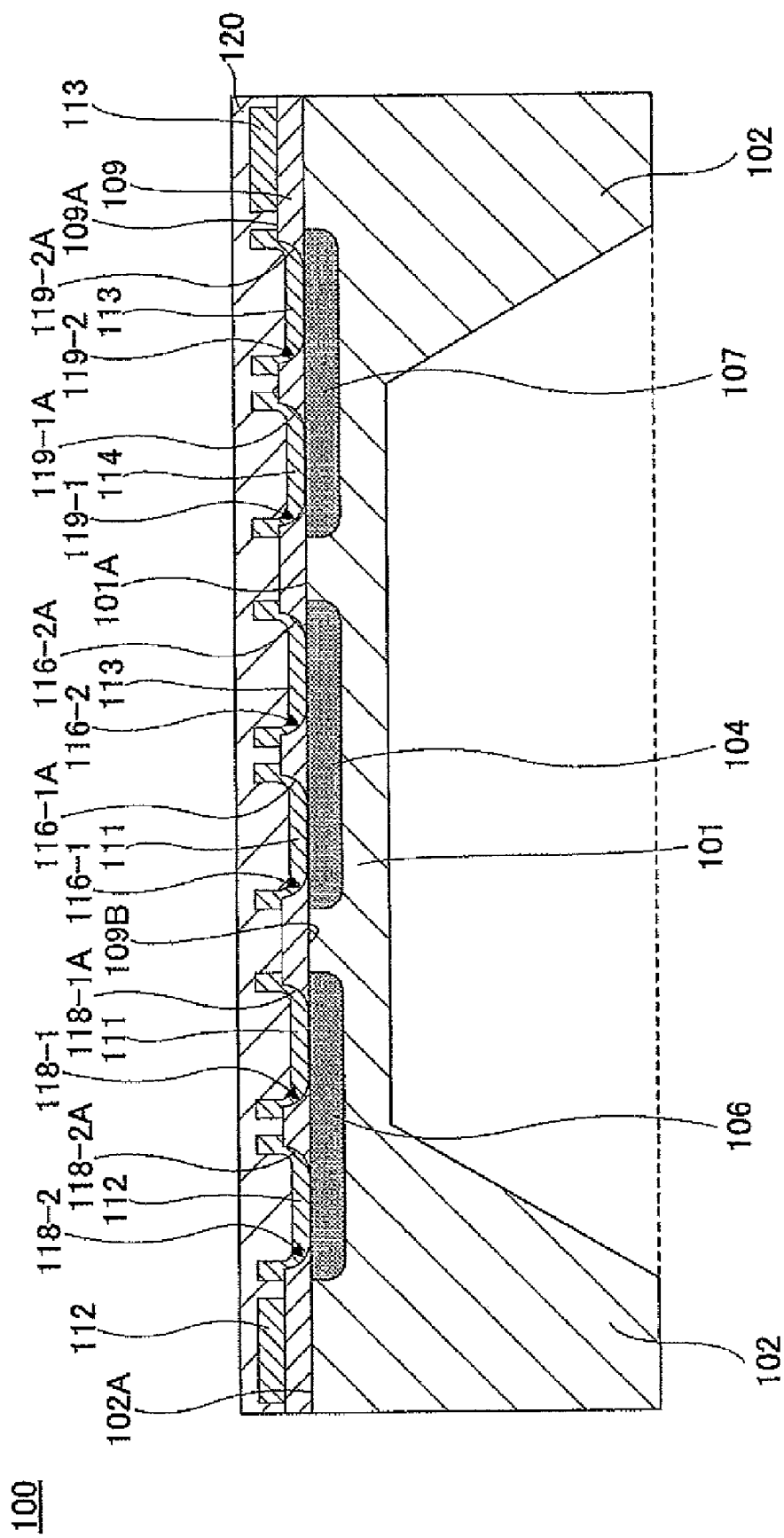
FIG. 8 is an illustration (example 6) showing a fabrication process of the related art semiconductor pressure sensor.
Figure 9:
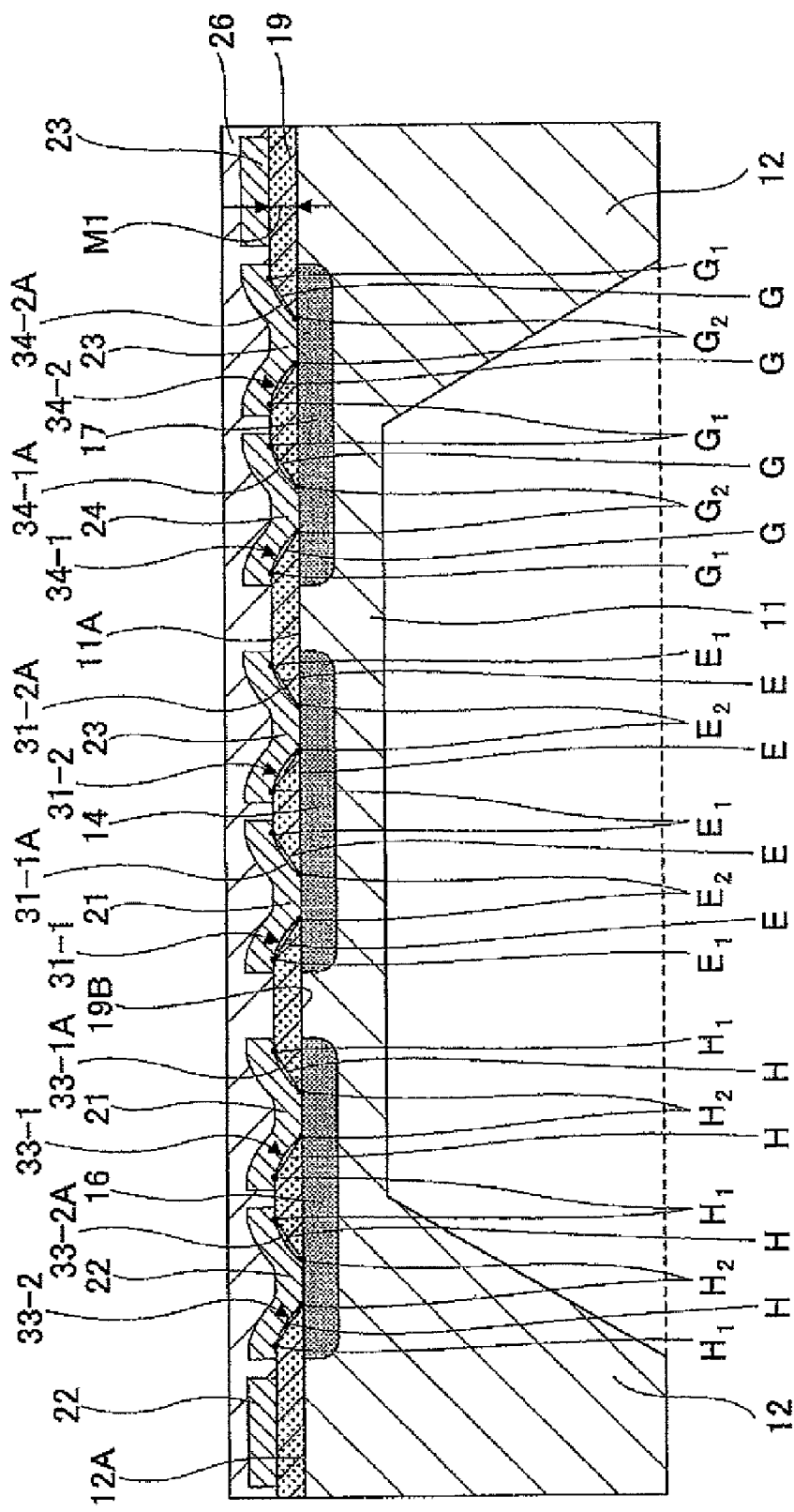
FIG. 9 shows a cross-sectional view (example 1) of a semiconductor pressure sensor of an embodiment of the present invention.
Figure 10:
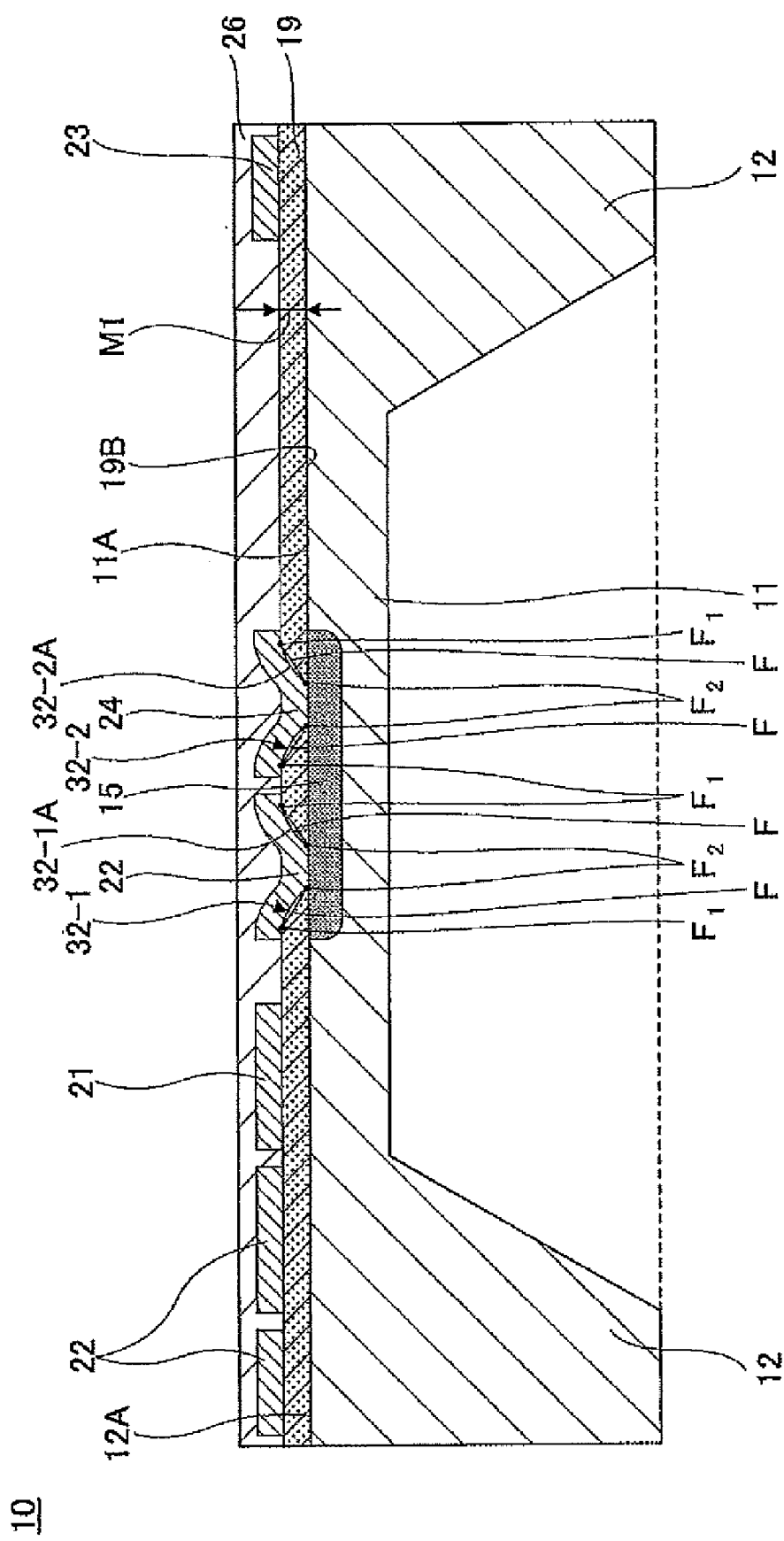
FIG. 10 shows a cross-sectional view (example 2) of a semiconductor pressure sensor of an embodiment of the present invention.
Figure 11:
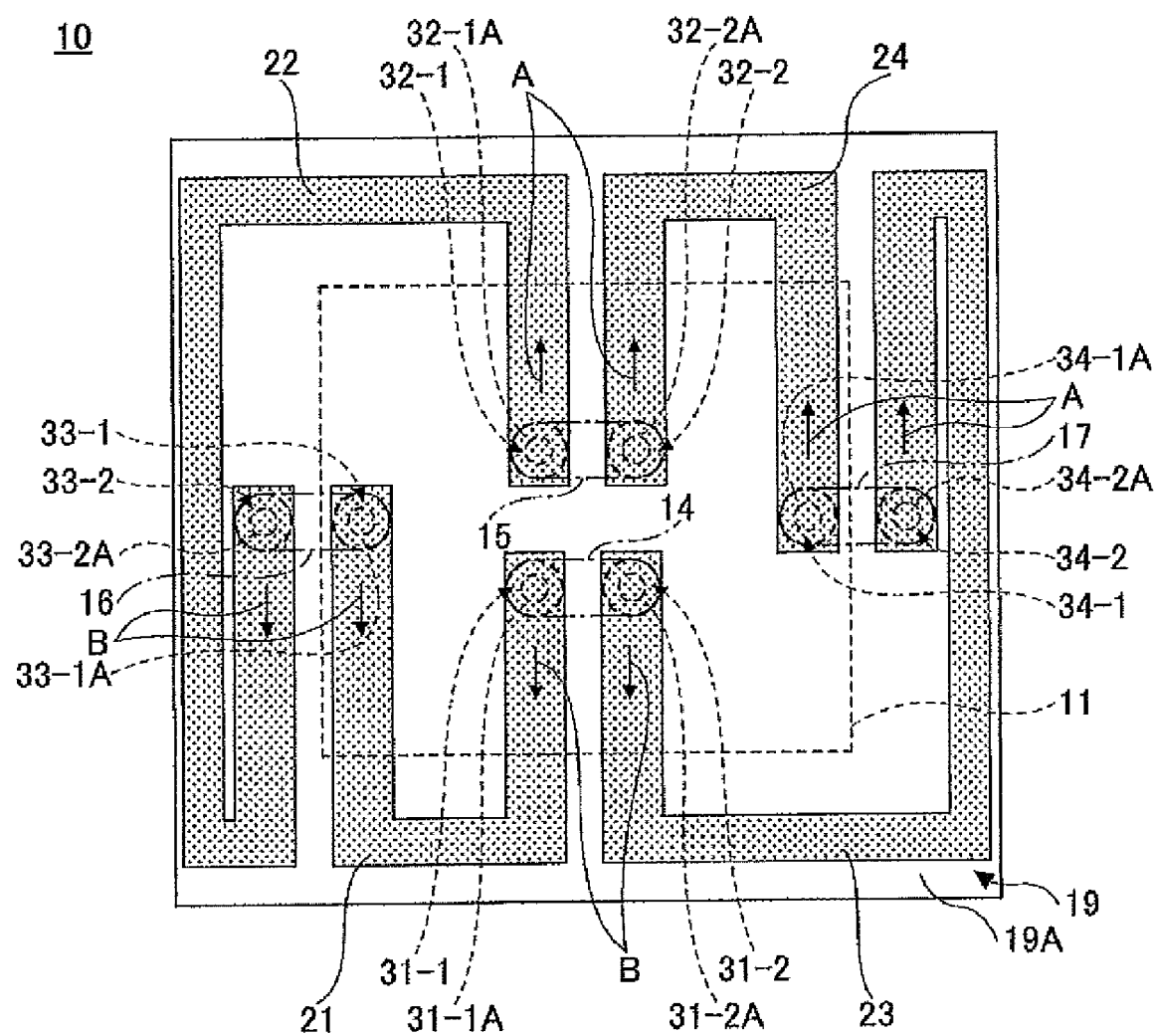
FIG. 11 shows a plan view of the semiconductor pressure sensor indicated in FIG. 9 and FIG. 10.
Figure 12:
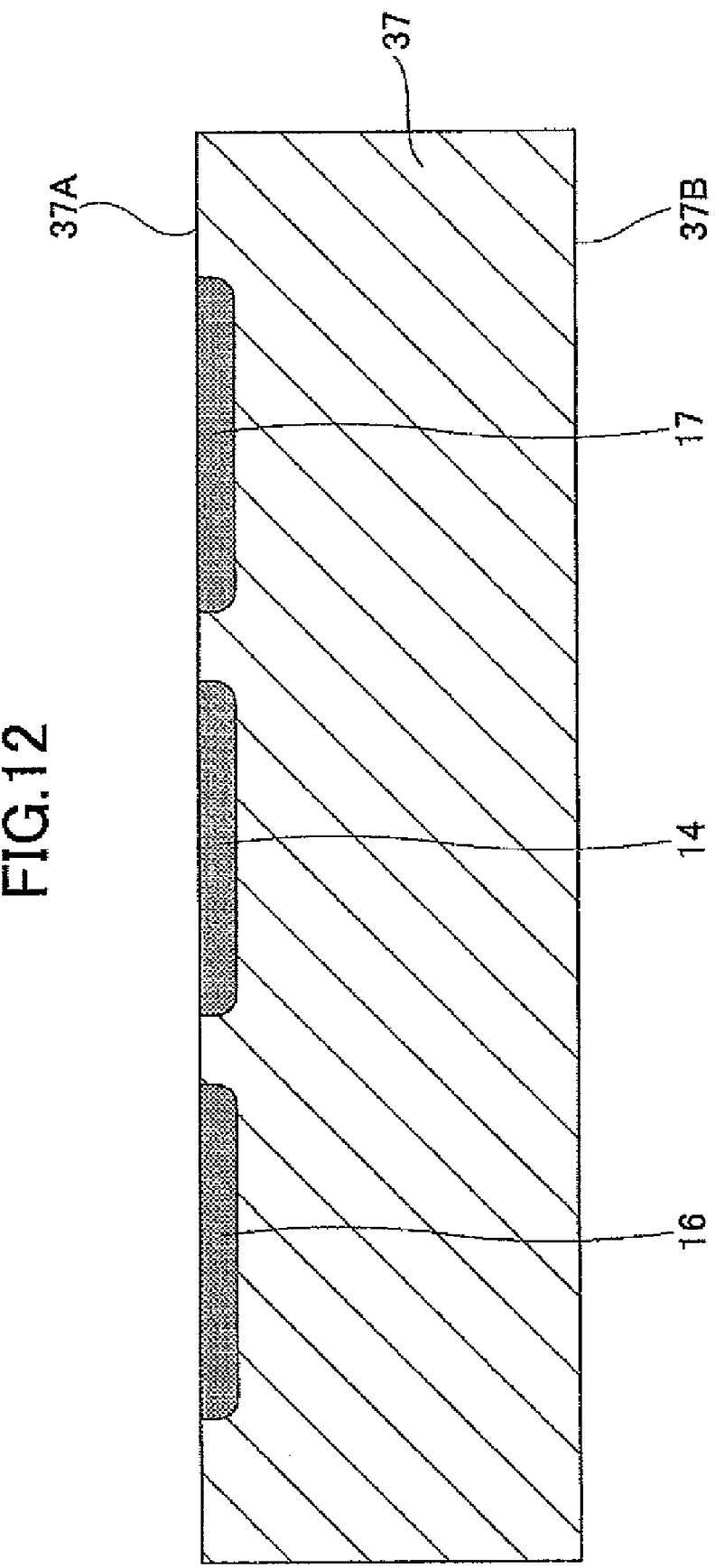
FIG. 12 is an illustration (example 1) showing a fabrication process of the semiconductor pressure sensor related to the first embodiment of the present invention.

FIG. 9 and FIG. 10 show cross-sectional views of a semiconductor pressure sensor 10 related to a first embodiment of the present invention. FIG. 11 is an illustration showing a plan view of the semiconductor pressure sensor 10 indicated in FIG. 9 and FIG. 10. FIG. 9 and FIG. 10 indicate a cross-sectional view of the semiconductor pressure sensor 10 cut along a plane perpendicular to a top surface 11A of a diaphragm 11. In FIG. 11, a protective film 26 is omitted in the description for convenience.

Referring to FIG. 9 through FIG. 11, the semiconductor pressure sensor 10 of the first embodiment includes a diaphragm 11, a diaphragm support part 12, first resistors 14 and 15, second resistors 16 and 17, an impurity doped insulating film 19, wiring patterns 21 through 24, and a protective film 26.

The diaphragm 11 is formed as a thin plate capable of flexible deformation when external pressure is applied to it. For example, the diaphragm 11 may be formed to be 40 μm in thickness.

The diaphragm support part 12 has a frame shape and is formed at peripheral parts of the diaphragm 11. The diaphragm support part 12 is formed to be thicker than the diaphragm 11. For example, the diaphragm support part 12 may be 400 μm in thickness. The diaphragm support part 12 is formed to support the diaphragm 11. The base material of the diaphragm 11 and the diaphragm support part 12 may be, for example, a semiconductor substrate (specifically a silicon substrate).

The first resistors 14 and 15 are formed at the top surface 11A of the diaphragm 11. The first resistors 14 and 15 are base resistors and formed at an approximate center of the diaphragm 11. The second resistors 16 and 17 are formed on the top surface 11A of the diaphragm 11. The second resistors 16 and 17 are formed at peripheral parts of the diaphragm 11. The first and second resistors 14, 15, 16 and 17 are connected to bridges via wiring patterns 21, 22, 23 and 24. The first and second resistors 14, 15, 16 and 17 are designed to have approximately the same resistance when no pressure is applied to the diaphragm 11. When an n-type semiconductor substrate is used as the base material of the diaphragm 11 and the diaphragm support part 12, the first and second resistors 14 through 17 may be formed, for example, by diffusion of p-type impurities into the n-type semiconductor substrate.

An impurity doped insulating film 19 is formed to cover the top surface 11A of the diaphragm 11, part of the top part of the first and second resistors 14 through 17, and a top surface 12A of the diaphragm support part 12. Penetrating parts 31-1, 31-2, 32-1, 32-2, 33-1, 33-2, 34-1, and 34-2 are formed in the impurity doped insulating film 19. The impurity doped insulating film 19 is made of an insulating film and impurities doped in the insulating film. The impurities are doped into the entire insulating film 19. For the impurity doped insulating film 19, a thickness M1 of the film, for example, may be approximately 1 μm. For example, an oxide film may be used as the insulating film of the impurity doped insulating film 19. When an oxide film is used as the insulating film above, the insulating film may be formed, for example, by a thermal oxidizing method, a CVD (chemical vapor deposition) method or the like. The impurity concentration profile of the impurity doped insulating film 19 is designed to decrease from the top surface 19A of the impurity doped insulating film 19 to the bottom part 19B of the impurity doped insulating film 19.

In this manner, by designing the impurity profile decreasing from the top surface 19A (see FIG. 11) of the impurity doped insulating film 19 to the bottom 19B of the impurity doped insulating film 19, the etching rate of the impurity doped insulating film 19 near the top surface 19A can be greater than that near the bottom 19B of the impurity doped insulating film 19. As a result, the angles formed by the side parts 31-1A, 31-2A, 32-1A, 32-2A, 33-1A, 33-2A, 34-1A, and 34-2A of the penetrating parts 31-1, 31-2, 32-1, 32-2, 33-1, 33-2, 34-1, and 34-2 respectively, and the bottom 19B of the impurity doped insulating film 19 can be less (for example, less than 45 degrees) than a conventional case (approximately 90 degrees).

For the doping impurity described above, for example, impurities such as P (phosphorus), B (boron), As(arsenic), or the like may be used. When P is used as the impurity, the average of the impurity concentration may be, for example, approximately $1.0 \times 10^{15}$ atoms/cm$^2$. Further, when P is used as the impurity, the acceleration energy of ion-implantation equipment may be, for example, approximately 80 keV.

In FIG. 9, the penetrating parts 31-1 and 31-2 are formed to penetrate parts of the impurity doped insulating film 19 corresponding to the first resistor 14. The penetrating parts 31-1 and 31-2 have openings which become wider from the bottom of the penetrating parts 31-1 and 31-2 toward the top ends of the penetrating parts 31-1 and 31-2. The side part 31-1A of the penetrating part 31-1 is provided with a wiring pattern 21 contacting the first resistor 14. The side part 31-2A of the penetrating part 31-2 is provided with a wiring pattern 23 contacting the first resistor 14. The penetrating parts 31-1 and 31-2 are formed to have a line (distance) E greater than the thickness M1 of the impurity doped insulating film 19 by a factor of the square root of two. The distance E is between a point E1 and a point E2. The points E1 are determined by positions at which a plane orthogonal to the top surface 11A of the diaphragm 11 meets the top ends of the side planes 31-1A and 31-2A of the penetrating parts 31-1 and 31-2, and the points E2 are determined by positions at which a plane orthogonal to the top surface 11A of the diaphragm 11 meets the bottom ends of the side planes 31-1A and 31-2A of the penetrating parts 31-1 and 31-2.

By making the distance (line) E greater than the film thickness M1 of the impurity doped insulating film 19 by a factor of the square root of two, where the line E is drawn between the point $E_1$ defined by a crossing point between a plane orthogonal to the top surface 11A of the diaphragm 11 and the top ends of the side planes 31-1A, 31-2A of the penetrating parts 31-1, 31-2 and the point $E_2$ defined by a crossing point between a plane orthogonal to the top surface 11A of the diaphragm 11 and the bottom ends of the side planes 31-1A, 31-2A of the penetrating parts 31-1, 31-2, it becomes possible to provide angles formed between the side planes 31-1A, 31-2A of the penetrating parts 31-1, 31-2 and the bottom 19B of the impurity doped insulating film 19 to be less than 45 degrees. Thereby, a sufficiently thick metal film (base material of the wiring patterns 21 through 24) can be formed at the side planes 31-1A and 31-2A of the penetrating parts 31-1 and 31-2, and the wiring patterns 21 and 23 formed at the side planes 31-1A and 31-2A of the penetrating parts 31-1 and 31-2 may be prevented from forming discontinuities.

In FIG. 10, the penetrating parts 32-1 and 32-2 are formed to penetrate parts of the impurity doped insulating film 19 corresponding to the first resistor 15. The penetrating parts 32-1 and 32-2 have openings which become wider from the bottom of the penetrating parts 32-1 and 32-2 toward the top ends of the penetrating parts 32-1 and 32-2. The side part 32-1A of the penetrating part 32-1 is provided with a wiring pattern 22 contacting to the first resistor 15. The side part 32-2A of the penetrating part 32-2 is provided with a wiring pattern 24 contacting the first resistor 15. The penetrating parts 32-1 and 32-2 are formed to have a distance (line) F formed to be greater than the thickness M1 of the impurity doped insulating film 19 by a factor of the square root of two. The distance F is between a point F1 and a point F2. The points F1 are determined by positions at which a plane orthogonal to the top surface 11A of the diaphragm 11 meets the top ends of the side planes 32-1A and 32-2A of the penetrating parts 32-1 and 32-2, and the points F2 are determined by positions at which a plane orthogonal to the top surface 11A of the diaphragm 11 meets the bottom ends of the side planes 32-1A and 32-2A of the penetrating parts 32-1 and 32-2.

By making the penetrating parts 32-1 and 32-2 have the distance F greater than the thickness M1 of the impurity doped insulating film 19 by a factor of the square root of two, it becomes possible to provide angles formed between the side planes 32-1A, 32-2A of the penetrating parts 32-1, 32-2 and the bottom 19B of the impurity doped insulating film 19 to be less than 45 degrees, where the distance F is between the point $F_1$ defined by a crossing point between a plane orthogonal to the top surface 11A of the diaphragm 11 and the ends of the side planes 32-1A, 32-2A of the penetrating parts 32-1, 32-2 and the point $F_2$ defined by a crossing point between a plane orthogonal to the top surface 11A of the diaphragm 11 and the bottom ends of the side planes 32-1A, 32-2A of the penetrating parts 32-1, 32-2. Thereby, a sufficiently thick metal film (base material of the wiring patterns 21 through 24) can be formed at the side planes 32-1A and 32-2A of the penetrating parts 32-1 and 32-2, and the wiring patterns 22 and 24 formed at the side planes 32-1A and 32-2A of the penetrating parts 32-1 and 32-2 may be prevented from forming discontinuities.

In FIG. 9, the penetrating parts 33-1 and 33-2 are formed to penetrate parts of the impurity doped insulating film 19 corresponding to the first resistor 16. The penetrating parts 33-1 and 33-2 have openings which become wider from the bottom of the penetrating parts 33-1 and 33-2 toward the top ends of the penetrating parts 33-1 and 33-2. The side part 33-1A of the penetrating part 33-1 is provided with a wiring pattern 21 contacting the first resistor 16. The side part 33-2A of the penetrating part 33-2 is provided with a wiring pattern 22 contacting the first resistor 16. The penetrating parts 33-1 and 33-2 are formed to have a distance (line) H greater than the thickness M1 of the impurity doped insulating film 19 by a factor of the square root of two. The distance H is between a point $H_1$ and a point $H_2$. The points $H_1$ are determined by positions at which a plane orthogonal to the top surface 11A of the diaphragm 11 meets the top ends of the side planes 33-1A and 33-2A of the penetrating parts 33-1 and 33-2, and the points $H_2$ are determined by positions at which a plane orthogonal to the top surface 11A of the diaphragm 11 meets the bottom ends of the side planes 33-1A and 33-2A of the penetrating parts 33-1 and 33-2.

By making the penetrating parts 33-1 and 33-2 to have the distance H greater than the thickness M1 of the impurity doped insulating film 19 by a factor of the square root of two, it becomes possible to provide angles formed between the side planes 33-1A, 33-2A of the penetrating parts 33-1, 33-2 and the bottom 19B of the impurity doped insulating film 19 to be less than 45 degrees, where the line H is drawn between the point $H_1$ defined by a crossing point between a plane orthogonal to the top surface 11A of the diaphragm 11 and the ends of the side planes 33-1A, 33-2A of the penetrating parts 33-1, 33-2 and the point $H_2$ defined by a crossing point between a plane orthogonal to the top surface 11A of the diaphragm 11 and the bottom ends of the side planes 33-1A, 33-2A of the penetrating parts 32-1, 32-2. Thereby, a sufficiently thick metal film (base material of the wiring patterns 21 through 24) can be formed at the side planes 33-1A and 33-2A of the penetrating parts 33-1 and 33-2, and the wiring patterns 21 and 22 formed at the side planes 33-1A and 33-2A of the penetrating parts 33-1 and 33-2 may be prevented from forming discontinuities.

In FIG. 9, the penetrating parts 34-1 and 34-2 are formed to penetrate parts of the impurity doped insulating film 19 corresponding to the first resistor 17. The penetrating parts 34-1 and 34-2 have openings which become wider from the bottom of the penetrating parts 34-1 and 34-2 toward the top ends of the penetrating parts 34-1 and 34-2. The side part 34-1A of the penetrating part 34-1 is provided with a wiring pattern 24 contacting the second resistor 17. The side part 34-2A of the penetrating part 34-2 is provided with a wiring pattern 23 contacting the first resistor 17. The penetrating parts 34-1 and 34-2 are formed to have a distance (line) G greater than the thickness M1 of the impurity doped insulating film 19 by a factor of the square root of two. The line G is drawn between a point $G_1$ and a point $G_2$. The points $G_1$ are determined by positions at which a plane orthogonal to the top surface 11A of the diaphragm 11 meets with the top ends of the side planes 34-1A and 34-2A of the penetrating parts 34-1 and 34-2, and the points $G_2$ are determined by positions at which a plane orthogonal to the top surface 11A of the diaphragm 11 meets the bottom ends of the side planes 34-1A and 34-2A of the penetrating parts 34-1 and 34-2.

By making the penetrating parts 34-1 and 34-2 to have a distance G greater than the thickness M1 of the impurity doped insulating film 19 by a factor of the square root of two, it becomes possible to provide angles formed between the side planes 34-1A, 34-2A of the penetrating parts 34-1, 34-2 and the bottom 19B of the impurity doped insulating film 19 to be less than 45 degrees, where the distance (line) G is between the point $G_1$ defined by a crossing point between a plane orthogonal to the top surface 11A of the diaphragm 11 and the ends of the side planes 34-1A, 34-2A of the penetrating parts 34-1, 34-2 and the point $G_2$ defined by a crossing point between a plane orthogonal to the top surface 11A of the diaphragm 11 and the bottom ends of the side planes 34-1A, 34-2A of the penetrating parts 34-1, 34-2. Thereby, a suffi-
ciently thick metal film (base material of the wiring patterns 21 through 24) can be formed at the side planes 34-1A and 34-2A of the penetrating parts 34-1 and 34-2, and the wiring patterns 23 and 24 formed at the side planes 34-1A and 34-2A of the penetrating parts 34-1 and 34-2 may be prevented from forming discontinuities.

As shown in FIG. 11, the wiring pattern 21 is formed at the bottoms and the side planes 31-1A, 33-1A of the penetrating parts 31-1, 33-1, and on the impurity doped insulating film 19. The wiring pattern 21 contacts part of the first resistor 14 exposed through the penetrating part 31-1 and part of the second resistor 16 exposed through the penetrating part 33-1. Thus, the wiring pattern 21 electrically connects the first resistor 14 and the second resistor 16. The parts of the wiring pattern 21 formed at the penetrating parts 31-1, 33-1 are respectively led toward the direction B. The wiring pattern 21 is electrically connected to a ground terminal (not shown).

As shown in FIG. 11, the wiring pattern 22 is formed at the bottoms and side planes 32-1A, 33-2A of the penetrating parts 32-1, 33-2, and on the impurity doped insulating film 19. The wiring pattern 22 contacts part of the first resistor 15 exposed through the penetrating part 32-1 and part of the second resistor 16 exposed through the penetrating part 33-2. Thus, the wiring pattern 22 electrically connects the first resistor 15 and the second resistor 16. The part of the wiring pattern 22 formed at the penetrating parts 32-1 is led toward the direction A (opposite to the direction B). The part of the wiring pattern 22 formed at the penetrating parts 32-2 is led toward the direction B. The wiring pattern 22 is electrically connected to a first output terminal (not shown). When pressure is applied to the diaphragm 11, the wiring pattern 22 outputs an output signal $D_{O1}$ calculated by the following equation (1) to the first output terminal. In the following equation (1), $R_1$ indicates a resistance of the first resistor 15, $R_2$ indicates a resistance of the second resistor 16, and Vcc indicates a source voltage applied to the wiring pattern 24, respectively.

$$D_{O1}\{Vcc/(R_1+R_2)\}\cdot R_2 \tag{1}$$

As shown in FIG. 11, the wiring pattern 23 is formed at the bottoms and side planes 31-2A, 34-2A of the penetrating parts 31-2, 34-2, and on the impurity doped insulating film 19. The wiring pattern 23 contacts part of the first resistor 14 exposed through the penetrating part 31-2 and part of the second resistor 17 exposed through the penetrating part 34-2. Thus, the wiring pattern 23 electrically connects the first resistor 14 and the second resistor 17. The part of the wiring pattern 23 formed at the penetrating part 31-2 is led toward the direction B. The wiring pattern 23 formed at the penetrating part 34-2 is led toward the direction A. The wiring pattern 23 is electrically connected to a second output terminal (not shown). When pressure is applied to the diaphragm 11, the wiring pattern 23 outputs an output signal $D_{O2}$ calculated by the following equation (2) to the second output terminal. In the following equation (2), $R_3$ indicates a resistance of the first resistor 14, $R_4$ indicates a resistance of the second resistor 17; and Vcc indicates a source voltage applied to the wiring pattern 24.

$$D_{O2}=\{Vcc/(R_2+R_4)\}\cdot R_3 \tag{2}$$

As shown in FIG. 11, the wiring pattern 24 is formed at the bottoms and side planes 32-2A, 34-1A of the penetrating parts 32-2, 34-1, and on the impurity doped insulating film 19. The wiring pattern 24 contacts part of the first resistor 15 exposed through the penetrating part 32-2 and part of the second resistor 17 exposed through the penetrating part 34-1. Thus, the wiring pattern 24 electrically connects the first resistor 15 and the second resistor 17. The parts of the wiring pattern 24 formed at the penetrating parts 32-2 and 34-1 are led toward the direction A. The wiring pattern 24 is electrically connected to the power source terminal (not shown).

The wiring patterns 21 through 24 described above may be formed by patterning a metallic film (for example, Al film) formed, for example, by a sputtering method or the like.

When pressure is applied to the diaphragm 11, the semiconductor sensor 10 converts the pressure applied to the diaphragm 11 into a numerical value based on the difference between the output signal $D_{o1}$ and the output signal $D_{o2}$.

The protective film 26 is formed to cover the top surface 19A of the impurity doped insulating film 19 and the wiring patterns 21 through 24. As the protective film 26, for example, an insulating film (for example, an oxide film) may be used. When an oxide film is used as the protective film 26, the thickness of the protective film 26, for example, may be approximately 1 μm. By providing such a protective film 26, the wiring patterns 21 through 24 can be prevented from forming discontinuities.

According to the semiconductor pressure sensor of this embodiment of the present invention, by making the lines (distances) E through H to be longer than the thickness M of the impurity doped insulating film 19 by a factor of the square root of two, in which the lines E through H are drawn between the crossing points $E_1$, $F_1$, $G_1$, and $H_1$ where the planes orthogonal to the top surface 11A of the diaphragm 11 meet the ends of the side planes 31-1A, 31-2A, 32-1A, 32-2A, 33-1A, 33-2A, 34-1A, and 34-2A of the penetrating parts 31-1, 31-2, 32-1, 32-2, 33-1, 33-2, 34-1, and 34-2, respectively, and the crossing points E2, F2, G2, and H2 where the planes orthogonal to the top surface 11A of the diaphragm 11 meet the bottoms of the side planes 31-1A, 31-2A, 32-1A, 32-2A, 33-1A, 33-2A, 34-1A, and 34-2A of the penetrating parts 31-1, 31-2, 32-1, 32-2, 33-1, 33-2, 34-1, and 34-2. As a result, the angles formed between the side planes 31-1A, 31-2A, 32-1A, 32-2A, 33-1A, 33-2A, 34-1A, and 34-2A of the penetrating parts 31-1, 31-2, 32-1, 32-2, 33-1, 33-2, 34-1, and 34-2 and the bottom 19B of the impurity doped insulating film 19 become smaller than 45 degrees. Thereby, a sufficiently thick metal film (base material of the wiring patterns 21 through 24) can be formed at the side planes 31-1A, 31-2A, 32-1A, 32-2A, 33-1A, 33-2A, 34-1A, and 34-2A of the penetrating parts 31-1, 31-2, 32-1, 32-2, 33-1, 33-2, 34-1, and 34-2, respectively, so that the wiring patterns 21 through 24 formed at the side planes 31-1A, 31-2A, 32-1A, 32-2A, 33-1A, 33-2A, 34-1A, and 34-2A of the penetrating parts 31-1, 31-2, 32-1, 32-2, 33-1, 33-2, 34-1, and 34-2 can be prevented from forming discontinuities.

FIG. 12 through FIG. 21 show a manufacturing process related to the first embodiment of this invention. FIG. 22 indicates a plan view of a structure shown in FIG. 17. Reference symbols of parts constituting the semiconductor pressure sensor 10 of the first embodiment are used as the reference symbols of identical parts in FIG. 12 through FIG. 22. Further, in FIG. 12 through FIG. 21, the penetrating part 32, the crossing points $F_1$, $F_2$, and the line F of the first resistor 15 described in FIG. 10 are omitted for convenience.

Referring to FIG. 12 through FIG. 22, the manufacturing process of the semiconductor pressure sensor 10 of the first embodiment is described below. In a process shown in FIG. 12, at first, first and second resistors 14 through 17 are formed (resistor formation process) on a top surface 37A of a semiconductor substrate 37 by using a conventional technique.

Subsequently, in a process of FIG. 13, an insulating film 39 (part of the impurity doped insulating film 19 as described above) is formed to cover the top surface of the first and the second resistors 14 through 17 and the top surface 37A of the semiconductor substrate 37 (insulating film formation process). For the insulating film 39, for example, an oxide film may be used. When the oxide film is used as the insulating film 39, the insulating film 39 may be formed by using a thermal oxidation method or a CVD (chemical vapor deposition) method. For using the oxide film as the insulating film 39, the film thickness M2 of the insulating film 39 may be, for example, approximately 1 μm.

Figure 13:
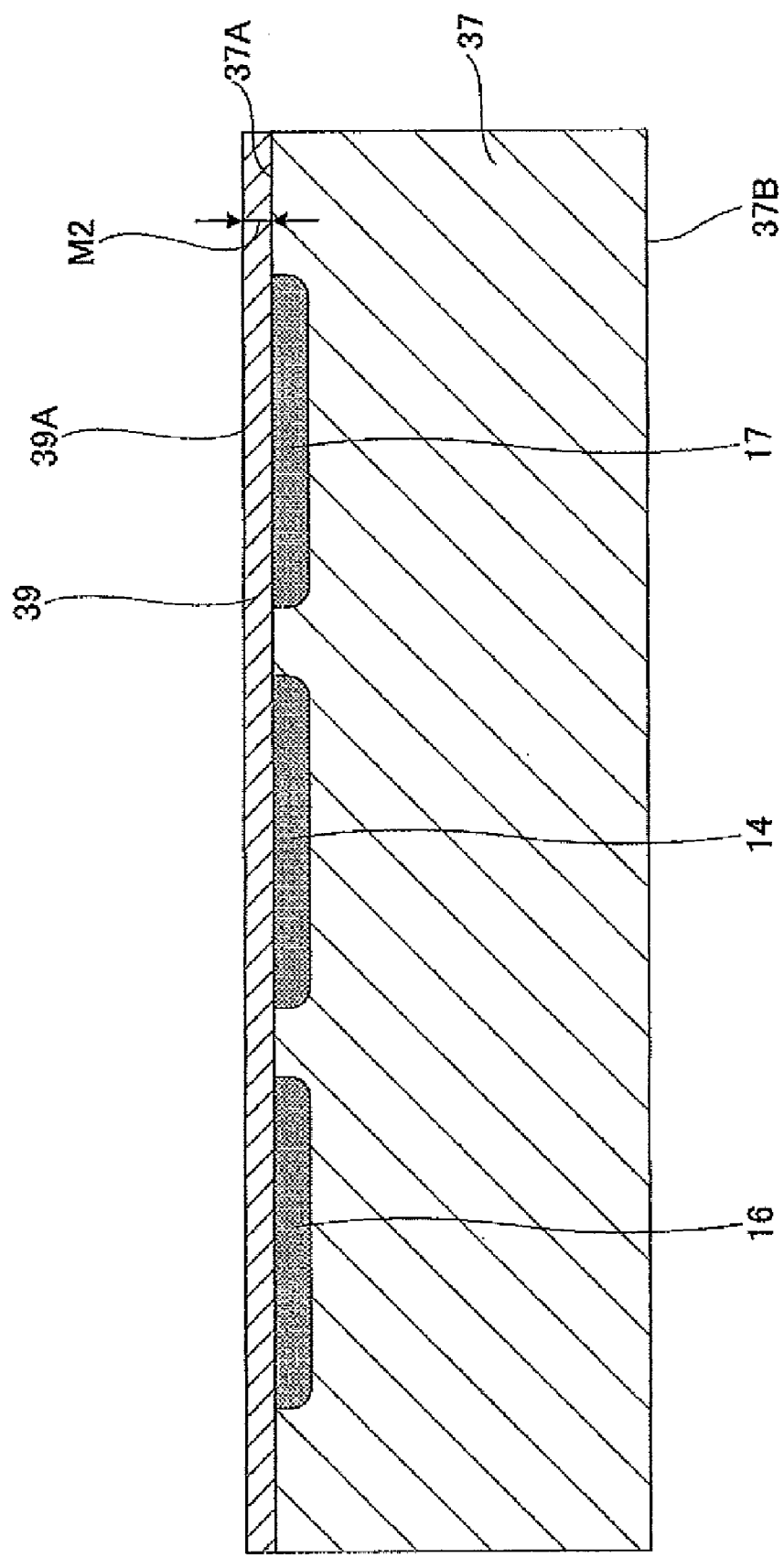
FIG. 13 is an illustration (example 2) showing a fabrication process of the semiconductor pressure sensor related to the first embodiment of the present invention.
Figure 14:
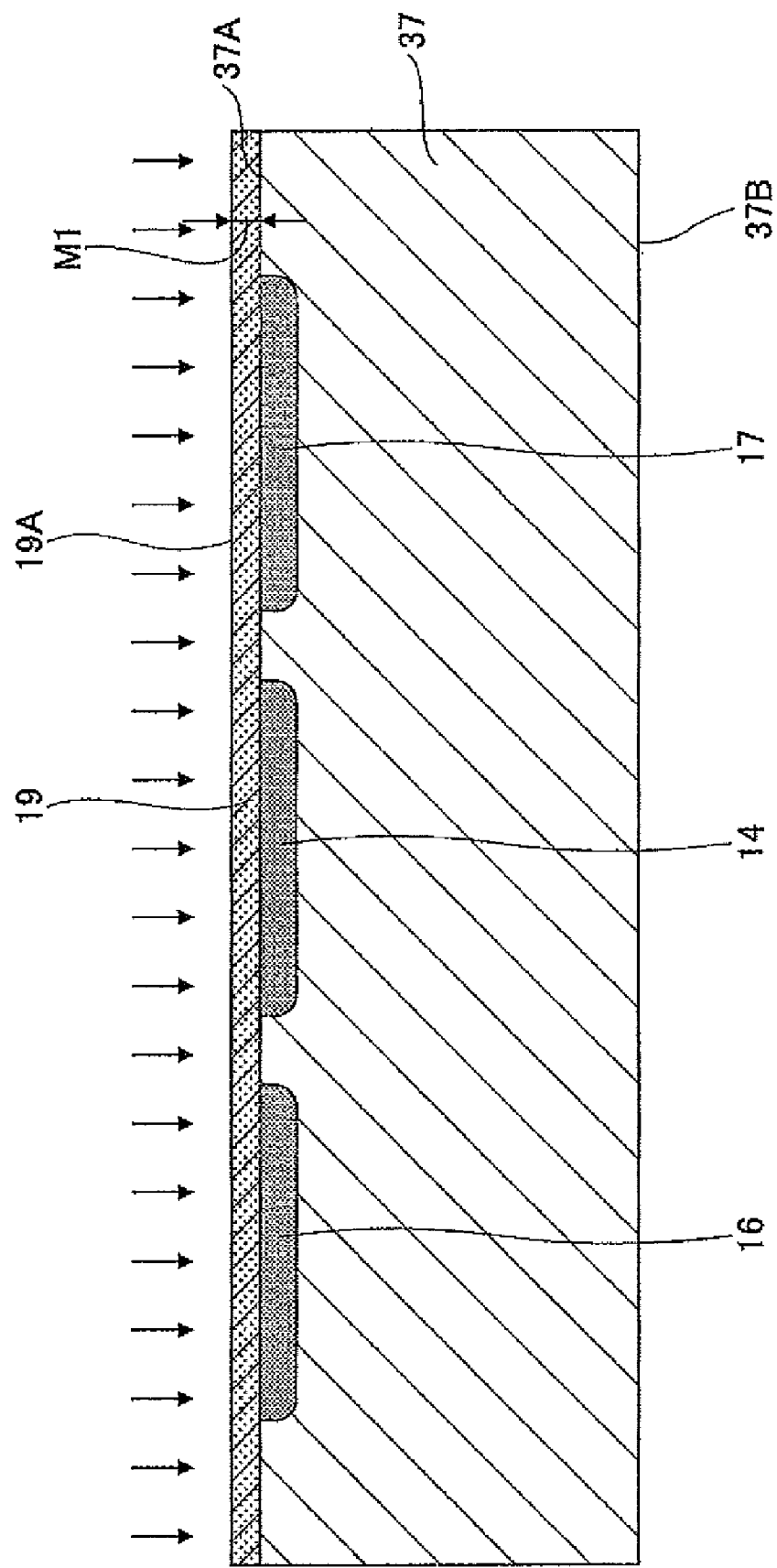
FIG. 14 is an illustration (example 3) showing a fabrication process of the semiconductor pressure sensor related to the first embodiment of the present invention.

In the manufacturing process of FIG. 14, impurities are doped from the top surface 39A of the insulating film 39 of FIG. 13 into the entire insulating film 39 forming the impurity doped insulating film 19 (impurity doped insulating film formation process). In the impurity doped insulating film formation process, the impurities are prevented from diffusing into the first and the second resistors 14 through 17 formed under the insulating film 39 and the semiconductor substrate 37, By this process, the impurity concentration of the first and the second resistors 14-17 is prevented from fluctuating. As an impurity to dope into the insulating film 39, for example, P (phosphorus), B (boron), As (arsenic) or the like may be used. When P is used as the impurity, an acceleration energy of ion implantation equipment may be, for example, a 80 keV. Further, when P is used as the impurity, the average dosage of P for ion implantation may be $1.0 \times 10^{15}$ atoms/cm$^2$. The thickness M1 of the impurity doped insulating film 19 may be, for example, approximately 1 μm.

In this manner, when impurities are doped into the entire insulating film 39 from the top surface 39A of the insulating film 39 for forming the impurity doped insulating film 19, the impurity concentration increases toward the top surface 19A of the impurity doped insulating film 19 and decreases toward the bottom 19B of the impurity doped insulating film 19. As a result, it becomes possible that an etching rate at the top surface 19A of the impurity doped insulating film 19 is greater than that at the bottom 19B of the impurity doped insulating film 19.

Figure 15:
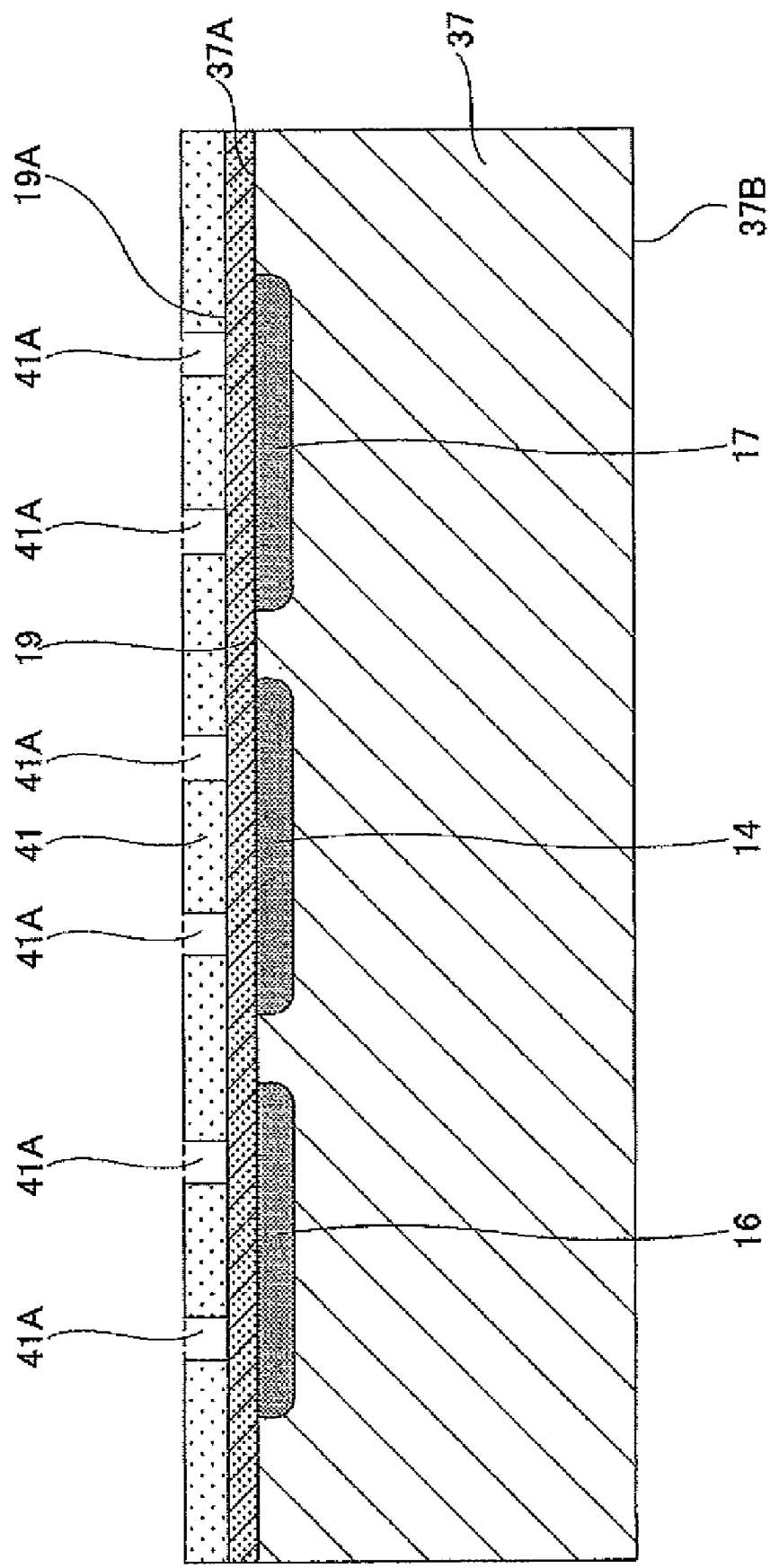
FIG. 15 is an illustration (example 4) showing a fabrication process of the semiconductor pressure sensor related to the first embodiment of the present invention.

In a process shown in FIG. 15, a resist film 41 having plural openings is formed on the impurity doped insulating film 19 (resist film formation process). The openings 41A are formed to expose parts of the top surface 19A of the impurity doped insulating film 19, which parts correspond to positions at which the penetrating parts 31-1, 31-2, 32-1, 32-2, 33-1, 33-2, 34-1, and 34-2 are to be formed. The resist film 41 is used as a mask to etch the impurity doped insulating film 19 by a wet etching method forming the penetrating parts 31-1, 31-2, 32-1, 32-2, 33-1, 33-2, 34-1, and 34-2.

Figure 16:
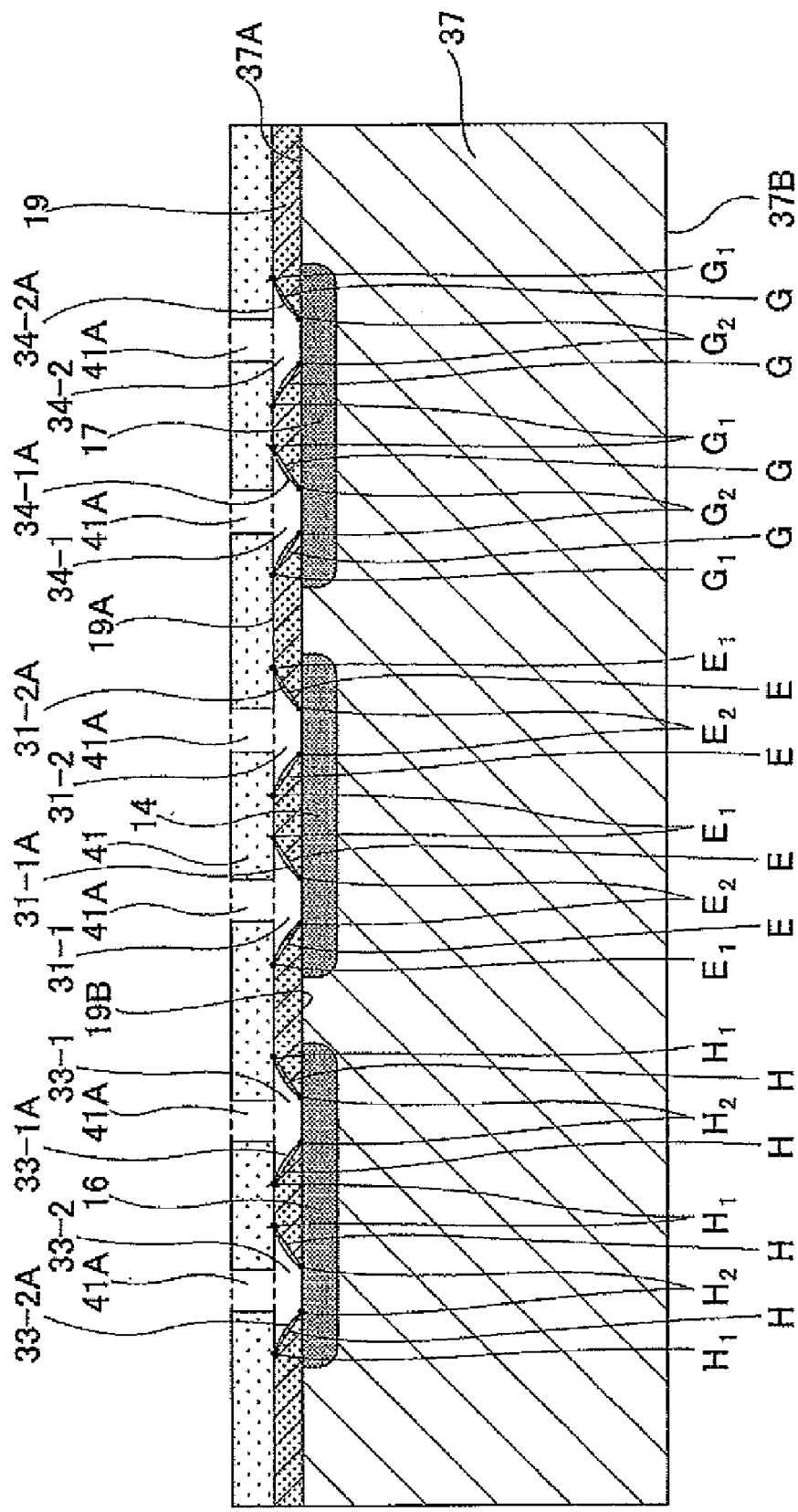
FIG. 16 is an illustration (example 5) showing a fabrication process of the semiconductor pressure sensor related to the first embodiment of the present invention.

In a process shown in FIG. 16, wet etching is performed using the resist film 41 as the mask until exposing the first and the second resistors 14 through 17, and forms the penetrating parts 31-1, 31-2, 32-1, 32-2, 33-1, 33-2, 34-1, 34-2 (penetrating part formation process).

According to this process, when forming the penetrating parts 31-1, 31-2, 32-1, 32-2, 33-1, 33-2, 34-1, and 34-2 by etching the impurity doped insulating film 19, in which process the etching rate at the top surface 19A of the impurity doped insulating film 19 is higher than the etching rate at the bottom 19B of the impurity doped insulating film 19, the side planes 31-1A, 31-2A, 32-1A, 32-2A, 33-1A, 33-2A, 34-1A, and 34-2A of the penetrating parts 31-1, 31-2, 32-1, 32-2, 33-1, 33-2, 34-1, and 34-2, respectively, may be formed with gradual slopes.

Further, in the penetrating part formation process, the penetrating parts 31-1, 31-2, 32-2, 33-1, 33-2, 34-1, and 34-2 are formed so that the distances (lines) E through H between the crossing points $E_1$, $F_1$, $G_1$, and $H_1$ and the crossing points $E_2$, $F_2$, $G_2$, and $H_2$, respectively, are greater than the thickness M1 of the impurity doped insulating film 19 by a factor of the square root of two, where the crossing points $E_1$, $F_1$, $G_1$, and $H_1$ are determined where a plane orthogonal to the top surface 37A of the semiconductor substrate 37 meets the side planes 31-1A, 31-2A, 32-1A, 32-2A, 33-1A, 33-2A, 34-1A, and 34-2A of the penetrating parts 31-1, 31-2, 32-1, 32-2, 33-1, 33-2, 34-1, and 34-2 and the crossing points $E_2$, $F_2$, $G_2$, $H_2$ are determined where a plane orthogonal to the top surface 11A of the diaphragm 11 meets the bottom ends of the side plane 31-1A, 31-2A, 32-1A, 32-2A, 33-1A, 33-2A, 34-1A, and 34-2A of the penetrating parts 31-1, 31-2, 32-1, 32-2, 33-1, 33-2, 34-1, and 34-2, respectively.

In this manner, when the penetrating parts 31-1, 31-2, 32-1, 32-2, 33-1, 33-2, 34-1, and 34-2 are formed so that the lines (distances) E through H between the crossing points $E_1$, $F_1$, $G_1$, $H_1$ and the crossing points $E_2$, $F_2$, $G_2$, $H_2$ are greater than the thickness M1 of the impurity doped insulating film 19 by a factor of the square root of two, where the crossing points $E_1$, $F_1$, $G_1$, $H_1$ are determined where a plane orthogonal to the top surface 37A of the semiconductor substrate 37 meets the top parts of the side planes 31-1A, 31-2A, 32-1R, 32-2A, 33-1A, 33-2A, 34-1A, and 34-2A of the penetrating parts 31-1, 31-2, 32-1, 32-2, 33-1, 33-2, 34-1, and 34-2 and the crossing points $E_2$, $F_2$, $G_2$, $H_2$ are determined where a plane orthogonal to the top surface 11A of the diaphragm 11 meets the bottom ends of the side planes 31-1A, 31-2A, 32-1A, 32-2A, 33-1A, 33-2A, 34-1A, and 34-2A of the penetrating parts 31-1, 31-2, 32-1, 32-2, 33-1, 33-2, 34-1, and 34-2, respectively, the angles formed between the side planes 31-1A, 31-2A, 32-1A, 32-2A, 33-1A, 33-2A, 34-1A, and 34-2A of the penetrating parts 31-1, 31-2, 32-1, 32-2, 33-1, 33-2, 34-1, and 34-2 and the bottom 19B of the impurity doped insulating film 10 may be equal or less than 45 degrees.

Figure 17:
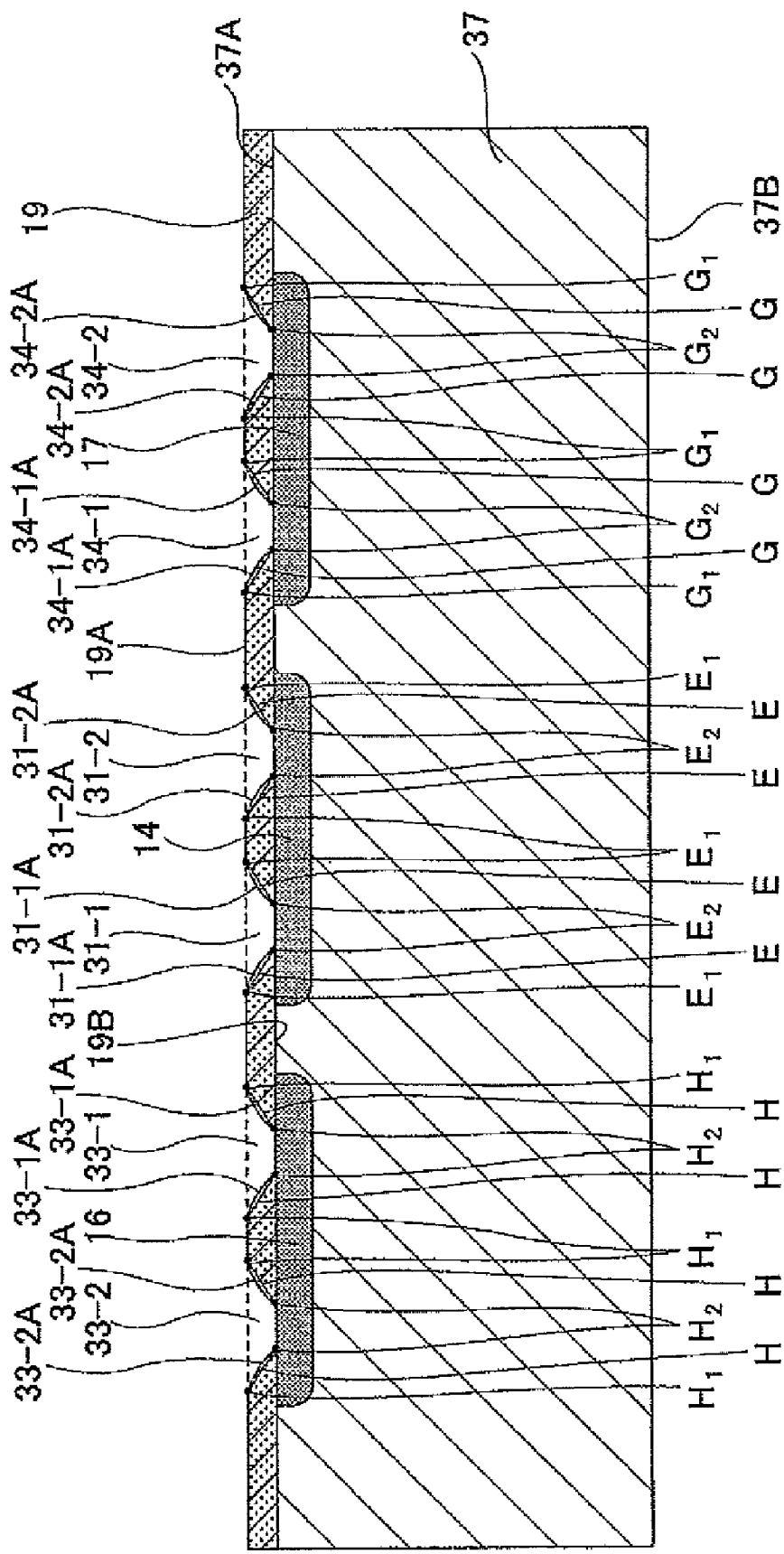
FIG. 17 is an illustration (example 6) showing a fabrication process of the semiconductor pressure sensor related to the first embodiment of the present invention.
Figure 18:
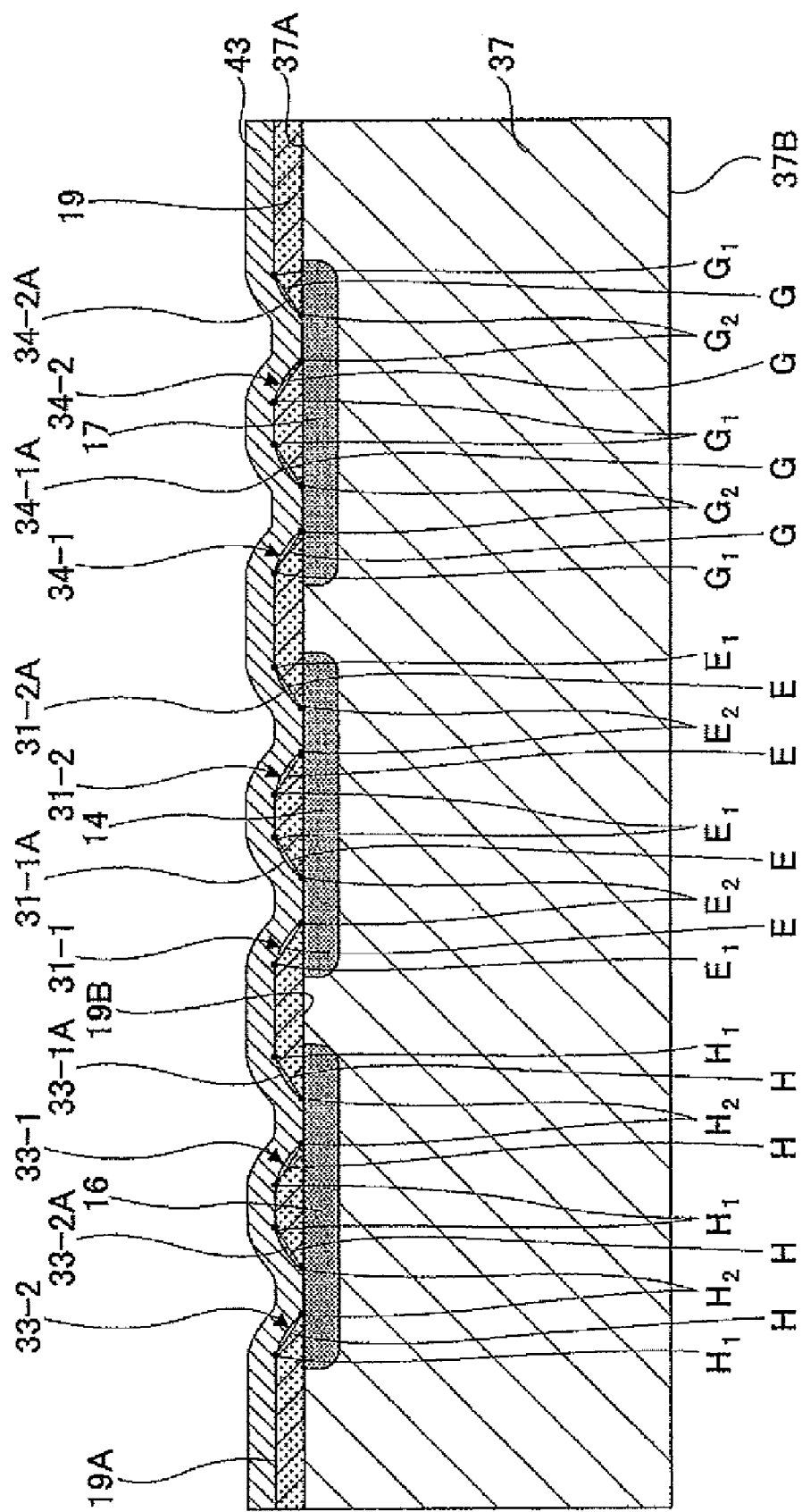
FIG. 18 is an illustration (example 7) showing a fabrication process of the semiconductor pressure sensor related to the first embodiment of the present invention.

Next, in a process of FIG. 17, the resist film 41 shown in FIG. 16 is removed (see FIG. 22). In a process in FIG. 18, a metallic film 43 is formed to cover the top surface of the structure of FIG. 17 (metallic film formation process). The metallic film 43 is patterned to form the wiring patterns 21 through 24, as described in a process of FIG. 19 below. As the metallic film 43, for example, an Al film may be used. When Al film is used for the metallic film 43, the metallic film 43 may be formed by a sputtering method, for example. When an Al film is used for the metallic film 43, the thickness of the metallic film 43 at the top surface 19A of the impurity doped insulating film 19 may be approximately 0.5 μm.

In the manner described above, the angles formed between the side planes 31-1A, 31-2A, 32-1A, 32-2A, 33-1A, 33-2A, 34-1A, and 34-2A of the penetrating parts 31-1, 31-2, 32-1, 32-2, 33-1, 33-2, 34-1, and 34-2 and the bottom 19B of the impurity doped insulating film 19 become equal or less than 45 degrees, and when the metallic film 43 is formed on the side planes 31-1A, 31-2A, 32-1A, 32-2A, 33-1A, 33-2A, 34-1A, and 34-2A of the penetrating parts 31-1, 31-2, 32-1, 32-2, 33-1, 33-2, 34-1, and 34-2, a sufficient thickness of the metallic film 43 (film thickness enabling to prevent discontinuities in the wiring patterns 21 through 24) may become possible to form on the side planes 31-1A, 31-2A, 32-1A, 32-2A, 33-1A, 33-2A, 34-1A, and 34-2A of the penetrating parts 31-1, 31-2, 32-1, 32-2, 33-1, 33-2, 34-1, and 34-2. Thereby, discontinuities of the wiring patterns formed on the side planes 31-1A, 31-2A, 32-1A, 32-2A, 33-1A, 33-2A, 34-1A, and 34-2A of the penetrating parts 31-1, 31-2, 32-1, 32-2, 33-1, 33-2, 34-1, and 34-2 may be prevented.

Figure 19:
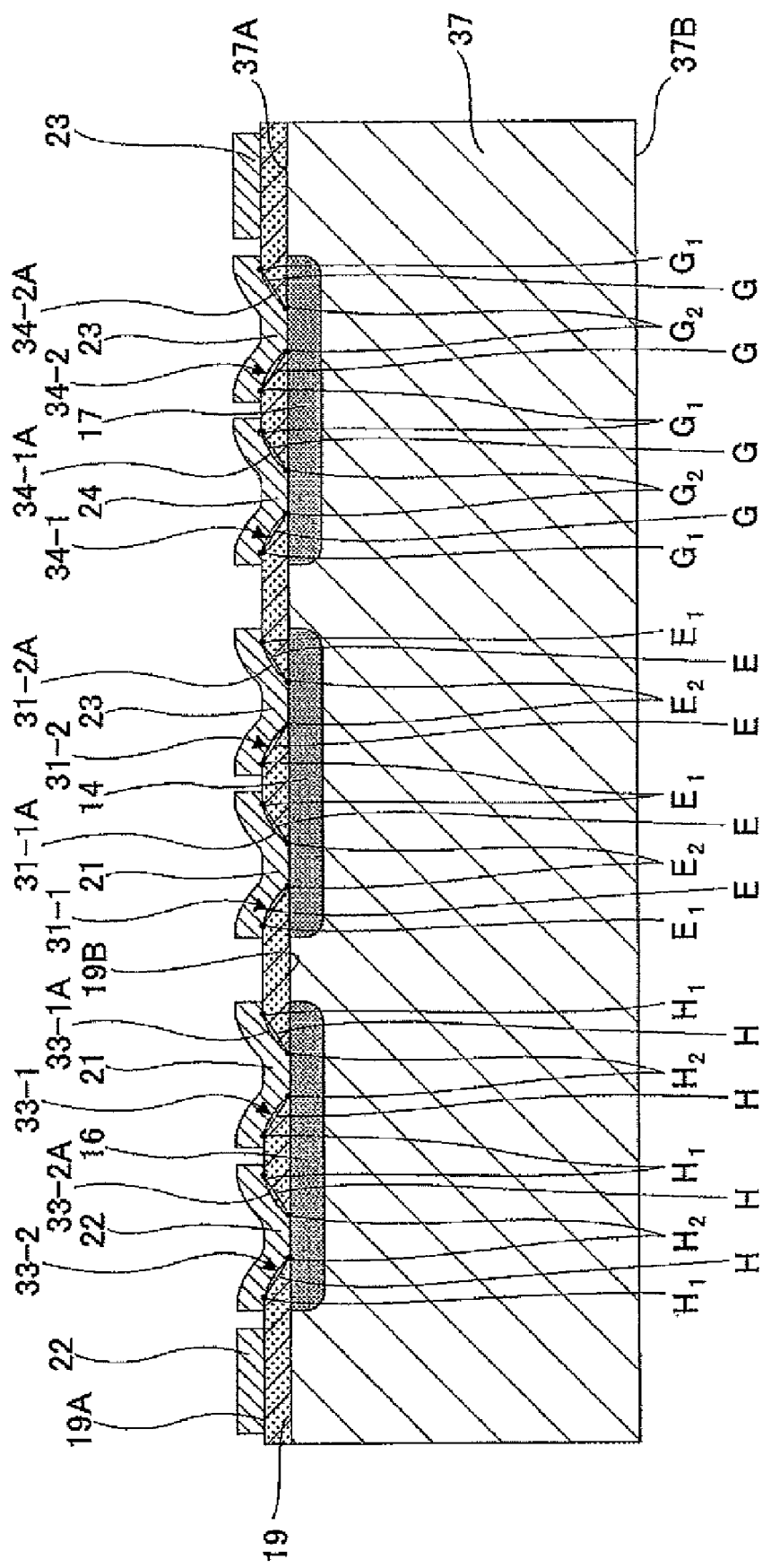
FIG. 19 is an illustration (example 8) showing a fabrication process of the semiconductor pressure sensor related to the first embodiment of the present invention.

Next, in a process of FIG. 19, the metallic film 43 is patterned by a patterning process to form the wiring patterns 21 through 24 (wiring formation process). Specifically, for example, a resist film (not shown) is formed on the metallic film 43 of a structure shown in FIG. 18, in which the resist film only covers the formation regions of the wiring patterns 21 through 24. Next, the metallic film 43 is etched by a dry etching method and the wiring patterns 21 through 24 are formed. The resist film (not shown) is removed after forming the wiring patterns 21 through 24.

Figure 20:
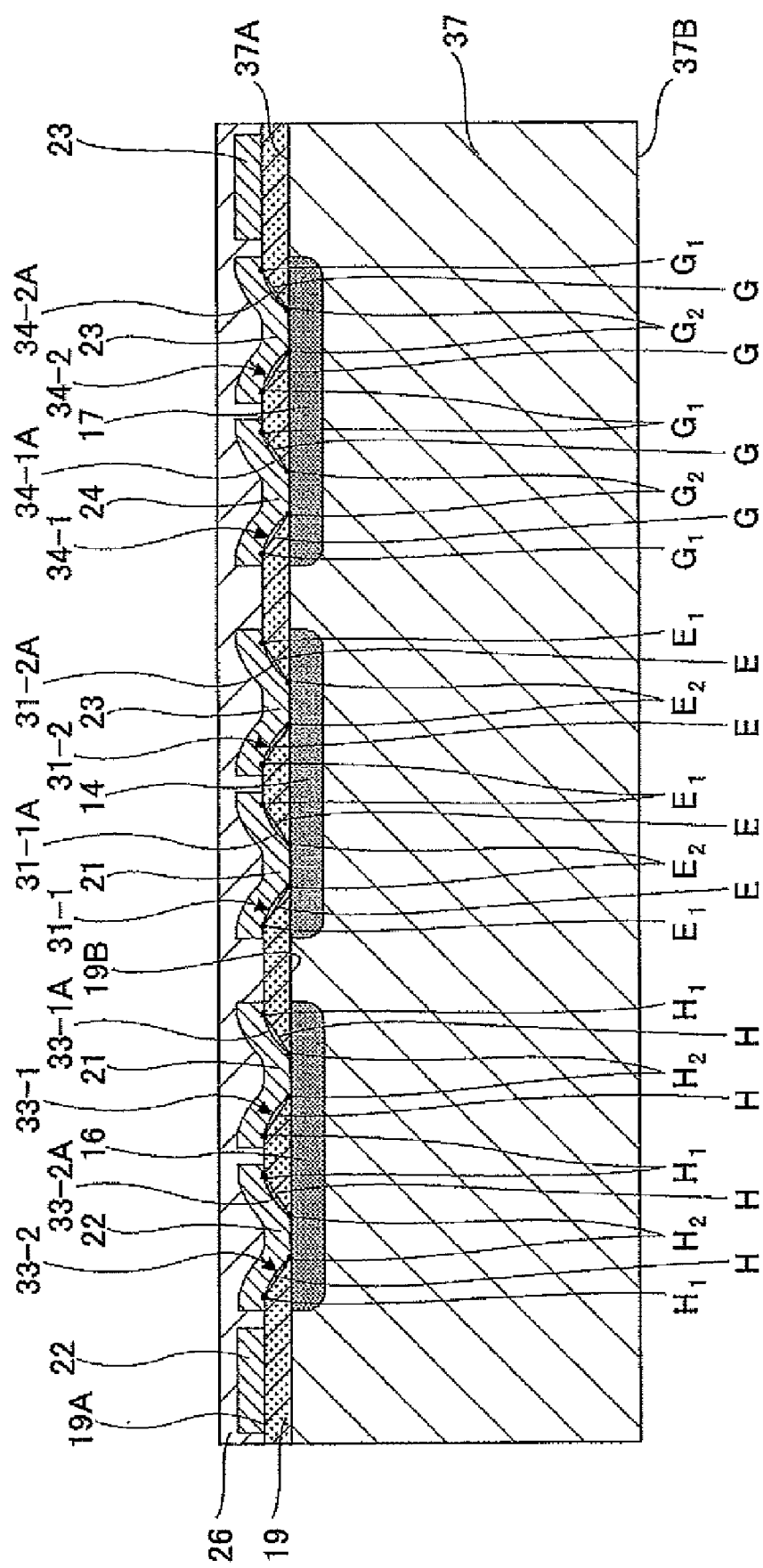
FIG. 20 is an illustration (example 9) showing a fabrication process of the semiconductor pressure sensor related to the first embodiment of the present invention.

Further, in a process shown in FIG. 20, a protection film 26 is formed to cover the top surface 19A of the impurity doped insulating film 19 and the wiring patterns 21 through 24 provided on the structure shown in FIG. 19. As the protection film 26, for example, an insulating film (specifically, an oxide film) may be used. The protection film 26 may be formed by a CVD method, for example. When an oxide film is used as the protection film 26, the thickness of the protection film 26 may be approximately 1 μm. Damage of the wiring patterns 21 through 24 caused by an external force may be reduced by forming such a protection film 26.

Figure 21:
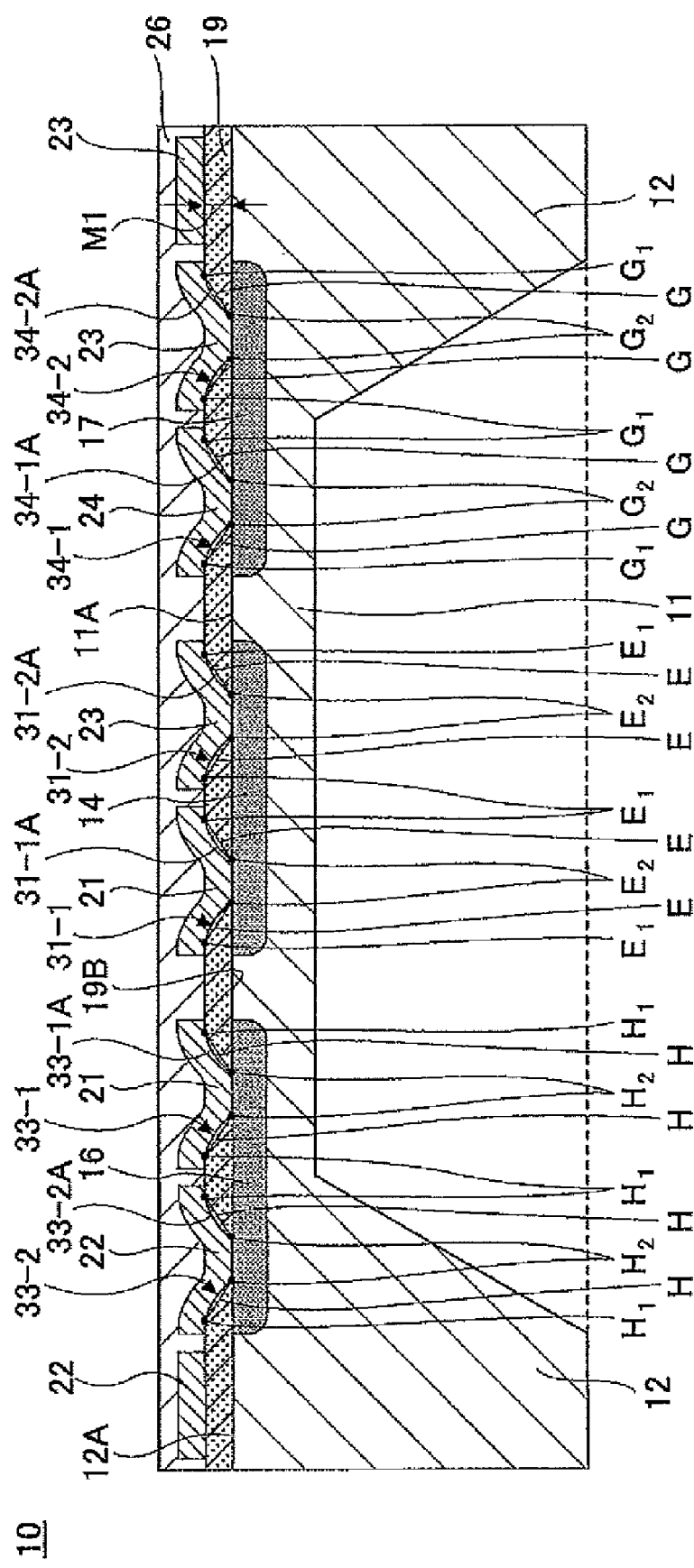
FIG. 21 is an illustration (example 10) showing a fabrication process of the semiconductor pressure sensor related to the first embodiment of the present invention.
Figure 22:
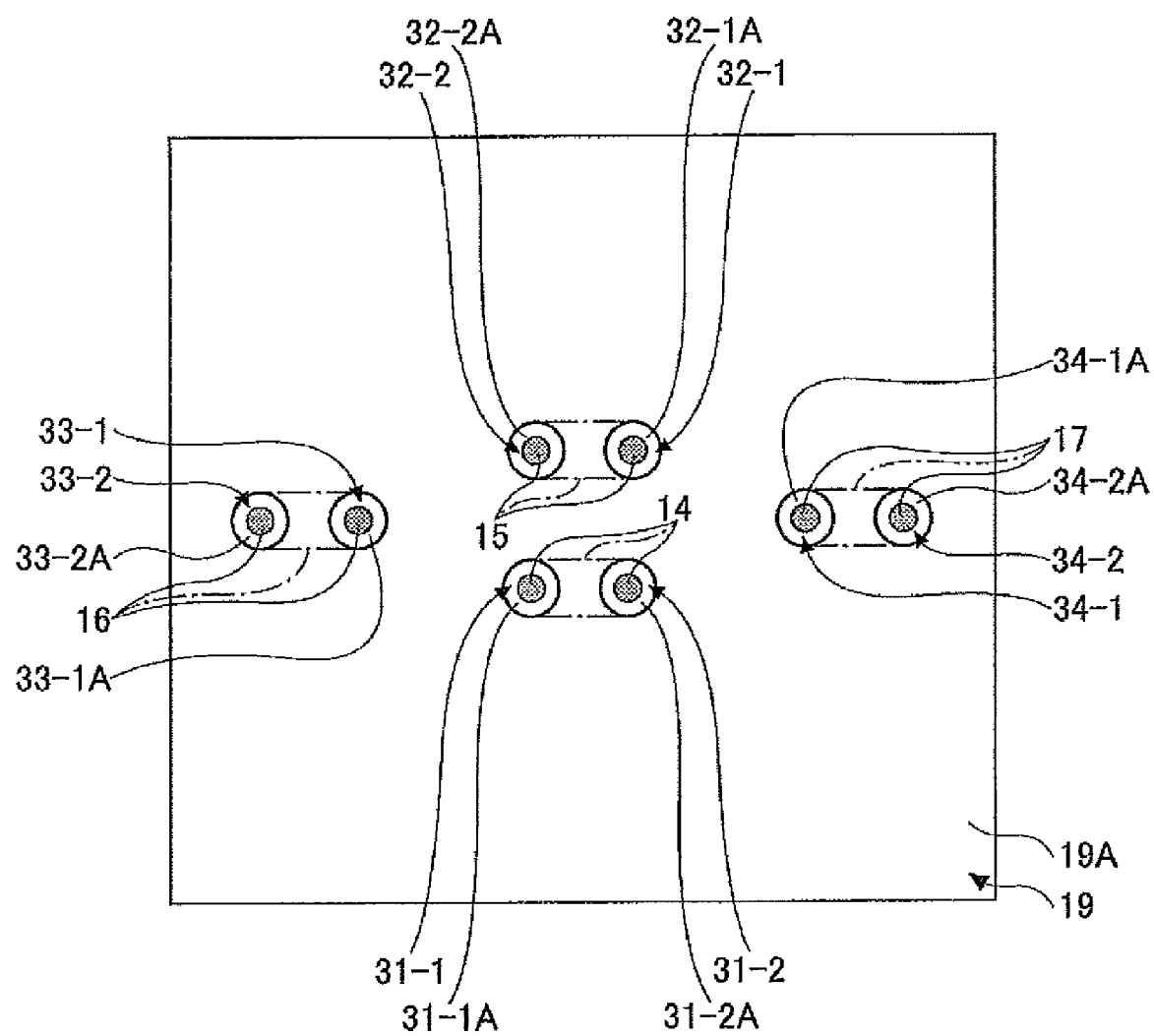
FIG. 22 is an illustration showing a plan view of an structure indicated in FIG. 17.

In a process shown in FIG. 21, the semiconductor substrate 37 shown in FIG. 20 is etched (specifically, by a wet etching method) from the back side 37B of the semiconductor substrate 37, and the diaphragm member 11 and the diaphragm support member 12 are formed. Thereby, the semiconductor pressure sensor 10 is manufactured. The thickness of the diaphragm 11 may be approximately 40 μm, for example. Further, the thickness of the diaphragm support member may be approximately 400 μm, for example.

According to the semiconductor pressure sensor manufacturing method of the present embodiment, the impurity doped insulating film 19, which is formed by doping impurities into the entire insulting film 39 from the top surface 39A of the insulating film 39, is etched by a wet etching process. The penetrating parts 31-1, 31-2, 32-1, 32-2, 33-1, 33-2, 34-1, and 34-2 are formed so that each of the lines (distances) E through E between the crossing points E1, F1, G1, H1 and the crossing points E2, F2, G2, H2 is equal to or greater than the thickness M1 of the impurity doped insulating film 19 by a factor of the square root of two. As a result, the individual angles formed by the side planes 31-1A, 31-2A, 32-1A, 32-2A, 33-2A, 332A, 34-1A, and 34-2A of the penetrating parts 31-1, 31-2, 32-1, 32-2, 33-1, 33-2, 34-1, and 34-2 and the bottom plane 19B of the impurity doped insulating film 19 can be equal to or less than 45 degrees; where the crossing points E1, F1, G1, and H1 are determined by meeting points between a plane orthogonal to the top surface 37A of the F semiconductor substrate 37 and the top ends of the side planes 31-1A, 31-2A, 32-1A, 32-2A, 33-1A, 33-2A, 34-1A, and 34-2A of the penetrating parts 31-1, 31-2, 32-1, 32-2, 33-1, 33-2, 34-1, and 34-2, and the crossing points E2, F2, G2, and H2 are determined by meeting points between a plane orthogonal to the top surface 37A of the semiconductor substrate 37 and the bottom end of the side plane 31-1A, 31-2A, 32-TA, 32-2A, 33-1A, 33-2A, 34-1A, and 34-2A of the penetrating parts 31-1, 31-2, 32-1, 32-2, 33-1, 33-2, 34-1, and 34-2.

As a result, it becomes possible that a sufficiently thick metallic film 43 (base material of the wiring patterns 21 through 24) is formed on the side planes 31-1A, 31-2A, 32-1A, 32-2A, 33-1A, 33-2A, 34-1A, and 34-2A of the penetrating parts 31-1, 31-2, 32-1, 32-1, 33-1, 33-2, 34-1, and 34-2, and thus the wiring patterns 21 through 24 formed on the side planes 31-1A, 31-2A, 32-1A, 32-2A, 33-1A, 33-2A, 34-1A, and 34-2A of the penetrating parts 31-1, 31-2, 32-1, 32-1, 33-1, 33-2, 34-1, and 34-2 can be prevented from forming discontinuities.

Second Embodiment

Figure 23:
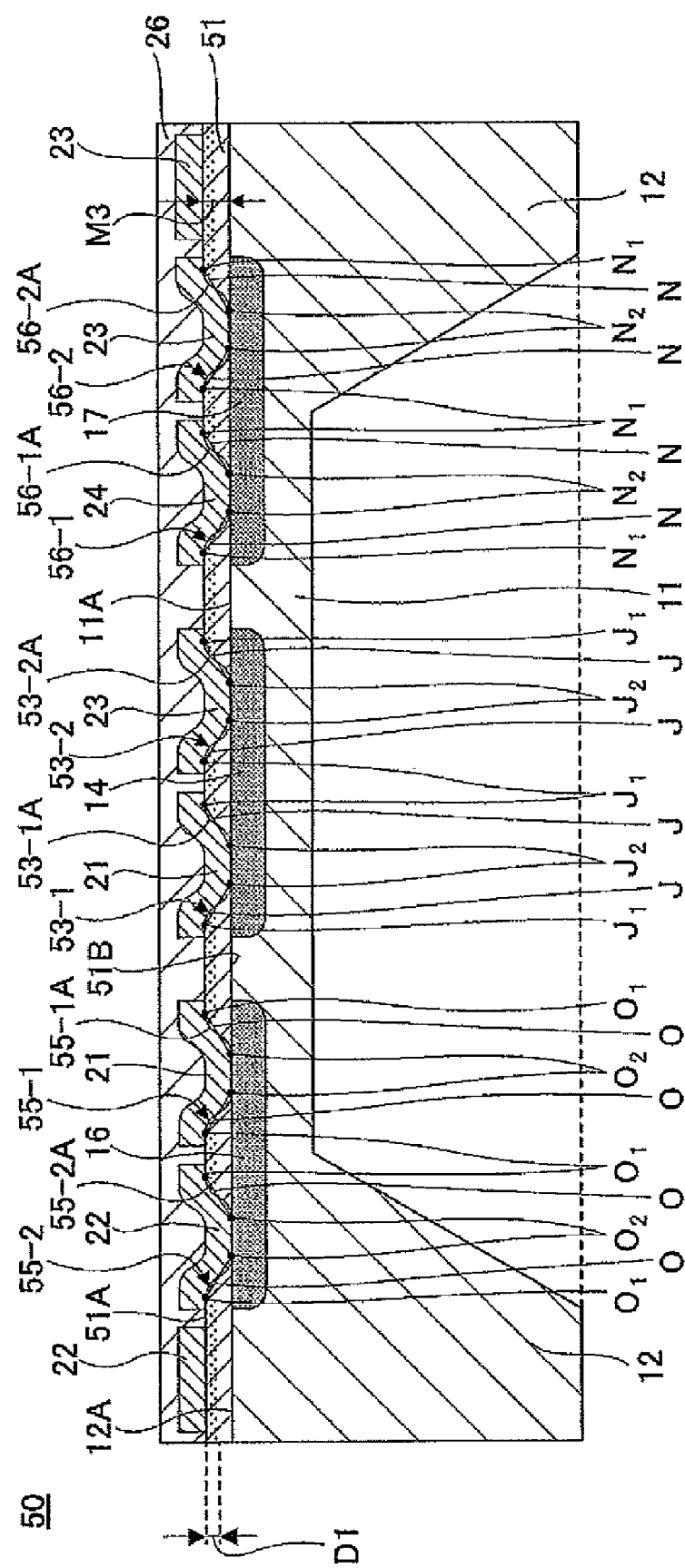
FIG. 23 is an illustration showing a cross section (example 1) of a semiconductor pressure sensor related to a second embodiment of the present invention.
Figure 24:
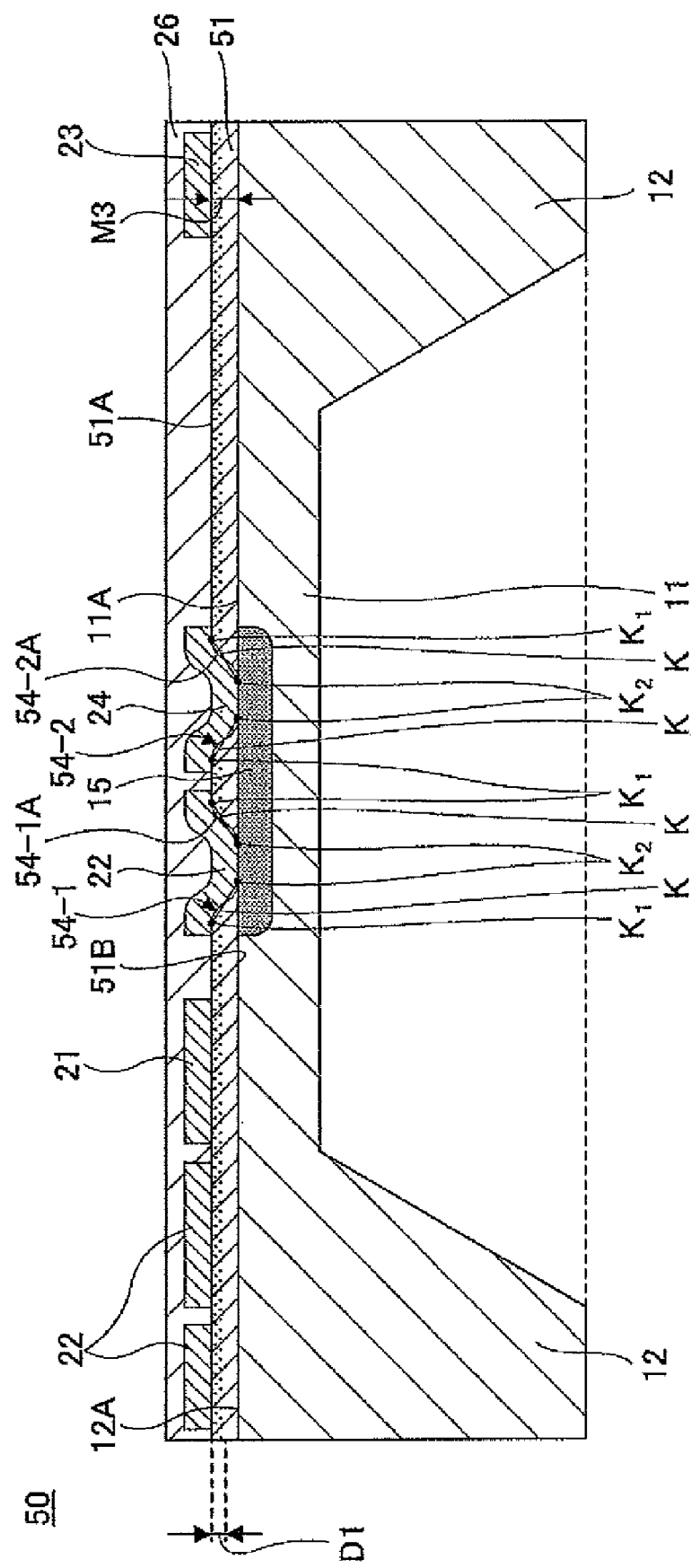
FIG. 24 is an illustration showing a cross section (example 2) of a semiconductor pressure sensor related to a second embodiment of the present invention.
Figure 25:
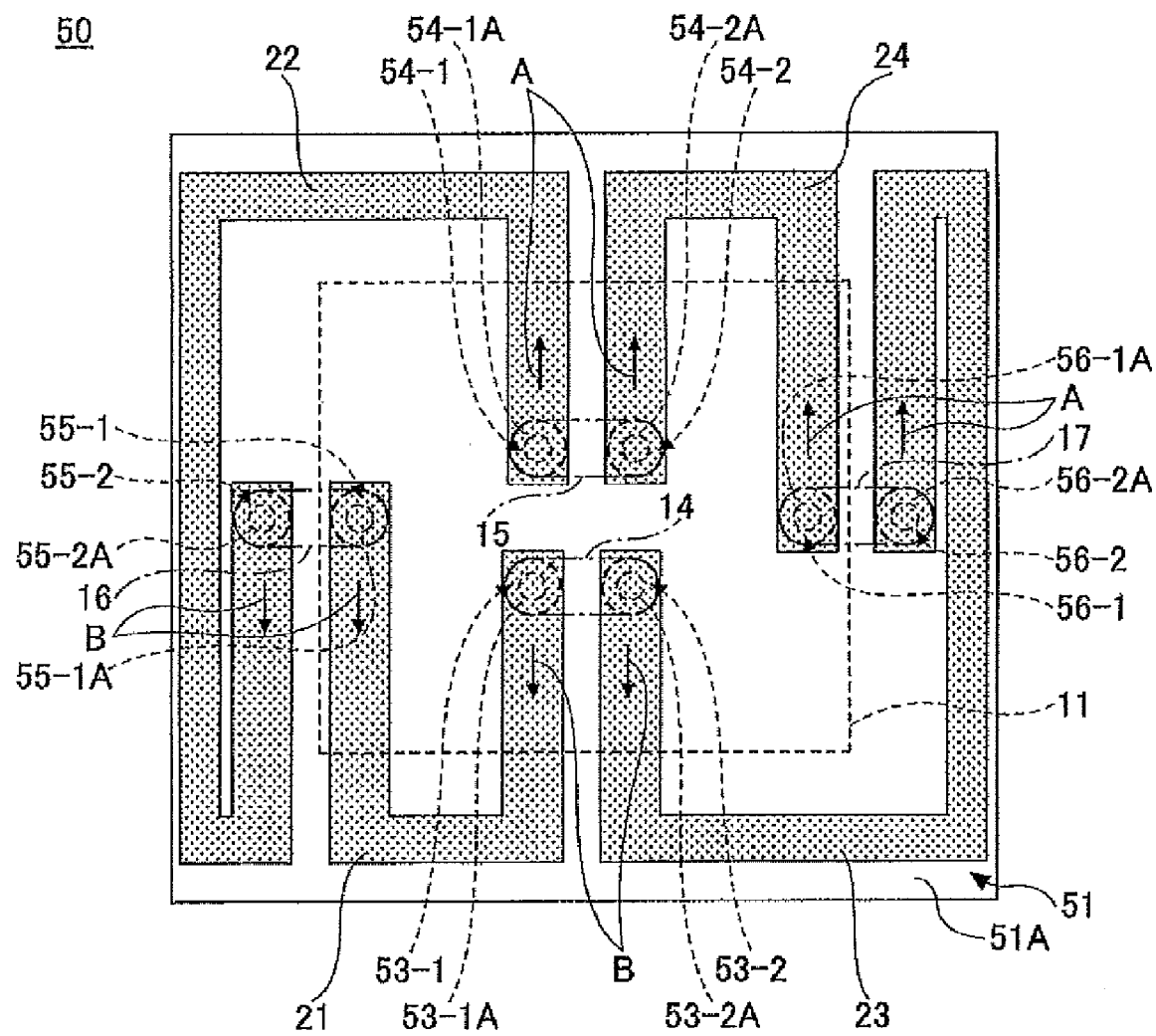
FIG. 25 shows a plan view of the semiconductor pressure sensor indicated in FIG. 23 and FIG. 24.

FIG. 23 and FIG. 24 are cross-sectional views of the semiconductor pressure sensor 50 related to the second embodiment of this invention. FIG. 25 shows a plan view of the semiconductor pressure sensor shown in FIG. 23 and FIG. 24. FIG. 23 and FIG. 24 show the cross-sectional view obtained when the semiconductor pressure sensor 50 is cut by an orthogonal plane of the top surface 11A of the diaphragm 11. The identical constituting parts used in the semiconductor pressure sensor 10 of the first embodiment are used In FIG. 23 through FIG. 25 with the same reference symbols. Further, the protection film 26 is omitted in FIG. 25 for convenience of description.

Referring to FIG. 23 through FIG. 25, the semiconductor pressure sensor 50 of the second embodiment includes an impurity doped insulating film 51 instead of the impurity doped insulating film 19 provided on the semiconductor pressure sensor 10 of the first embodiment; the rest of the structure of the semiconductor pressure sensor 51 is similar to that of the semiconductor pressure sensor 10.

The impurity doped insulating film 51 is formed to cover the top surface 11A of the diaphragm 11, the top surface 12A of the diaphragm support member 12, and part of the first and the second resistors 14 through 17. Penetrating parts 53-1, 53-2, 54-1, 54-2, 55-1, 55-2, 56-1, 56-2 are provided at the impurity doped insulating film 51. The impurity doped insulating film 51 is formed by an insulating film and impurities doped into the insulating film. In the impurity doped insulating film 51 approximately the top half of the film is doped with impurities. The thickness M3 of the impurity doped insulating film 51 may be approximately 1 μm, for example. When the thickness M3 of the impurity doped insulating film 51 is 1 μm, the doping depth D1 may be approximately 0.5 μm. As an insulating film forming the impurity doped insulating film 51, for example, an oxide film may be used. When an oxide film is used for the insulating film, the oxide film may be formed by a thermal oxidation method, a CVD method or the like. The impurity concentration doped into the impurity doped insulating film 51 is controlled to be higher at the side of the top surface 51A of the impurity doped insulating film 51, and the impurity concentration decreases toward the half thickness of the impurity doped insulating film 51.

In this manner, the impurity concentration of the impurity doped insulating film 51 is formed to be higher at the side of the top surface 51A of the impurity doped insulating film 51 and decreases toward the center of the impurity doped insulating film 51. As a result, an etching rate at the side of the top surface 51A of the impurity doped insulating film 51 can be greater than at part neat the center of the impurity doped insulating film 51. Thereby, the angles formed between the side planes 53-1A, 53-2A, 54-1A, 54-2A, 55-1A, 55-2A, 56-1A, and 56-2A of the penetrating parts 53-1, 53-2, 54-1, 54-2, 55-1, 55-2, 56-1, and 56-2, respectively, located near the top surface 51A of the impurity doped insulating film 51 and the bottom 51B of the impurity doped insulating film 51 can be formed smaller (specifically, equal to or less than 45 degrees) than an angle (close to 90 degrees) formed by a conventional process.

For the doping impurities described above, for example, ion implantation equipment may be used. Further, as impurity dopants, for example, P, B, As or the like may be used. When P is used for the impurity dopant, the average impurity dosage may be approximately $1.0 \times 10^{15}$ atoms/cm$^2$. Further, an acceleration voltage of the ion implantation equipment for P atoms may be approximately 80 kev for example.

The penetrating parts 53-1, 53-2 are formed to penetrate the impurity doped film 51 provided on the first resistor 14. The penetrating parts 53-1, 53-2 become wider from the bottom of the penetrating parts 53-1, 53-2 toward the top end of the penetrating parts 53-1, 53-2. The side plane 53-1A of the penetrating part 53-1 is provided with the wiring pattern 21 contacting the first resistor 14. The side plane 53-2A of the penetrating 53-2 is provided with the wiring pattern 23 contacting the first resistor 14. The penetrating parts 53-1, 53-2 are formed so that the distance (line) J between J1 and J2 is greater than the thickness M3 of the impurity doped insulating film 51 by a factor of the square root of two, where crossing points J1 are determined by meeting points between a plane orthogonal to the top surface 11A of the diaphragm 11 and the side planes 53-1A, 53-2A of the penetrating parts 53-1, 53-2, and crossing points J2 are determined by meeting points between a plane orthogonal to the top surface 11A of the diaphragm 11 and the bottom of the side planes 53-1A, 53-2A of the penetrating parts 53-1, 53-2.

In this manner, by providing that the line (distance) J between J1 and J2 is greater than the thickness M3 of the impurity doped insulating film 51 by a factor of the square root of two, angles formed between the side planes 53-1A, 53-2A of the penetrating parts 53-1, 53-2 and the bottom 51B of the impurity doped insulating film 51 can be to be equal or less than 45 degrees. As a result, a sufficient thick metallic film (base material of wiring patterns 21 through 24) can be formed on the side planes the side planes 53-1A, 53-2A of the penetrating parts 53-1, 53-2, so that the wiring patterns 21, 23 formed on the side planes 53-1A, 53-2A of the penetrating parts 53-1, 53-2 can be prevented from forming discontinuities.

The penetrating parts 54-1, 54-2 are formed to penetrate the impurity doped insulating film 51, which parts are positioned on the first resistor 15. The penetrating parts 54-1, 54-2 have shapes which become wider from the bottom of the penetrating parts 54-1, 54-2 toward the top ends of the penetrating parts 54-1, 54-2. The wiring pattern 22 is provided at the side plane 54-1A of the penetrating part 54-1 and contacts the first resistor 15. The wiring pattern 24 is provided at the side plane 54-2A of the penetrating part 54-2 and contacts the first resistor 15. For the penetrating parts 54-1, 54-2, a line K has a length greater than the thickness M3 of the impurity doped insulating film 51 by a factor of the square root of two. The line K is drawn between crossing points $K_1$ and $K_2$, and the crossing points K1 are located at meeting points between a plane orthogonal to the top plane 11A of the diaphragm 11 and the top ends of the side planes 54-1A, 54-2A of the penetrating parts 54-1, 54-2 and the crossing points K2 are located at meeting points between the orthogonal plane of the top surface 11A of the diaphragm 11 and the bottom of the side planes 54-1A, 54-2A of the penetrating parts 54-1, 54-2.

In this manner, by providing the length of lines K drawn between K1 and K2 to be greater than the thickness M3 of the impurity doped insulating film 51 by a factor of the square root of two, the angles formed between the side planes 54-1A, 54-2A of the penetrating parts 54-1, 54-2 and the bottom 51B of the impurity doped insulating film 51 can be equal or less than 45 degree. The crossing points K1 are located where a plane orthogonal to the top surface 11A of the diaphragm 11 meets the top ends of the side planes 54-1A, 54-2A of the penetrating parts 54-1, 54-2, and the crossing points K2 are located where a plane orthogonal to the top plane 11A of the diaphragm 11 meet with the bottoms of the side planes 54-1A, 54-2A. As a result, a sufficiently thick metallic film (base material of wiring patterns 21 through 24) can be formed on the side planes 54-1A, 54-2A of the penetrating parts 54-1, 54-2, so that the wiring patterns 22, 24 formed on the side planes 54-1A, 54-2A of the penetrating parts 54-1, 54-2 can be prevented from forming discontinuities.

The penetrating parts 55-1, 55-2 are formed to penetrate parts of the impurity doped insulating film 51, where the parts are located on the second resistor 16. The penetrating parts 55-1, 55-2 are formed to become wider from the bottom of the penetrating parts 55-1, 55-2 toward the top ends of the penetrating 55-1, 55-2. A wiring pattern 21 is provided at the side plane 55-1A of the penetrating part 55-1 to contact the second resistor 16. A wiring pattern 22 is provided at the side plane 55-2A of the penetrating part 55-2 to contact the second resistor 16. The penetrating parts 55-1, 55-2 are formed to have distances (lines) O greater than the thickness M3 of the impurity doped insulating film 51 by a factor of the square root of two. The line O is drawn between crossing points O1 and O2. The points O1 are located where a plane orthogonal to the top plane 11A of the diaphragm 11 meets the top ends of the side planes 55-1A, 55-2A of the penetrating parts 55-1, 55-2 and the points O2 are located where a plane orthogonal to the top plane 11A of the diaphragm 11 meets the bottoms of the side planes 55-1A, 55-2A of the penetrating parts 55-1, 55-2.

In this manner, by providing the length of lines K drawn between O1 and O2 to be greater than the thickness M3 of the impurity doped insulating film 51 by a factor of the square root of two, the angles formed between the side planes 55-1A, 55-2A of the penetrating parts 55-1, 55-2 and the bottom 51B of the impurity doped insulating film 51 can be equal or less than 45 degrees. The crossing points O1 are located where a plane orthogonal to the top surface 11A of the diaphragm 11 meets the top ends of the side planes 55-1A, 55-2A of the penetrating parts 55-1, 55-2, and the crossing points O2 are located where a plane orthogonal to the top plane 11A of the diaphragm 11 meets the bottoms of the side planes 55-1A, 55-2A. As a result, a sufficiently thick metallic film (base material of wiring patterns 21 through 24) can be formed on the side planes 55-1A, 55-2A of the penetrating parts 55-1, 55-2, so that the wiring patterns 21, 22 formed on the side planes 55-1A, 55-2A of the penetrating parts 55-1, 55-2 can be prevented from forming discontinuities.

The penetrating parts 56-1, 56-2 are formed to penetrate parts of the impurity doped insulating film 51, where the parts are located on the second resistor 17. A wiring pattern 23 is provided on the side plane 56-2A of the penetrating part 56-2 to contact the second resistor 17. The penetrating parts 56-1, 56-2 are formed to become wider from the bottom of the penetrating parts 56-1, 56-2 toward the top ends of the penetrating 56-1, 56-2. A wiring pattern 24 is provided at the side plane 56-LA of the penetrating part 56-1 to contact the second resistor 17. For the penetrating parts 56-1, 56-2, a line N having a length being greater than the thickness M3 of the impurity doped insulating film 51 by a factor of the square root of two is formed. The line N is drawn between crossing points N1₁ and N2, and the crossing points N1 are located at meeting points between a plane orthogonal to the top plane 11A of the diaphragm 11 and the top ends of the side planes 56-1A, 56-2A of the penetrating parts 56-1, 56-2 and the crossing points N2 are located at meeting points between a plane orthogonal to the top surface 11A of the diaphragm 11 and the bottom of the side planes 56-1A, 56-2A of the penetrating parts 56-1, 56-2.

In this manner, by providing the length of lines N drawn between N1 and N2 to be greater than the thickness M3 of the impurity doped insulating film 51 by a factor of the square root of two, the angles formed between the side planes 56-1A, 56-2A of the penetrating parts 56-1, 56-2 and the bottom 51B of the impurity doped insulating film 51 can be equal or less than 45 degree. The crossing points N1 are located where a plane orthogonal to the top surface 11A of the diaphragm 11 meets the top ends of the side planes 56-1A, 56-2A of the penetrating parts 56-1, 56-2, and the crossing points N2 are located where a plane orthogonal to the top plane 11A of the diaphragm 11 meets the bottoms of the side planes 56-1A, 56-2A. As a result, a sufficiently thick metallic film (base material of wiring patterns 21 through 24) can be formed on the side planes 56-1A, 56-2A of the penetrating parts 56-1, 56-2, so that the wiring patterns 23, 24 formed on the side planes 56-1A, 56-2A of the penetrating parts 56-1, 56-2 can be prevented from forming discontinuities.

According to the semiconductor pressure sensor of this embodiment of the present invention, by making the distances (lines) J, K, N, O to be greater than the thickness X of the impurity doped insulating film 19 by a factor of the square root of two, in which the lines J, K, N, and O are drawn between the crossing points $J_1$, $K_1$, $N_1$, and $O_1$ where planes orthogonal to the top plane 11A of the diaphragm 11 meet the tops of the side planes 53-1A, 53-2A, 54-1A, 54-2A, 55-2A, 56-1A, and 56-2A of the penetrating parts 53-1, 53-2, 54-1, 54-2, 55-1, 55-2, 56-1, and 56-2 and the crossing points J2, K2, N2, O2 where planes orthogonal to the top plane 11A of the diaphragm 11 meet the bottoms of the side planes 53-1A, 53-2A, 54-1A, 54-2A, 55-1A, 55-2A, 56-1A, and 56-2A of the penetrating parts 53-1, 53-2, 54-1, 54-2, 55-1, 55-2, 56-1, and 56-2. As a result, the angles formed between the side planes 53-1A, 53-2A, 54-1A, 54-2A, 55-1A, 55-2A, 56-1A, and 56-2A of the penetrating parts 53-1, 53-2, 54-1, 54-2, 55-1, 55-2, 56-1, and 56-2, respectively, and the bottom 51B of the impurity doped insulating film 51 become smaller than 45 degrees. Thereby, a sufficiently thick metal film (base material of the wiring patterns 21 through 24) can be formed at the side planes 53-1A, 53-2A, 54-1A, 54-2A, 55-1A, 55-2A, 56-1A, and 56-2A of the penetrating parts 53-1, 53-2, 54-1, 54-2, 55-1, 55-2, 56-1, and 56-2, so that the wiring patterns 21 through 24 formed at the side planes 53-1A, 53-2A, 54-1A, 54-2A, 55-1A, 55-2A, 56-1A, 56-2R of the penetrating parts 53-1, 53-2, 54-1, 54-2, 55-1, 55-2, 56-1, 56-2 can be prevented from forming discontinuities.

FIG. 26 through FIG. 30 show the manufacturing process of the semiconductor pressure sensor of the second embodiment of this invention. In FIG. 26 through FIG. 30, for the identical parts of the semiconductor pressure sensor 50 of the second embodiment, the same reference symbols are used. Further, in FIG. 26 through FIG. 30, the first resistor 15, the penetrating parts 54-1, 54-2, the crossing points K1, K2, and the line K shown in FIG. 24 described above are omitted for convenience of description.

The manufacturing process of the semiconductor pressure sensor 50 of the second embodiment is described by referring to FIG. 26 through FIG. 30. First, by processing the process steps shown in FIG. 12 and FIG. 13 of the first embodiment, the first and second resistors 14 through 17 and the insulating film 39 are formed on the semiconductor 37.

Figure 26:
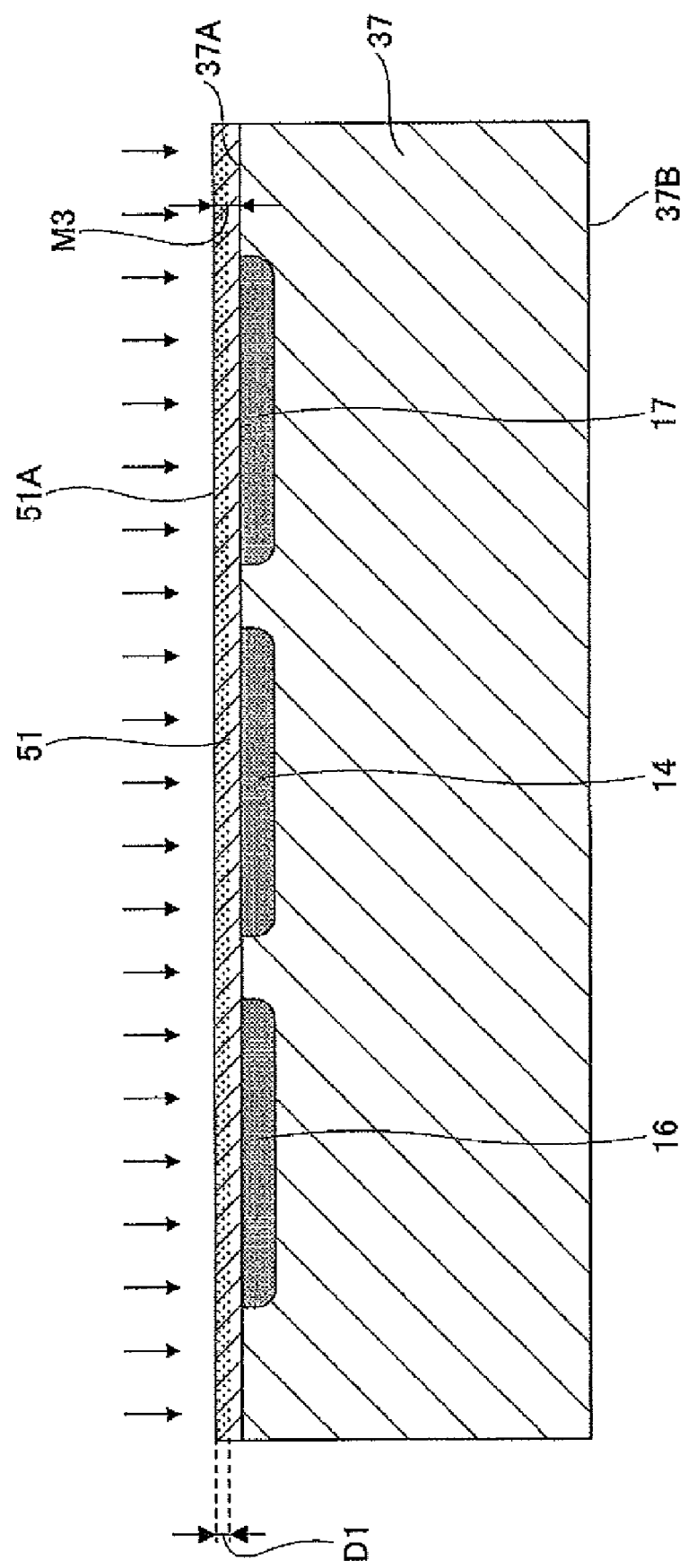
FIG. 26 is an illustration (example 1) showing a fabrication process of the semiconductor pressure sensor related to the second embodiment of the present invention.

Next, at the process step of FIG. 26, impurities are doped into a top half thickness of the insulating film 39 provided in the structure shown in FIG. 13 from the top surface 39A of the insulating film 39, and the impurity doped insulating film 51 is formed (impurity doped insulating film formation process). As impurity dopants to be doped into the insulating film 397 for example, P, B, As or the like may be used. For impurity doping equipment, for example, ion implantation equipment may be used. When P atoms are used as the impurity, an acceleration voltage of the ion implantation equipment may be approximately 80 keV, for example. Further, the average impurity dosage of the P as impurities may be approximately $1.0 \times 10^{15}$ atoms/cm$^2$, for example. The thickness M3 of the impurity doped insulating film 51 may be approximately 1 μm, for example. When the film thickness M3 of the impurity doped insulating film 51 is 1 μm, the impurity doped thickness D1 may be approximately 0.5 μm, for example.

In this manner, the impurity doped insulating film 51 is formed by doping impurities into the top half film thickness of the insulating film 39 from the top surface 39A of the insulating film 39, and the impurity concentration becomes higher at the top surface 51A of the impurity doped insulating film 51 and becomes lower toward the center of the impurity doped insulating film 51. As a result, the etching rate at the top surface 51A of the impurity doped insulating film 51 becomes greater than the etching rate near the center of the impurity doped insulating film 51.

Figure 27:
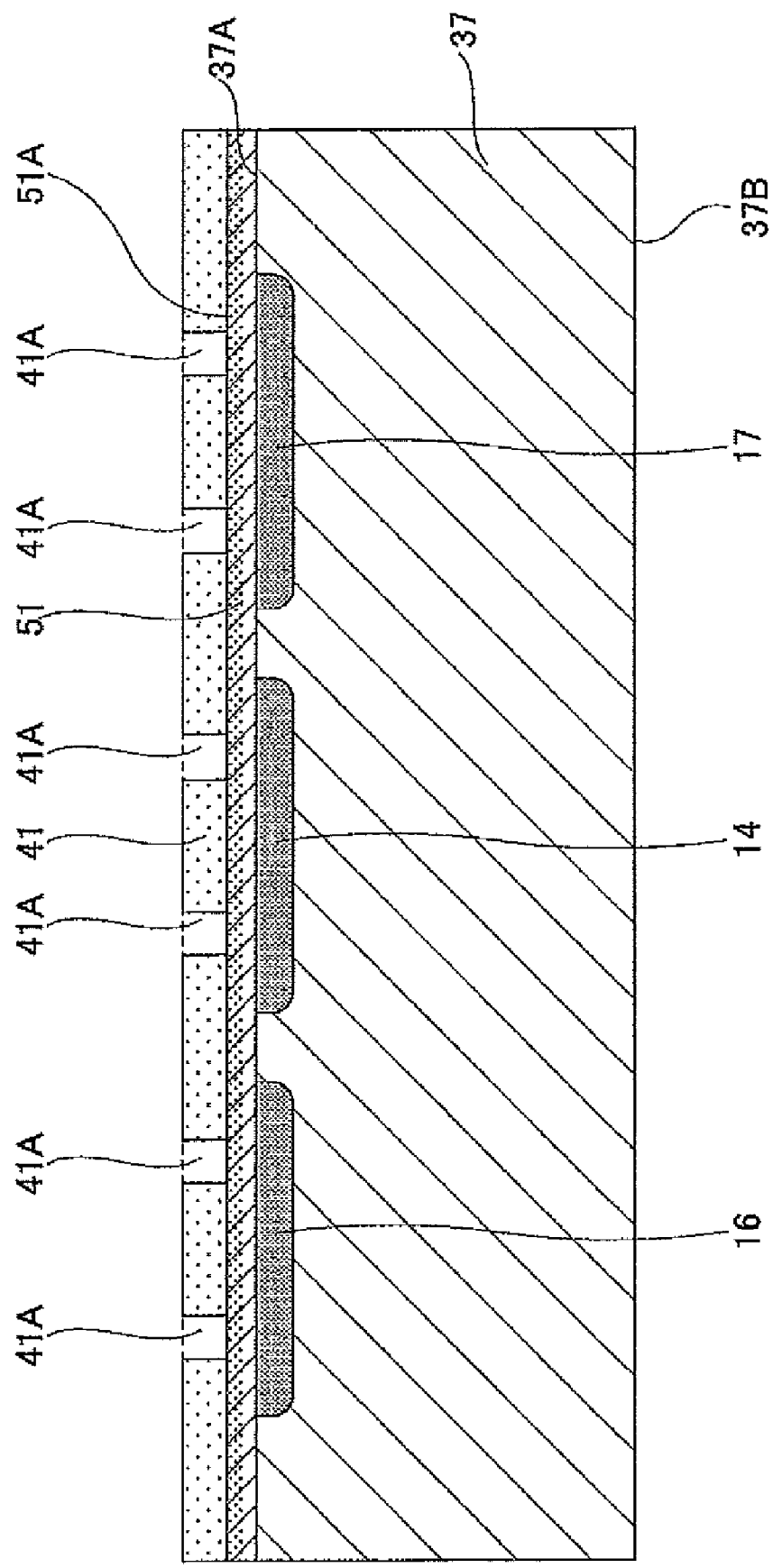
FIG. 27 is an illustration (example 2) showing a fabrication process of the semiconductor pressure sensor related to the second embodiment of the present invention.

Next, in the process step shown in FIG. 27, a resist film 41 having plural openings 41A is formed on the impurity doped insulating film 51 (resist formation process). The openings 41A are formed to expose parts of the top surface 51A of the impurity doped insulating film 51 corresponding to formation parts of the penetrating parts 53-1, 53-2, 54-1, 54-2, 55-1, 55-2, 56-1, and 56-2. The resist film 41 is a mask for forming the penetrating parts 53-1, 53-2, 54-1, 54-2, 55-1, 55-2, 56-1 and 56-2 by etching the impurity doped insulating film 51 using a wet etching process.

Figure 28:
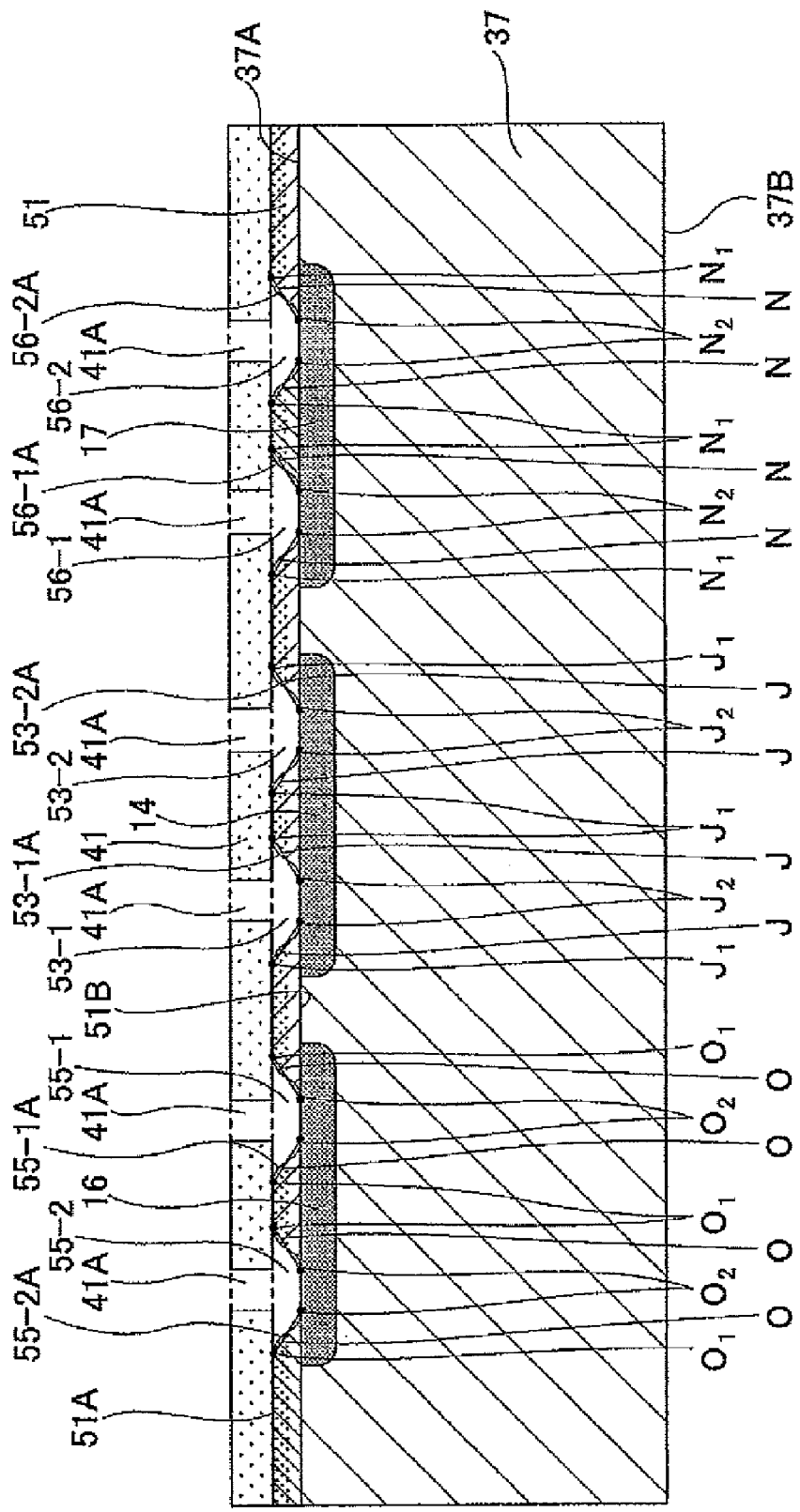
FIG. 28 is an illustration (example 3) showing a fabrication process of the semiconductor pressure sensor related to the second embodiment of the present invention.

Next, in a process of FIG. 28, the impurity doped insulating film 51 is etched by wet etching using the resist film 41 as the mask until the first and second resistors 14 through 17 are exposed, and the penetrating parts 53-1, 53-2, 54-1, 54-2, 55-1, 55-2, 56-1, 56-2 are formed (penetrating part formation process).

In this manner, the impurity doped insulating film 51 is formed to have the etching rate at part of the top surface 51A side of the impurity doped insulating film 51 being greater than the etching rate at part near the center of the impurity doped insulating film 51, the side planes 53-1A, 53-2A, 54-1A, 54-2A, 55-1A, 55-2A, 56-1A, 56-2A of the penetrating parts 53-1, 53-2, 54-1, 54-2, 55-1, 55-2, 56-1, 56-2 can be formed to have a gentle slope.

Further, in the penetrating part formation process, the penetrating parts 53-1, 53-2, 54-1, 54-2, 55-1, 55-2, 56-1, 56-2 are formed to have the line lengths of J, K, N, O being longer than the thickness M3 of the impurity doped insulating film 51 by a factor of a square root of two. The lines J, K, N, O are drawn between J1, K1, N1, O1 and J2, K2, N2, O2. The crossing points J1, K1, N1, O1 are located at which the orthogonal plane of the top surface 37A of the semiconductor 37 meet the top ends of the side planes 53-1A, 53-2A, 54-1A, 54-2A, 55-1A, 55-2A, 56-1A, 56-2A of the penetrating parts 53-1, 53-2, 54-1, 54-2, 55-1, 55-2, 56-1, 56-2, and the crossing points J2, K2, N2, O2 are located at which the top 37A of the semiconductor substrate 37 meet the side planes 53-1A, 53-2A, 54-1A, 54-2A, 55-1A, 55-2A, 56-1A, 56-2A of the penetrating parts 53-1, 53-2, 54-1, 54-2, 55-1, 55-2, 56-1, 56-2.

In this manner, by forming the penetrating parts 53-1, 53-2, 54-1, 54-2, 55-1, 55-2, 56-1, 56-2 being formed to have the line lengths of J, K, N, O being longer than the thickness M3 of the impurity doped insulating film 51 by a factor of a square root of two, the angles formed by the side planes 53-1A, 53-2A, 54-1A, 54-2A, 55-1A, 55-2A, 56-1A, 56-2A of the penetrating parts 53-1, 53-2, 54-1, 54-2, 55-1, 55-2, 56-1, 56-2 and the bottom 51B of the impurity doped insulating film 51 can be equal or smaller than 45 degrees. The crossing points J1, K1, N1, O1 are located at which the orthogonal plane of the top surface 37A of the semiconductor substrate 37 meet the top ends of the side planes 53-1A, 53-2A, 54-1A, 54-2A, 55-1A, 55-2A, 56-1A, 56-2A of the penetrating parts 53-1, 53-2, 54-1, 54-2, 55-1, 55-2, 56-1, 56-2, and the crossing points J2, K2, N2, O2 are located at which the orthogonal plane of the top surface 11A of the diaphragm 11 meet the bottom of the side planes 53-1A, 53-2A, 54-1A, 54-2A, 55-1A, 55-2A, 56-1A, 56-2A of the penetrating parts 53-1, 53-2, 54-1, 54-2, 55-1, 55-2, 56-1, 56-2.

Next in the process shown in FIG. 20, the resist film 41 shown in FIG. 28 is removed. In the process shown in FIG. 30, the metallic film 43 is formed to cover the structure of FIG. 29 (metallic film formation process). The metallic film 43 is patterned, and the wiring patterns 21 through 24 are formed. For the metallic film 43, for example, an Al film may be used. When an Al film is used for the metallic film 43, the metallic film 43 may be formed by a sputtering method, for example. For using Al film as the metallic film 43, the thickness of the metallic film 43 on the top surface 51A of the impurity doped insulating film 51 may be approximately 0.5 μm, for example.

In this manner, the angle formed between the side planes 53-1A, 53-2A, 54-1A, 54-2A, 55-1A, 55-2A, 56-1A, 56-2A of the penetrating parts 53-1, 53-2, 54-1, 54-2, 55-1, 55-2, 56-1, 56-2 and the bottom 51B of the impurity doped insulating film 51 is equal or less than 45 degrees, and the metallic film 45 is formed for the side planes 53-1A, 53-2A, 54-1A, 54-2A, 55-1A, 55-2A, 56-1A, 56-2A of the penetrating parts 53-1, 53-2, 54-1, 54-2, 55-1, 55-2, 56-1, 56-2, and so that a sufficient thick metallic film 43 (to be effective to prevent the wiring patterns 21 through 24 from forming discontinuities) can be formed for the side planes 53-1A, 53-2A, 54-1A, 54-2A, 55-1A, 55-2A, 56-1A, 56-2A of the penetrating parts 53-1, 53-2, 54-1, 54-2, 55-1, 55-2, 56-1, 56-2. Thereby, the wiring patterns 21 through 24 formed for the side planes 53-1A, 53-2A, 54-1A, 54-2A, 55-1A, 55-2A, 56-1A, 56-2A of the penetrating parts 53-1, 53-2, 54-1, 54-2, 55-1, 55-2, 56-1, 56-2 may be prevented from forming discontinuities.

After the process, similar process steps shown in FIG. 19 through FIG. 21 are performed and the wiring patterns 21 through 24, a protection film 26, a diaphragm 11, and a diaphragm support member 12 are formed, then the semiconductor pressure sensors 50 shown in FIG. 23 and FIG. 24 are formed. [NOTE: The reference number 50 appears in FIGS. 23 and 24, not 13 and 14].

According to the semiconductor pressure sensor manufacturing method of the present embodiment, the impurity concentration is high at the side of the top surface 51A of the impurity doped insulating film 51 and is decreased toward the center in thickness of the impurity doped insulating film 51. The impurity doped insulating film 51 is wet-etched and the lines J, K, N, O become greater than the thickness M3 of the impurity doped insulating film 51 by a factor of a square root of two, in which the crossing points J1, K1, N1, O1 are located at which the orthogonal plane of the top surface 37A of the semiconductor substrate 37 meet the side planes 53-1A, 53-2A, 54-1A, 54-2A, 55-1A, 5S-2A, 56-1A, 56-2A of the penetrating parts 53-1, 53-2, 54-1, 54-2, 55-1, 55-2, 56-1, 56-2. The crossing points J2, K2, N2, O2 are located where the orthogonal plane 37A of the semiconductor substrate 37 meets the bottom of the side planes 53-1A, 53-2A, 54-1A, 54-2A, 55-1A, 55-2A, 56-1A, 56-2A of the penetrating parts 53-1, 53-2, 54-1, 54-2, 55-1, 55-2, 56-1, 56-2. The penetrating parts 53-1, 53-2, 54-1, 54-2, 55-1, 55-2, 56-1, 56-2 are formed by the above manner, so that the angles formed between the side planes 53-1A, 53-2A, 54-1A, 54-2A, 55-1A, 55-2A, 56-1A, 56-2A of the penetrating parts 53-1, 53-2, 54-1, 54-2, 55-1, 55-2, 56-1, 56-2 and the bottom 51B of the impurity doped insulating film 51 become equal or smaller than 45 degrees. As a result, a sufficient thickness of the metallic film 43 (base materials of the wiring patterns 21 through 24) can be formed for the side planes 53-1A, 53-2A, 54-1A, 54-2A, 55-1A, 55-2A, 56-1A, 56-2A of the penetrating parts 53-1, 53-2, 54-1, 54-2, 55-1, 55-2, 56-1, 56-2. The wiring patterns 21 through 24 formed for the side planes 53-1A, 53-2A, 54-1A, 54-2A, 55-1A, 55-ZA, 56-1A, 56-2A of the penetrating parts 53-1, 53-2, 54-1, 54-2, 55-1, 55-2, 56-1, 56-2 can be prevented from forming discontinuities.

Third Embodiment

Figure 37:
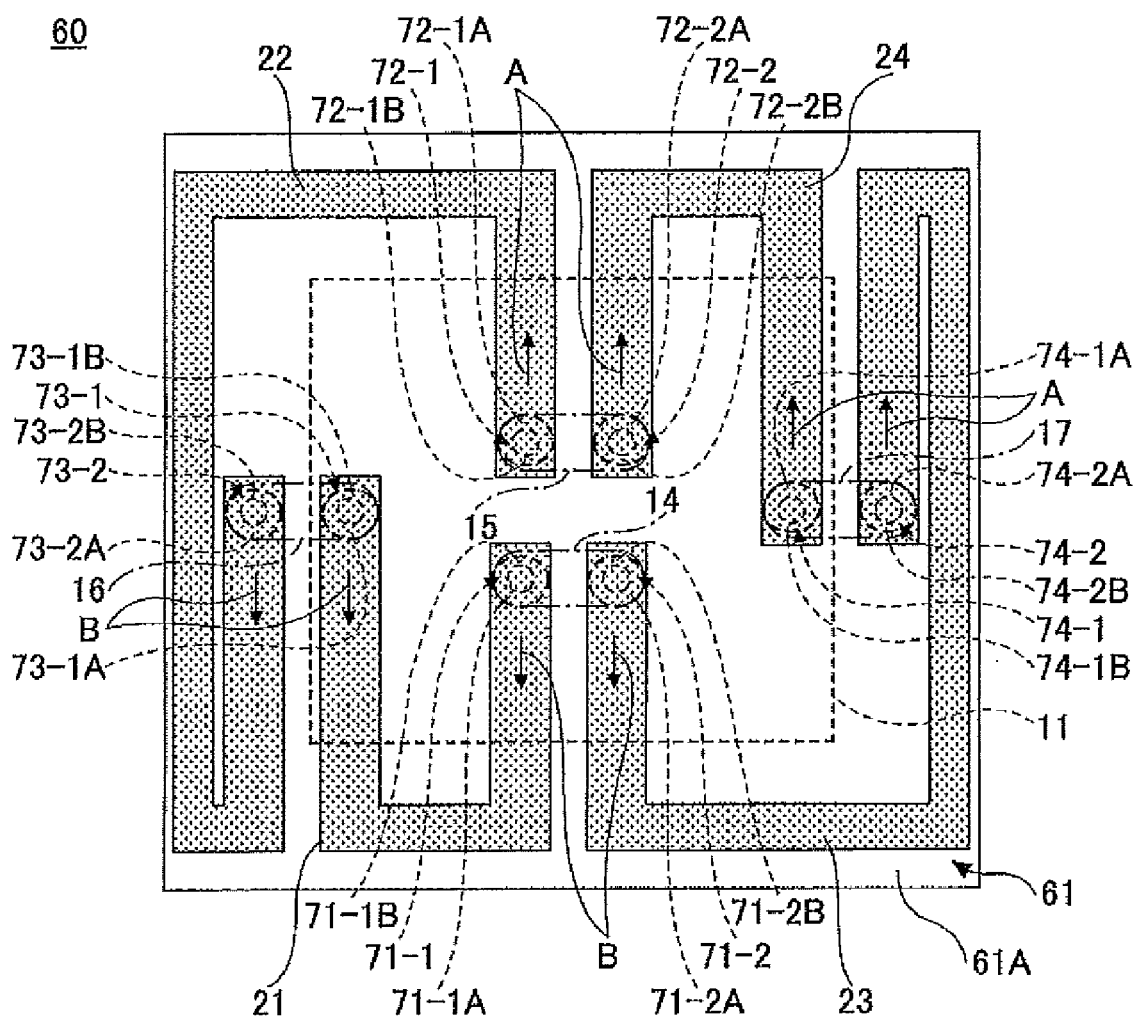
FIG. 37 shows a plan view of the semiconductor pressure sensor of the third embodiment of the present invention.

FIG. 31 through FIG. 36 show cross-sections of the semiconductor pressure sensor related to the third embodiment of this invention, and FIG. 37 is a plan view of the semiconductor pressure sensor related to the third embodiment of this invention, FIG. 31 through FIG. 36 show cross-sectional views of the semiconductor pressure sensor 60 to be cut at an orthogonal plane of the top surface 11A of the diaphragm 11. For FIG. 31 through FIG. 37, identical constituting parts used in the semiconductor pressure sensor 10 of the first embodiment have the same reference symbols. Further, in FIG. 37, the protection film 26 is omitted for convenience of description.

Referring to FIG. 31 through FIG. 36, the semiconductor pressure sensor 60 of the third embodiment is constituted to be similar to the semiconductor pressure sensor 10 of the first embodiment, except that an impurity doped insulating film 61 is used instead of the impurity doped insulating film 19 of the semiconductor pressure sensor 10 of the first embodiment.

The impurity doped insulating film 61 is formed on the top surface 11A of the diaphragm 11, parts of the first and second resistors 14 through 17, and the top surface 12A of the diaphragm support member 12. For the impurity doped insulating film 61, the penetrating parts 71-1, 71-2, 72-1, 72-2, 73-1, 73-2, 74-1, 74-2 are formed. The impurity doped insulating film 61 is formed of an insulating film and impurities doped into the insulating film. The impurity doped insulating film 61 includes the insulating film which is doped into the parts that only correspond to the side planes 71-1A, 71-2A, 72-1A, 72-2A, 73-1A, 73-2A, 74-1A, 74-2A of the penetrating parts 71-1, 71-2, 72-1, 72-2, 73-1, 73-2, 74-1, 74-2. In short, the impurity doped insulating film 61 includes impurities being partially doped in the insulating film. The doping depth of impurities into the insulating film may be approximately equal to the thickness of the insulating film, for example.

The impurity doped insulating film 61 may have a film thickness M4 of approximately 1 μm, for example. When the impurity doped insulating film 61 has the thickness M4 of 1 μm, the impurity doping depth may be approximately 1.0 μm, for example. As an insulating film used for the impurity doped insulating film 61, for example, an oxide film may be used. When the oxide film is used for the insulating film above, thermal oxidation method, CVD method or the like may be used. The part of the impurity concentration of the impurity doped insulating film 61 doped with impurities is controlled to have higher concentration at the top surface 61A side of the impurity doped insulating film 61 and the concentration decreases toward the bottom 61B side of the impurity doped insulating film 61.

In this manner, the impurity concentration at the top surface 61A side of the impurity doped insulating film 61 is higher and becomes lower toward the bottom 61 side of the impurity doped insulating film 61. As a result, the impurity doped insulating film 61 can have the etching rate at part of the top surface 61A side of the impurity doped insulating film 61 being greater than the etching rate at part near the bottom 61B side of the impurity doped insulating film 61. By this manner, the side planes 71-1A, 71-2A, 72-1A, 72-2A, 73-1A, 73-2A, 74-1A, 74-2A of the penetrating parts 71-1, 71-2, 72-1, 72-2, 73-1, 73-2, 74-1, 74-2, which are located between parts of the wiring patterns 21 through 24 formed on the top surface of the first and second resistors 14 through 17 and parts of the wiring patterns 21 through 24 formed on the top surface 61A of the impurity doped insulating film 61, are formed to be gentle slopes.

As impurity dopants to be doped into the above insulating film, for example, P, B, As or the like may be used. For impurity doping equipment, for example, ion implantation equipment may be used. When P atoms are used as the impurity, an acceleration voltage of the ion implantation equipment may be approximately 80 keV, for example. Further, the average impurity dosage of the P as impurities may be approximately $1.0 \times 10^{15}$ atoms/com², for example. The thickness M3 of the impurity doped insulating film 51 may be approximately 1 μm, for example.

Figure 29:
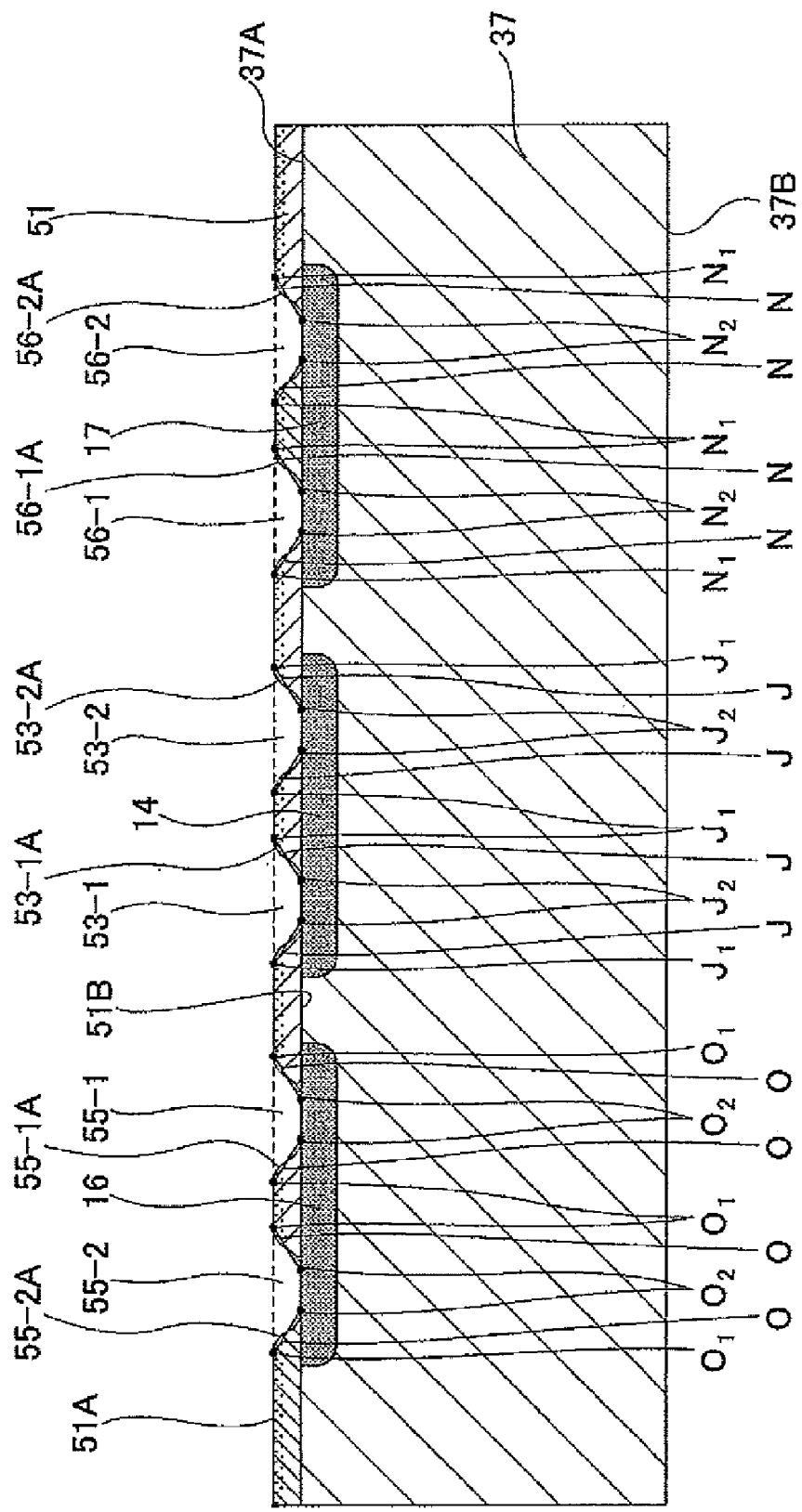
FIG. 29 is an illustration (example 4) showing a fabrication process of the semiconductor pressure sensor related to the second embodiment of the present invention.
Figure 30:
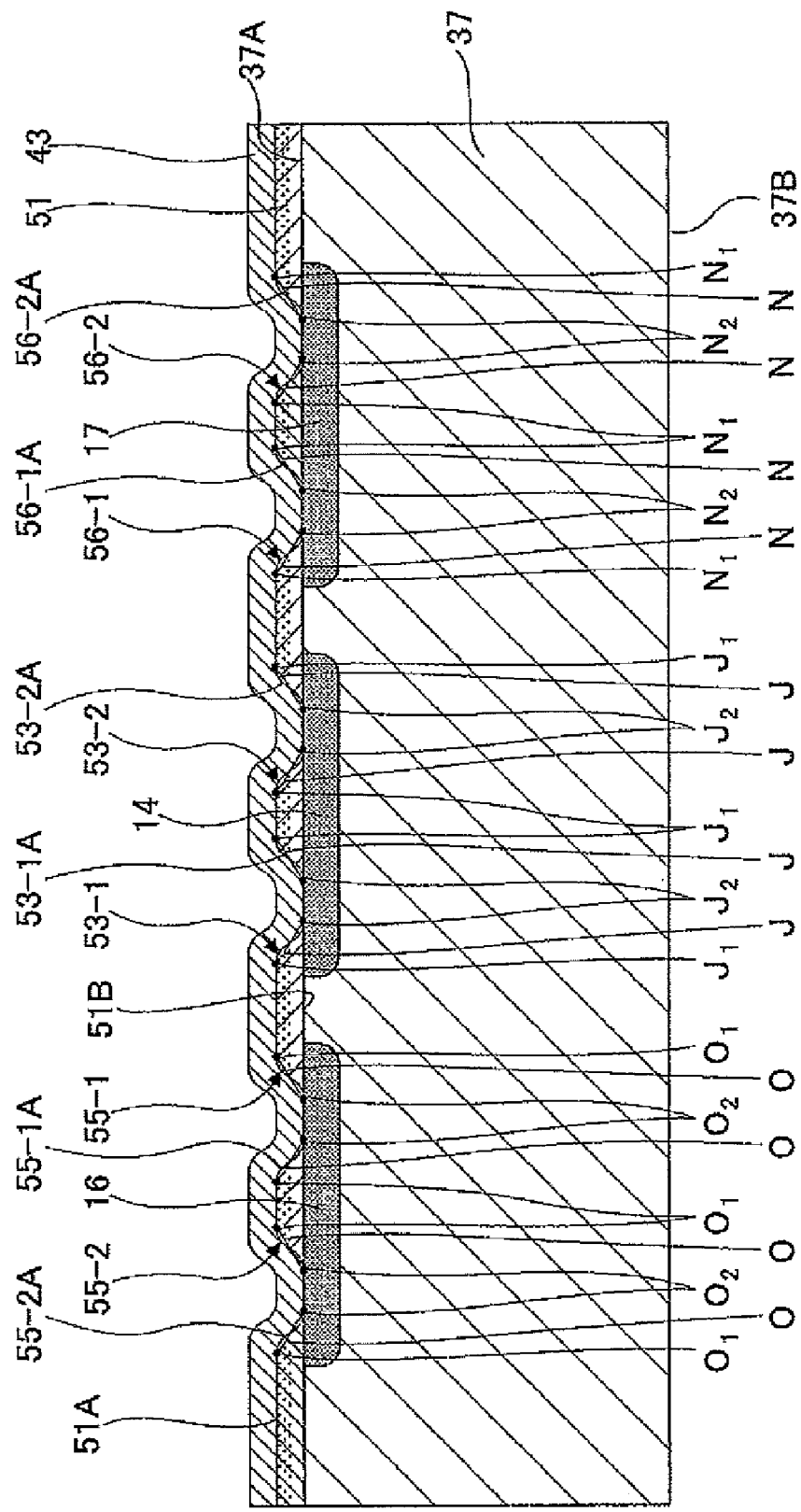
FIG. 30 is an illustration (example 5) showing a fabrication process of the semiconductor pressure sensor related to the second embodiment of the present invention.
Figure 31:
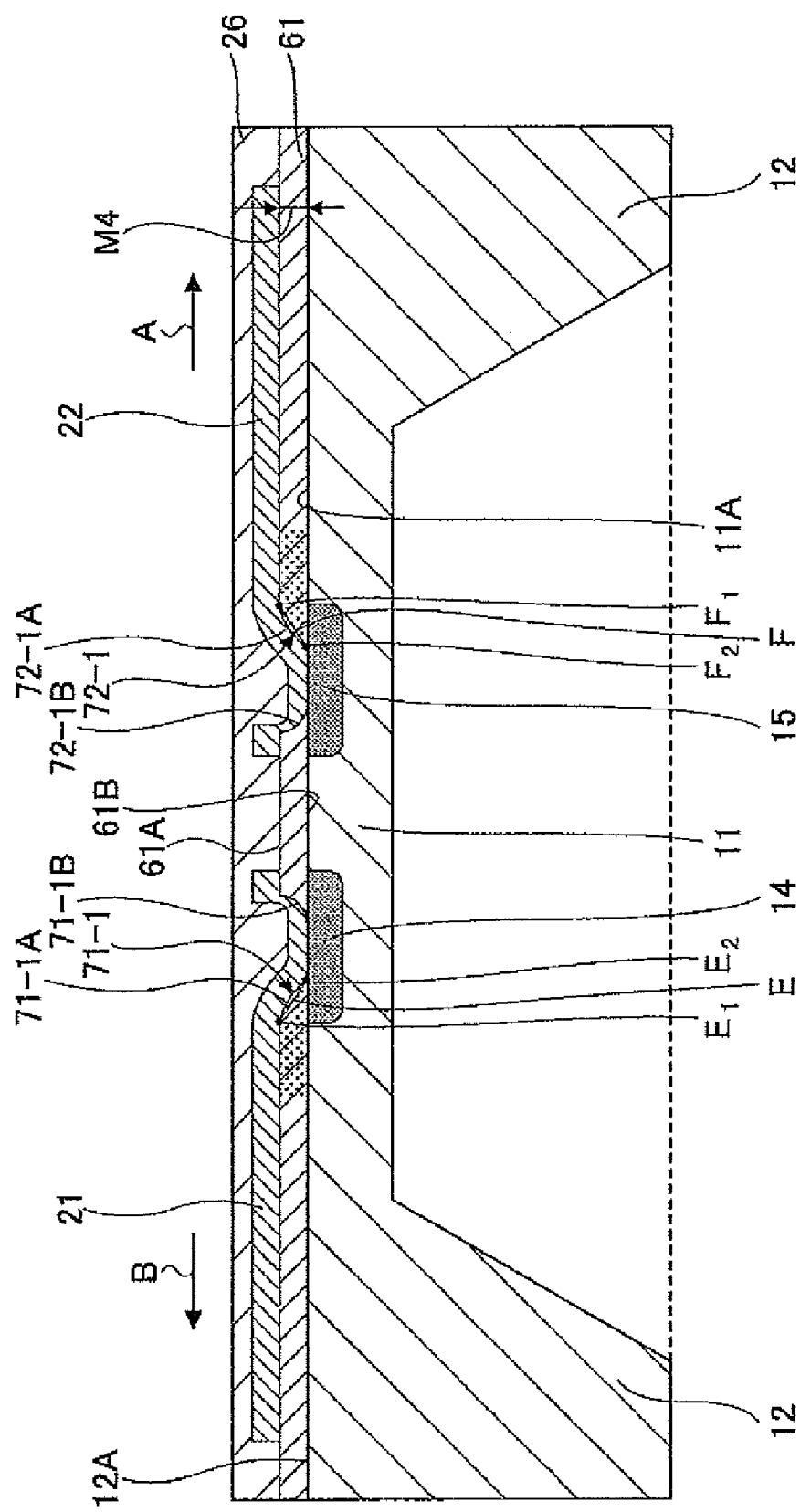
FIG. 31 is an illustration showing a cross section (example 1) of a semiconductor pressure sensor related to a third embodiment of the present invention.
Figure 32:
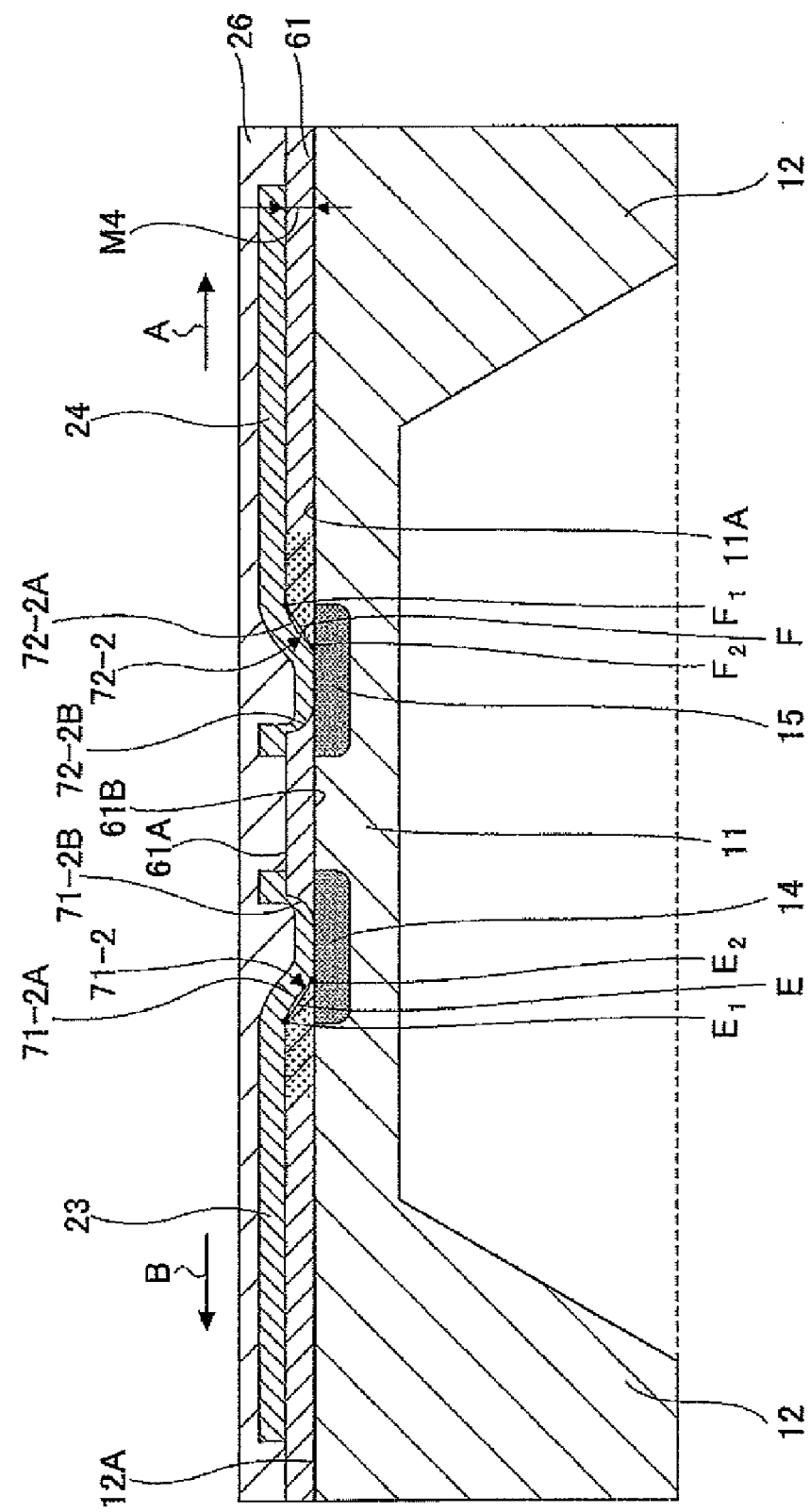
FIG. 32 is an illustration showing a cross section (example 2) of a semiconductor pressure sensor related to the third embodiment of the present invention.
Figure 33:
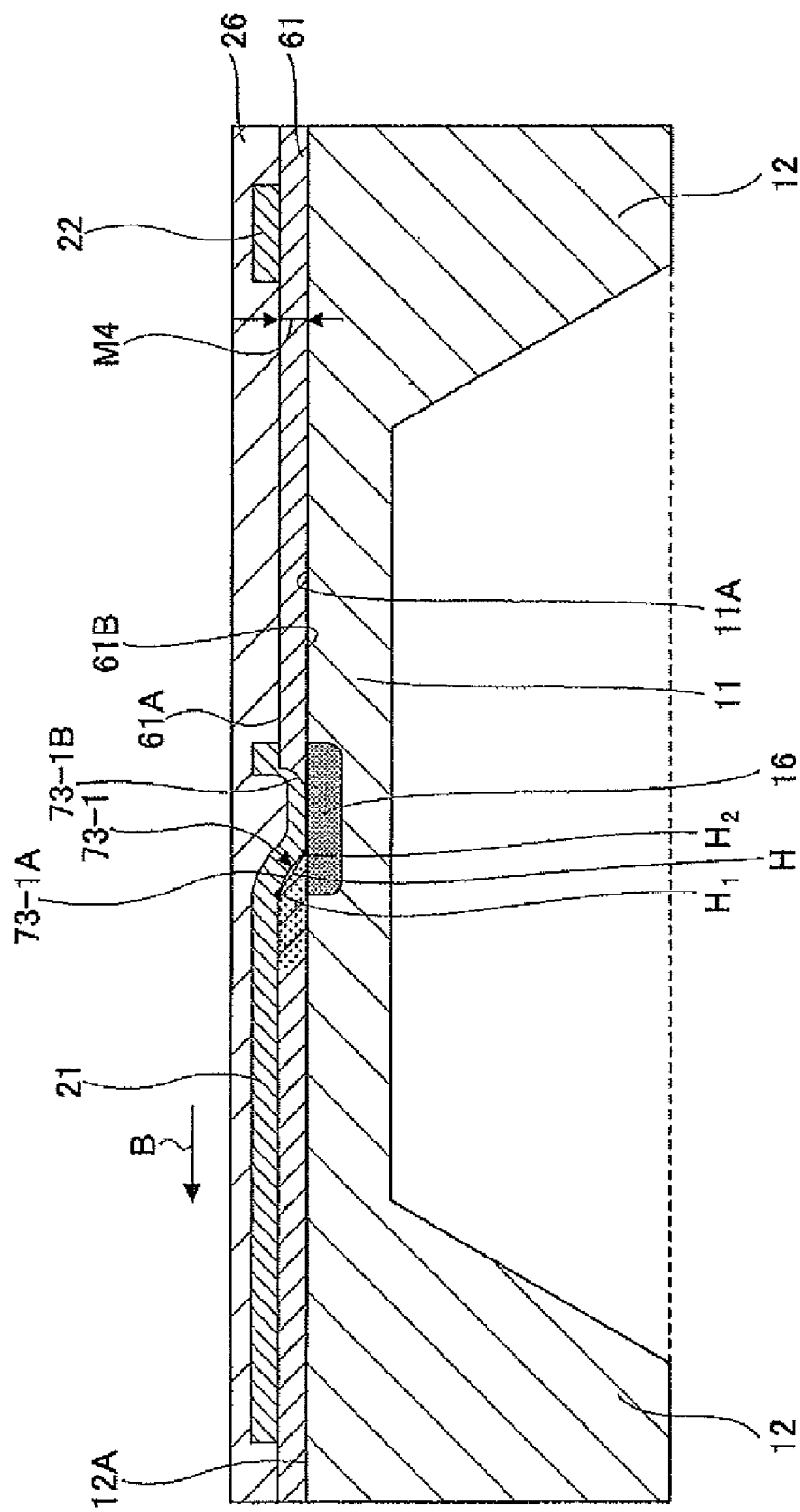
FIG. 33 is an illustration showing a cross section (example 3) of a semiconductor pressure sensor related to the third embodiment of the present invention.

Referring to FIG. 31, FIG. 32, and FIG. 29, the penetrating parts 71-1, 71-2 are formed to penetrate part of the impurity doped insulating film 61 provided on the first resistor 14. The penetrating parts 71-1, 71-2 are formed to expose parts of the top surface of the first resistor 14. The penetrating parts 71-1, 71-2 have shapes which become wider from the bottom of the penetrating parts 71-1, 71-2 toward the top ends of the penetrating parts 71-1, 71-2.

The penetrating part 71-1 includes the side plane 71-1A formed by doping impurity into the insulating film and the side plane 71-1B formed as part of the side plane 71-1A where the insulating film is not doped by the impurity. At the side plane 71-1A and the bottom of the penetrating part 71-1, the wiring pattern 21 is provided being extended toward the B direction. The side plane 71-1A of the penetrating part 71-1 have a similar shape to the side plane 31-1A of the penetrating part 31-1 described in the first embodiment. The penetrating part 71-1 is formed to have a line E being greater than the thickness M4 of the impurity doped insulating film 61 by a factor of a square root of two, in which the line E is drawn between a crossing point E1 where an orthogonal plane of the top plane 11A of the diaphragm 11 meets the top-end of the side plane 71-1A of the penetrating part 71-1 and a crossing point E2 where the orthogonal plane of the top surface 11A of the diaphragm 11 meets the bottom of the side plane 71-1A of the penetrating part 71-1.

The penetrating part 71-2 includes the side plane 712A formed by doping impurity into the insulating film and the side plane 71-2B formed as part of the side plane 71-2A where the insulating film is undoped by the impurity. At the side plane 71-2A and the bottom of the penetrating part 71-2, the wiring pattern 23 is provided being extended toward the B direction. The side plane 71-2A of the penetrating part 71-2 has a similar shape to the side plane 31-2A of the penetrating part 31-2 described in the first embodiment. The penetrating part 71-2 is formed to have a line E being greater than the thickness M4 of the impurity doped insulating film 61 by a factor of a square root of two, in which the line E is drawn between a crossing point E1 where an orthogonal plane of the top plane 11A of the diaphragm 11 meets the top end of the side plane 71-2A of the penetrating part 71-2 and a crossing point E2 where the orthogonal plane of the top surface 11A of the diaphragm 11 meets the bottom of the side plane 71-2A of the penetrating part 71-2.

In this manner, forming the penetrating part 71-2 to have a line E being greater than the thickness M4 of the impurity doped insulating film 61 by a factor of a square root of two, the angles formed between the side planes 71-1A, 71-2A of the penetrating parts 71, 71-2 and the bottom 61B of the impurity doped insulating film 61 can be equal or less than 45 degrees, in which the line E is drawn between a crossing point E1 where an orthogonal plane of the top plane 11A of the diaphragm 11 meets the top end of the side plane 71-2A of the penetrating part 71-2 and a crossing point E2 where the orthogonal plane of the top surface 11A of the diaphragm 11 meets the bottom of the side plane 71-2A of the penetrating part 71-2. As a result, a sufficient thickness of the metallic film (base material of the wiring patterns 21 through 24) can be formed for the penetrating part 71-1 and 71-2, so that the wiring patterns 21, 23 formed for the side planes 71-1A, 71-2A of the penetrating part 71-1, 71-2 can be prevented from forming discontinuities.

Referring to FIG. 31, FIG. 32, and FIG. 37, the penetrating parts 72-1, 72-2 are formed to penetrate part of the impurity doped insulating film 61 provided on the first resistor 15. The penetrating parts 72-1, 72-2 are formed to expose parts of the top surface of the first resistor 15. The penetrating parts 72-1, 72-2 have shapes which become wider from the bottom of the penetrating parts 72-1, 72-2 toward the top ends of the penetrating parts 72-1, 72-2.

The penetrating part 72-1 includes the side plane 72-1A formed by doping impurity into the insulating film and the side plane 72-1B formed as part of the side plane 72-1A where the insulating film is undoped by the impurity. At the side plane 72-1A and the bottom of the penetrating part 72-1, the wiring pattern 22 is provided being extended toward the A direction. The side plane 72-2A of the penetrating part 72-2 has a similar shape to the side plane 32-1A of the penetrating part 32-1 described in the first embodiment. The penetrating part 71-2 is formed to have a line F being greater than the thickness M4 of the impurity doped insulating film 61 by a factor of a square root of two, in which the line F is drawn between a crossing point F1 where an orthogonal plane of the top plane 11A of the diaphragm 11 meets the top end of the side plane 72-1A of the penetrating part 72-1 and a crossing point F2 where the orthogonal plane of the top surface 11A of the diaphragm 11 meets the bottom of the side plane 72-1A of the penetrating part 72-1.

The penetrating part 72-2 includes the side plane 72-2A formed by doping an impurity into the insulating film and the side plane 72-2B formed as part of the side plane 72-2A where the insulating film is undoped by the impurity. At the side plane 72-2A and the bottom of the penetrating part 72-2, the wiring pattern 24 is provided being extended toward the A direction. The side plane 72-2A of the penetrating part 72-2 has a similar shape to the side plane 32-2A of the penetrating part 32-2 described in the first embodiment. The penetrating part 72-2 is formed to have a line F being greater than the thickness M4 of the impurity doped insulating film 61 by a factor of a square root of two, in which the line F is drawn between a crossing point F1 where an orthogonal plane of the top plane 11A of the diaphragm 11 meets the top end of the side plane 72-2A of the penetrating part 72-2 and a crossing point F2 where the orthogonal plane of the top surface 11A of the diaphragm 11 meets the bottom of the side plane 72-2A of the penetrating part 72-2.

In this manner, forming the penetrating part 72-1 to have a line F being greater than the thickness M4 of the impurity doped insulating film 61 by a factor of a square root of two, the angles formed between the side planes 72-1A, 72-2A of the penetrating parts 72-1, 72-2 and the bottom 61B of the impurity doped insulating film 61 can be equal or less than 45 degrees, in which the line F is drawn between a crossing point F1 where an orthogonal plane of the top plane 11A of the diaphragm 11 meets the top end of the side plane 72-1A of the penetrating part 72-1 and a crossing point F2 where the orthogonal plane of the top surface 11A of the diaphragm 11 meets the bottom of the side plane 72-2A of the penetrating part 72-2. As a result, a sufficient thickness of the metallic film (base material of the wiring patterns 21 through 24) can be formed for the penetrating part 72-1 and 72-2, so that the wiring patterns 21, 23 formed for the side planes 72-1A, 72-2A of the penetrating part 72-1, 72-2 can be prevented from forming discontinuities.

Referring to FIG. 31, FIG. 32, and FIG. 37, the penetrating parts 73-1, 73-2 are formed to penetrate part of the impurity doped insulating film 61 provided on the first resistor 16. The penetrating parts 73-1, 73-2 are formed to expose parts of the top surface of the first resistor 16. The penetrating parts 73-1, 73-2 have shapes which become wider from the bottom of the penetrating parts 73-1, 73-2 toward the top ends of the penetrating parts 73-1, 73-2.

The penetrating part 73-1 includes the side plane 73-1A formed by doping impurity into the insulating film and the side plane 73-1B formed as part of the side plane 73-1A where the insulating film is undoped by the impurity. At the side plane 73-1A and the bottom of the penetrating part 73-1, the wiring pattern 21 is provided being extended toward the B direction. The side plane 73-1A of the penetrating part 73-1 has a similar shape to the side plane 33-1A of the penetrating part 33-1 described in the first embodiment. The penetrating part 73-1 is formed to have a line H being greater than the thickness M4 of the impurity doped insulating film 61 by a factor of a square root of two, in which the line H is drawn between a crossing point H1 where an orthogonal plane of the top plane 11A of the diaphragm 11 meets the top end of the side plane 73-1A of the penetrating part 73-1 and a crossing point H2 where the orthogonal plane of the top surface 11A of the diaphragm 11 meets the bottom of the side plane 73-1A of the penetrating part 73-1.

The penetrating part 73-2 includes the side plane 73-2A formed by doping impurity into the insulating film and the side plane 73-2B formed as part of the side plane 73-2A where the insulating film is undoped by the impurity. At the side plane 73-2A and the bottom of the penetrating part 73-2, the wiring pattern 22 is provided being extended toward the B direction. The side plane 73-2A of the penetrating part 73-2 has a similar shape to the side plane 33-2A of the penetrating part 33-2 described in the first embodiment. The penetrating part 73-2 is formed to have a line H being greater than the thickness M4 of the impurity doped insulating film 61 by a factor of a square root of two, in which the line H is drawn between a crossing point H1 where an orthogonal plane of the top plane 11A of the diaphragm 11 meets the top end of the side plane 73-2A of the penetrating part 73-2 and a crossing point H2 where the orthogonal plane of the top surface 11A of the diaphragm 11 meets the bottom of the side plane 73-2A of the penetrating part 73-2.

In this manner, the penetrating part 73-1 is formed to have a line H being greater than the thickness M4 of the impurity doped insulating film 61 by a factor of a square root of two, in which the line H is drawn between a crossing point H1 where an orthogonal plane of the top plane 11A of the diaphragm 11 meets the top end of the side plane 73-1A of the penetrating part 73-1 and a crossing point H2 where the orthogonal plane of the top surface 11A of the diaphragm 11 meets the bottom of the side plane 73-1A of the penetrating part 73-1. As a result, a sufficient thickness of the metallic film (base material of the wiring patterns 21 through 24) can be formed for the penetrating part 73-1 and 73-2, so that the wiring patterns 21, 22 formed for the side planes 73-1A, 73-2A of the penetrating part 73-1, 73-2 can be prevented from forming discontinuities.

Referring to FIG. 31, FIG. 32, and FIG. 37, the penetrating parts 74-1, 74-2 are formed to penetrate part of the impurity doped insulating film 61 provided on the first resistor 15. The penetrating parts 74-1, 74-2 are formed to expose parts of the top surface of the first resistor 17. The penetrating parts 74-1, 74-2 have shapes which become wider from the bottom of the penetrating parts 74-1, 74-2 toward the top ends of the penetrating parts 74-1, 74-2.

The penetrating part 74-1 includes the side plane 74-1A formed by doping impurity into the insulating film and the side plane 74-1B formed as part of the side plane 74-1A where the insulating film is undoped by the impurity. At the side plane 74-1A and the bottom of the penetrating part 74-1, the wiring pattern 24 is provided being extended toward the A direction. The side plane 74-2A of the penetrating part 74-2 has a similar shape to the side plane 34-1A of the penetrating part 34-1 described in the first embodiment. The penetrating part 74-1 is formed to have a line G being greater than the thickness M4 of the impurity doped insulating film 61 by a factor of a square root of two, in which the line F is drawn between a crossing point G1 where an orthogonal plane of the top plane 11A of the diaphragm 11 meets the top end of the side plane 74-1A of the penetrating part 74-1 and a crossing point G2 where the orthogonal plane of the top surface 11A of the diaphragm 11 meets the bottom of the side plane 74-1A of the penetrating part 74-1.

The penetrating part 74-2 includes the side plane 74-2A formed by doping impurity into the insulating film and the side plane 74-2B formed as part of the side plane 74-2A where the insulating film is undoped by the impurity. At the side plane 74-2A and the bottom of the penetrating part 74-2, the wiring pattern 23 is provided being extended toward the A direction. The side plane 74-2A of the penetrating part 74-2 has a similar shape to the side plane 34-2A of the penetrating part 34-2 described in the first embodiment. The penetrating part 74-2 is formed to have a line G being greater than the thickness M4 of the impurity doped insulating film 61 by a factor of a square root of two, in which the line G is drawn between a crossing point G1 where an orthogonal plane of the top plane 11A of the diaphragm 11 meets the top end of the side plane 74-2A of the penetrating part 74-2 and a crossing point G2 where the orthogonal plane of the top surface 11A of the diaphragm 11 meets the bottom of the side plane 74-2A of the penetrating part 74-2.

In this manner, the penetrating part 74-1 is formed to have a line C being greater than the thickness M4 of the impurity doped insulating film 61 by a factor of a square root of two, in which the line G is drawn between a crossing point G1 where an orthogonal plane of the top plane 11A of the diaphragm 11 meets the top end of the side plane 74-1A of the penetrating part 74-1 and a crossing point G2 where the orthogonal plane of the top surface 11A of the diaphragm 11 meets the bottom of the side plane 74-1A of the penetrating part 74-1. As a result, the angles formed between the side planes 72-1A, 72-2A of the penetrating parts 72-1, 72-2 and the bottom 61S of the impurity doped insulating film 61 can be equal or less than 45 degrees, and a sufficient thickness of the metallic film (base material of the wiring patterns 21 through 24) can be formed for the penetrating part 74-1 and 74-2, so that the wiring patterns 21, 22 formed for the side planes 74-1A, 74-2A of the penetrating part 74-1, 74-2 can be prevented from forming discontinuities.

According to the semiconductor pressure sensor of this embodiment of the present invention, by making the lines E, F, G, H to be greater than the thickness M4 of the impurity doped insulating film 61 by a factor of a square root of two, in which the lines E, F, G, H are drawn between the crossing points $E_1$, $F_1$, $G_1$, $H_1$ where the orthogonal planes of the top plane 11A of the diaphragm 11 meet with the side planes 71-1A, 71-2A, 72-1A, 72-2A, 73-1A, 73-2A, 74-1A, 74-2A of the penetrating parts 71-1, 71-2, 72-1, 72-2, 73-1, 73-2, 74-1, 74-2 and the crossing points $E_2$, $F_2$, $G_2$, $H_2$ where the orthogonal planes of the top plane 11A of the diaphragm 11 meet with the bottoms of the side planes 71-1A, 712A, 72-1A, 72-2A, 73-1A, 73-2A, 74-1A, 74-2A of the penetrating parts 71-1, 71-2, 72-1, 72-2, 73-1, 73-2, 74-1, 74-2. As a result, the angles formed between the side planes 71-1A, 71-2A, 72-1A, 72-2A, 73-1A, 73-2A, 74-1A, 74-2A of the penetrating parts 71-1, 71-2, 72-1, 72-2, 73-1, 73-2, 74-1, 74-2 and the bottom 61B of the impurity doped insulating film 61 become smaller than 45 degrees. Thereby, a sufficiently thick metal film (base material of the wiring patterns 21 through 24) can be formed at the side planes 71-1A, 71-2A, 72-1A, 72-2A, 73-1A, 73-2A, 74-1A, 74-2A of the penetrating parts 71-1, 71-2, 72-1, 72-2, 73-1, 73-2, 74-1, 74-2, so that the wiring patterns 21 through 24 formed at the side planes 71-1A, 71-2A, 72-1A, 72-2A, 73-1A, 73-2A, 74-1A, 74-2A of the penetrating parts 71-1, 71-2, 72-1, 72-2, 73-1, 73-2, 74-1, 74-2 can be prevented from forming discontinuities.

In this manner, each of angles formed between the bottom 61B of the impurity doped insulating film 61 and only part of the individual side planes 71-1A, 71-2A, 72-1A, 72-2A, 73-1A, 73-2A, 74-1A, 74-2A of the penetrating parts 71-1, 71-2, 72-1, 72-2, 73-1, 73-2, 74-1, 74-2 corresponding to the drawing direction of the wiring patterns 21 through 24 may be formed to be equal or less than 45 degrees.

FIG. 38 through FIG. 44 show the manufacturing process of the semiconductor pressure sensor of the second embodiment of this invention. In FIG. 38 through FIG. 44, for the identical parts of the semiconductor pressure sensor 60 of the third embodiment, the same reference symbols are used. Further, in FIG. 38 through FIG. 44, the second resistors 16, 17, the wiring patterns 23, 24, the penetrating parts 71-1, 72-2, 73-1, 73-2, 74-1, 74-2, the crossing points G1, G2, H1, H2, and the lines G, H shown in FIG. 32 through FIG. 36 described above are omitted for convenience of description.

The manufacturing process of the semiconductor pressure sensor 60 of the third embodiment is described by referring to FIG. 38 through FIG. 44. First, by processing the process step shown in FIG. 12 and FIG. 13 of the first embodiment, the first and second resistors 14 through 17 and the insulating film 39 are formed on the semiconductor 37.

Figure 38:
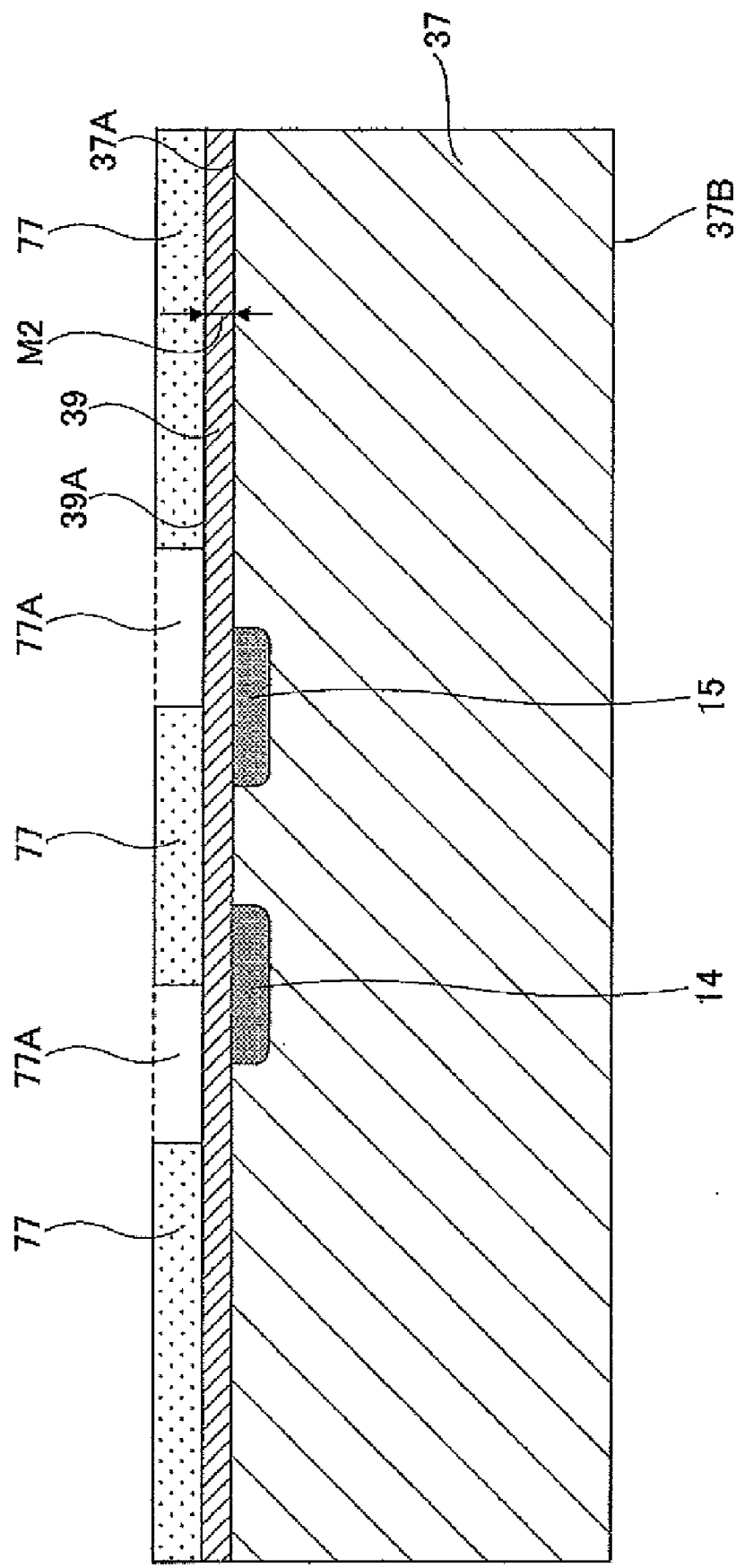
FIG. 38 is an illustration (example 1) showing a fabrication process of the semiconductor pressure sensor related to the third embodiment of the present invention.

Next, a process shown in FIG. 38, a resist film 77 having openings 77A is formed on the insulating film 39 provided on the structure of FIG. 13. The openings 77A are formed to expose the top surface 39A of the insulating film 39 corresponding to each part of forming regions of the side planes 71-1A, 71-2A, 72-1A, 72-2A, 73-1A, 73-2A, 74-1A, 74-2A of the penetrating parts 71-1, 71-2, 72-1, 72-2, 73-1, 73-2, 74-1, 74-2.

Figure 34:
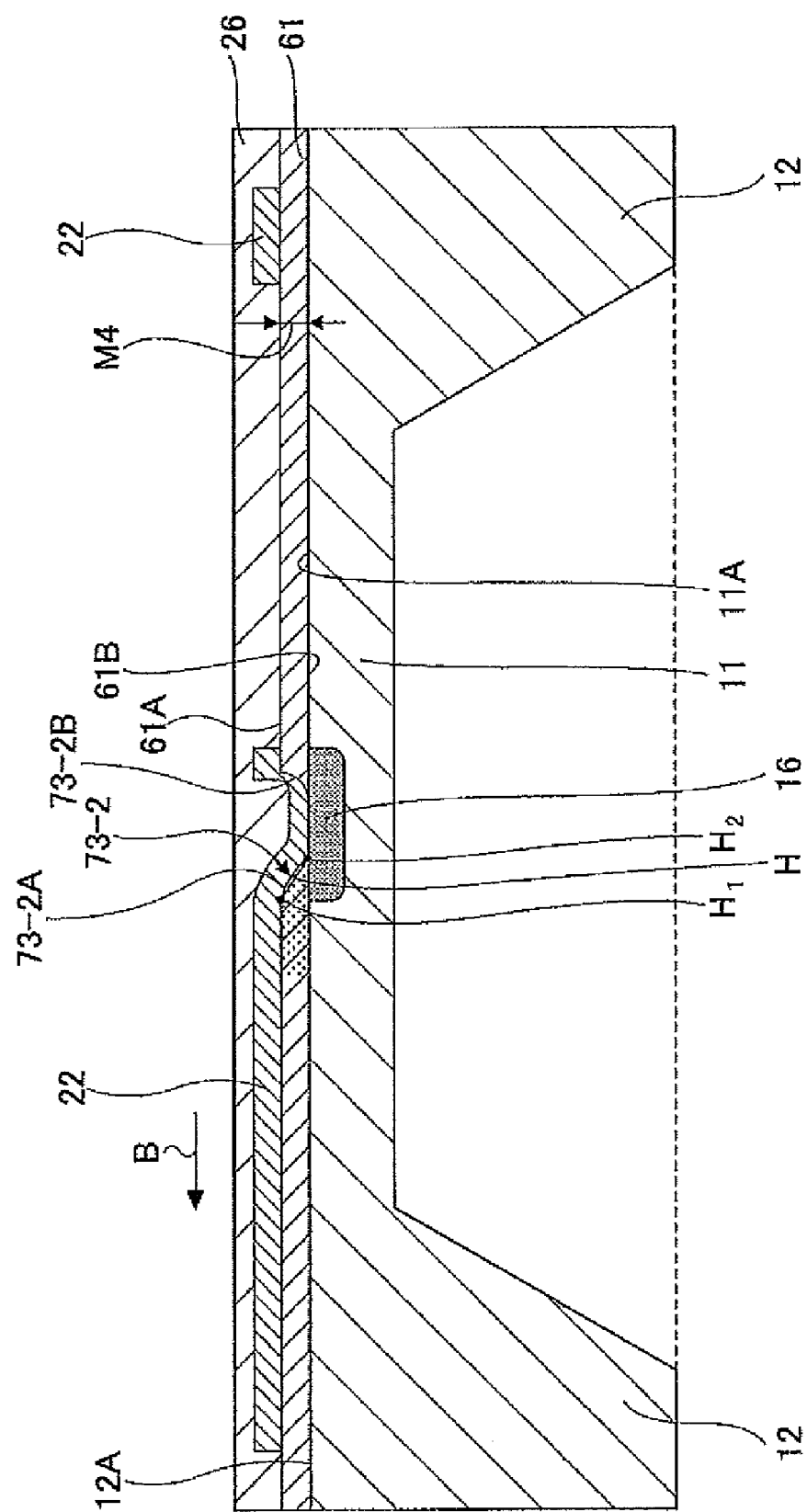
FIG. 34 is an illustration showing a cross section (example 4) of a semiconductor pressure sensor related to the third embodiment of the present invention.
Figure 35:
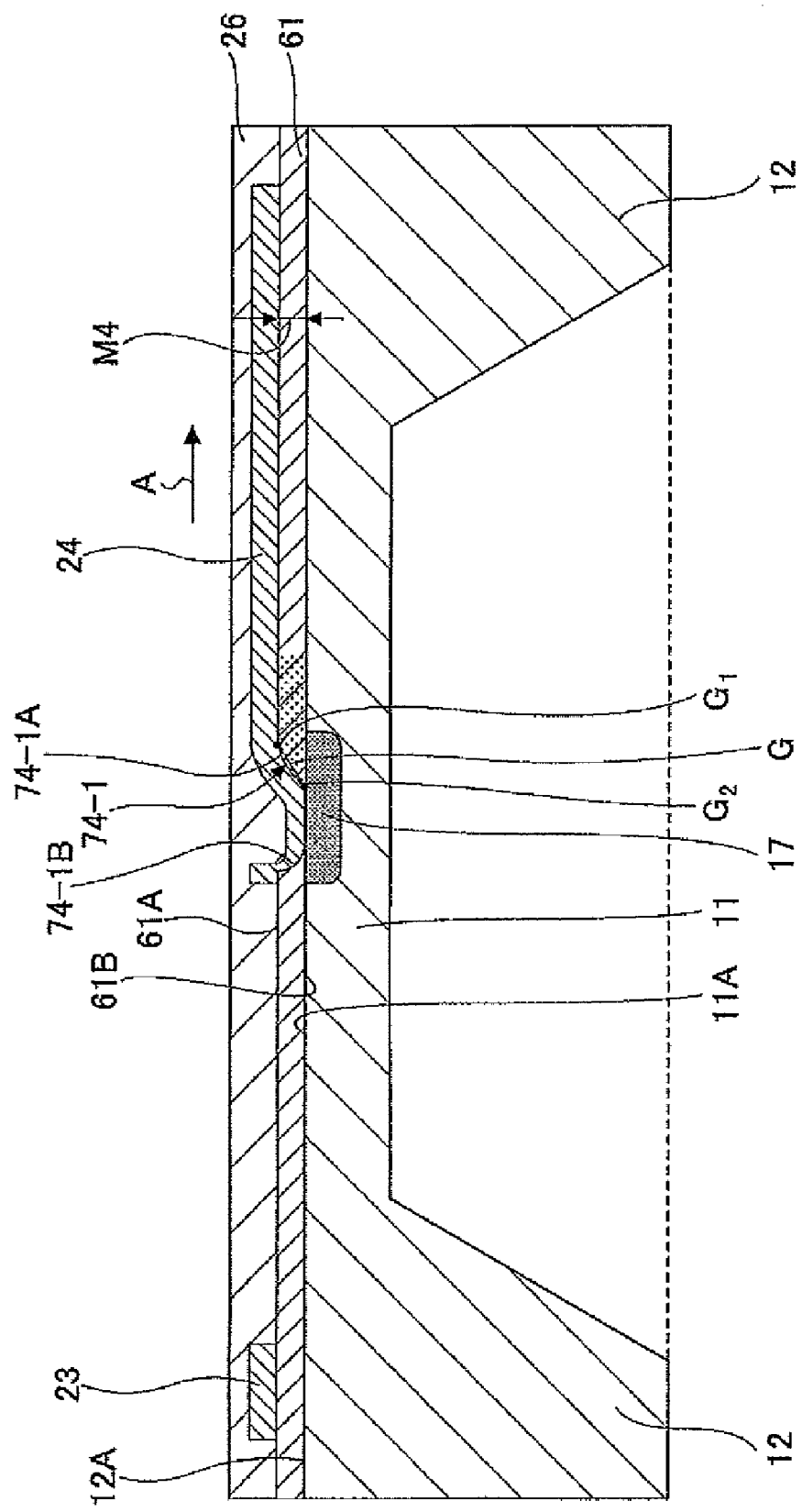
FIG. 35 is an illustration showing a cross section (example 5) of a semiconductor pressure sensor related to the third embodiment of the present invention.
Figure 36:
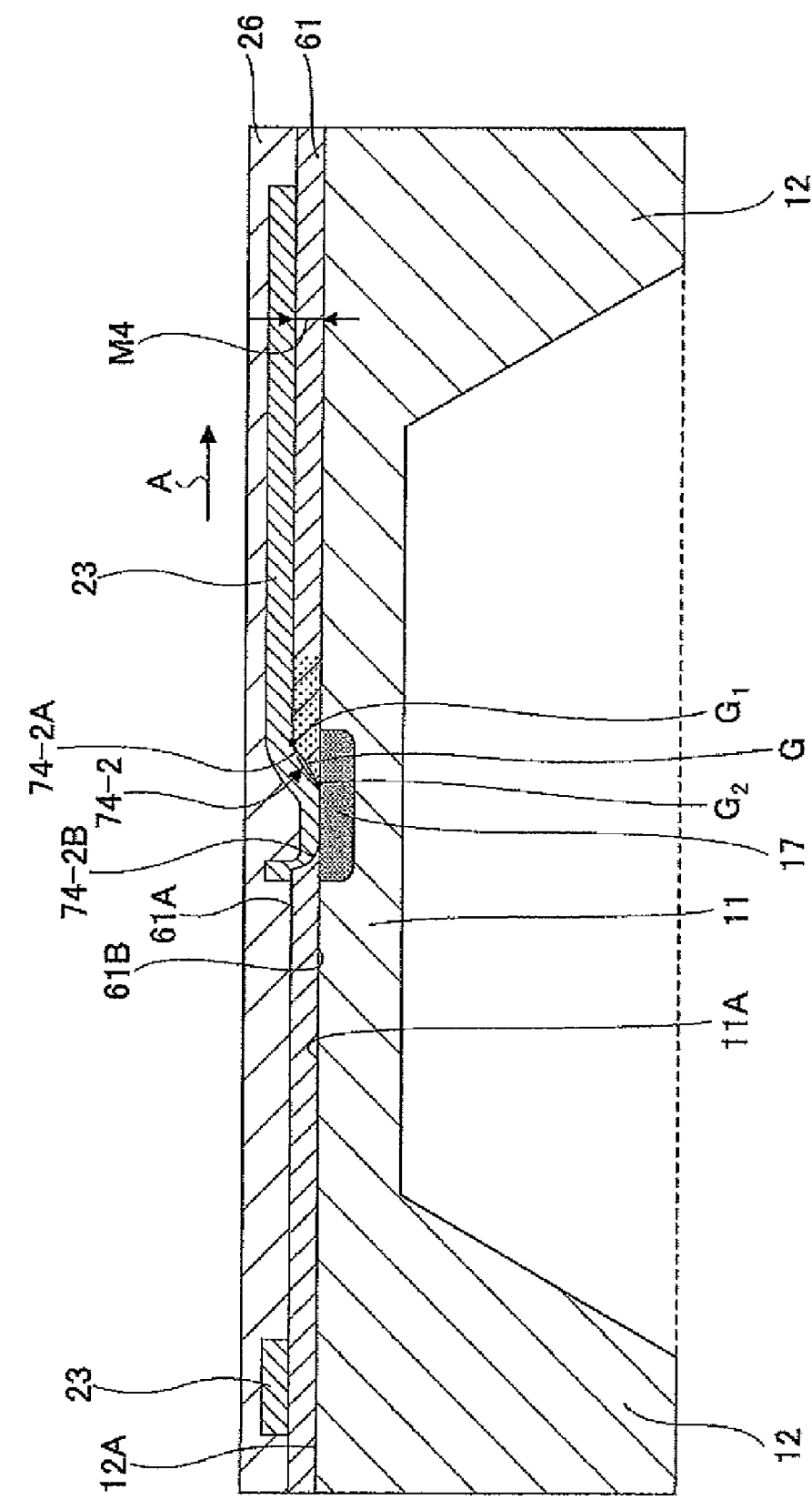
FIG. 36 is an illustration showing a cross section (example 6) of a semiconductor pressure sensor related to the third embodiment of the present invention.

Next, at the process step of FIG. 39, the impurity doped insulating film 61 is formed, in which impurities are doped into the insulating film 39 provided on the structure of FIG. 34 from the top surface 39A of the insulating film 39 to part of the insulating film with entire film thickness below the openings 77A through the resist film 77 (impurity doped insulating film formation process). As impurity dopants to be doped into the insulating film 39, for example, P, B, As or the like may be used. For impurity doping equipment, for example, ion implantation equipment may be used. When P atoms are used as the impurity, an acceleration voltage of the ion implantation equipment may be approximately 80 kev, for example. Further, the average impurity dosage of the F as impurities may be approximately $1.0 \times 10^{15}$ atoms/cm$^2$, for example. The thickness M4 of the impurity doped insulating film 61 may be approximately 1 μm, for example.

By this manner, impurities are doped into parts the insulating film 39 corresponding to the side planes 71-1A, 71-2A, 72-1A, 72-2A, 73-1A, 73-2A, 74-1A, 74-2A of the penetrating parts 71-1, 71-2, 72-1, 72-2, 73-1, 73-2, 74-1, 74-2, and then the impurity doped insulating film 61 are formed, so that the impurity concentration at the top surface 61A side of the impurity doped insulating film 61 is high and becomes lower toward the bottom 61 side of the impurity doped insulating film 61. As a result, the impurity doped insulating film 61 can have the etching rate at a part of the top surface 61A side of the impurity doped insulating film 61 being greater than the etching rate at a part near the bottom 61B side of the impurity doped insulating film 61.

Figure 39:
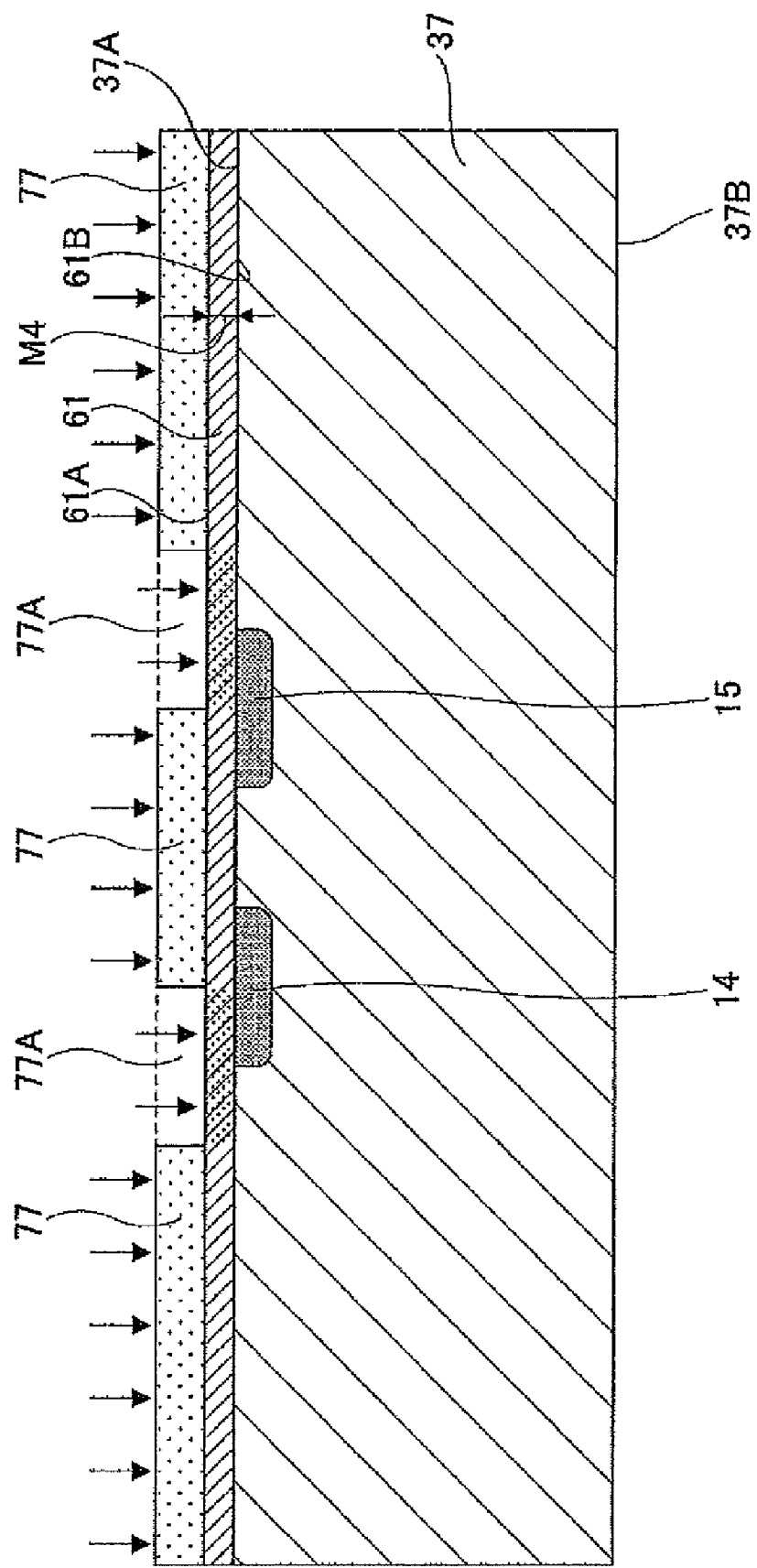
FIG. 39 is an illustration (example 2) showing a fabrication process of the semiconductor pressure sensor related to the third embodiment of the present invention.
Figure 40:
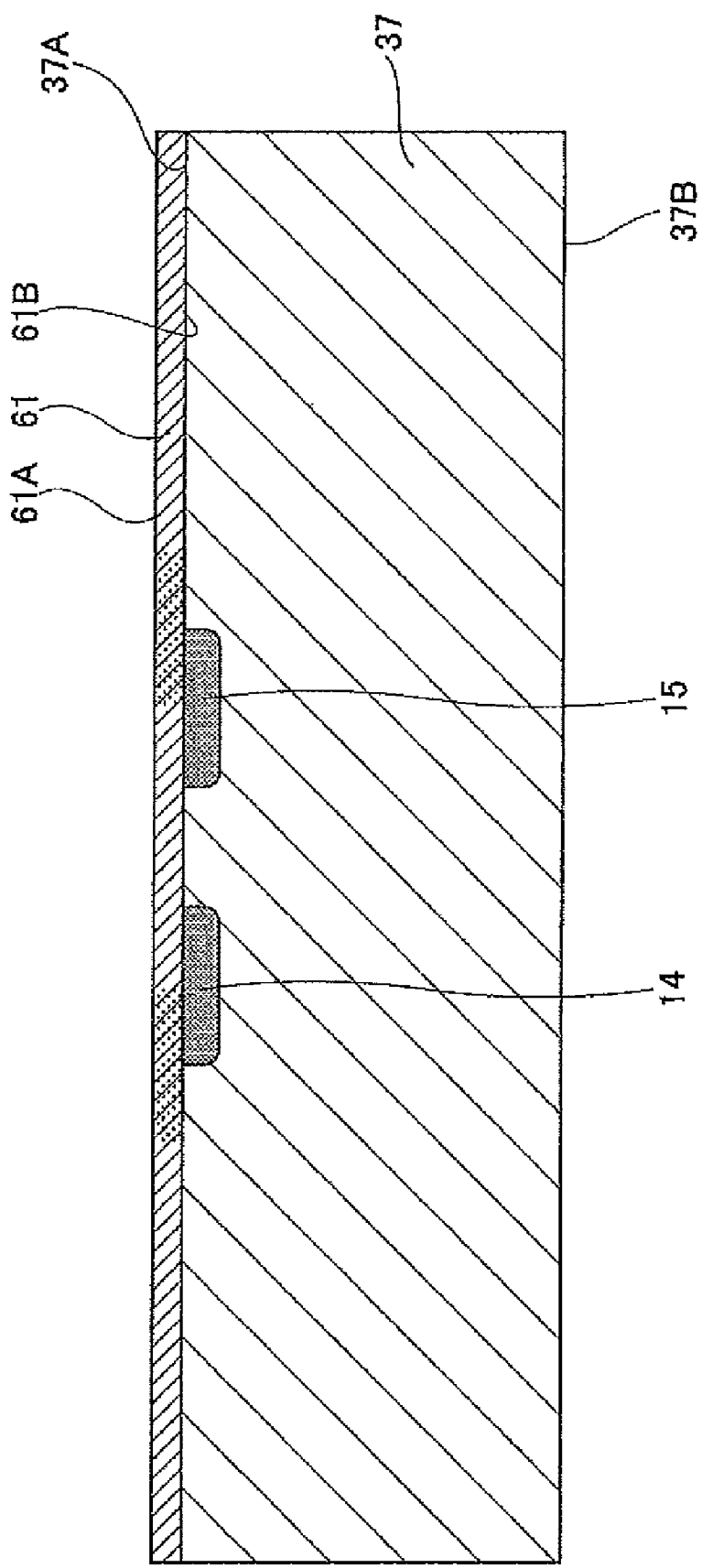
FIG. 40 is an illustration (example 3) showing a fabrication process of the semiconductor pressure sensor related to the third embodiment of the present invention.
Figure 41:
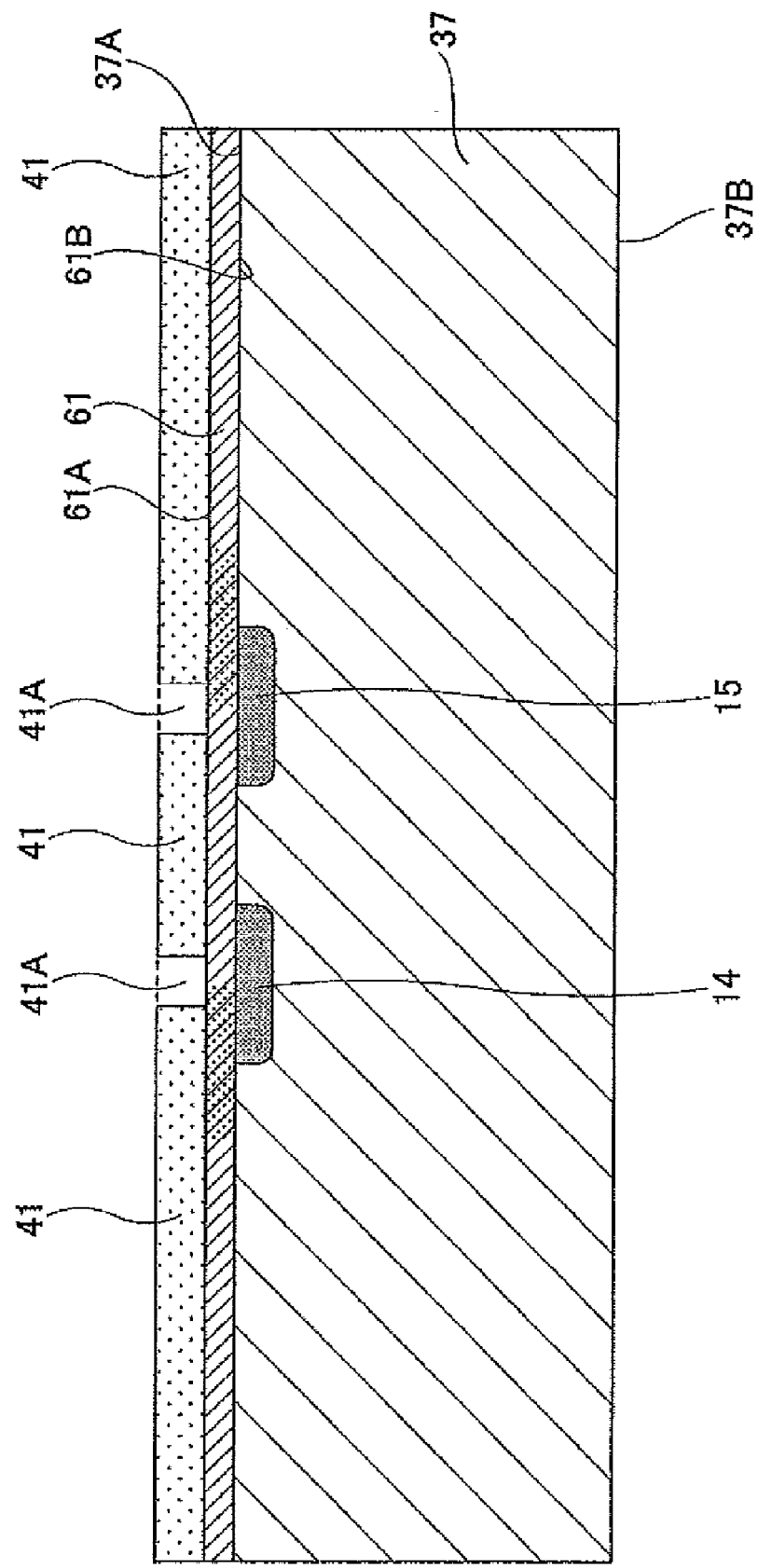
FIG. 41 is an illustration (example 4) showing a fabrication process of the semiconductor pressure sensor related to the third embodiment of the present invention.

Next, in a process shown in FIG. 40, the resist film 77 formed on the structure of FIG. 39 is removed. In a process shown in FIG. 41, a resist film 41 having plural openings 41A is formed on the impurity doped insulating film 61 (resist film forming process). The openings 41A are formed to expose parts of the top surface 61A of the impurity doped insulating film 61 corresponding to the individual penetrating parts 71-1, 71-2, 72-1, 72-2, 73-1, 73-2, 74-1, 74-2 are formed. The resist film 41 is used for a mask to form the penetrating parts 71-1, 71-2, 72-1, 72-2, 73-1, 73-2, 74-1, 74-2 by etching the impurity doped insulating film 61 using wet-etching process.

Figure 42:
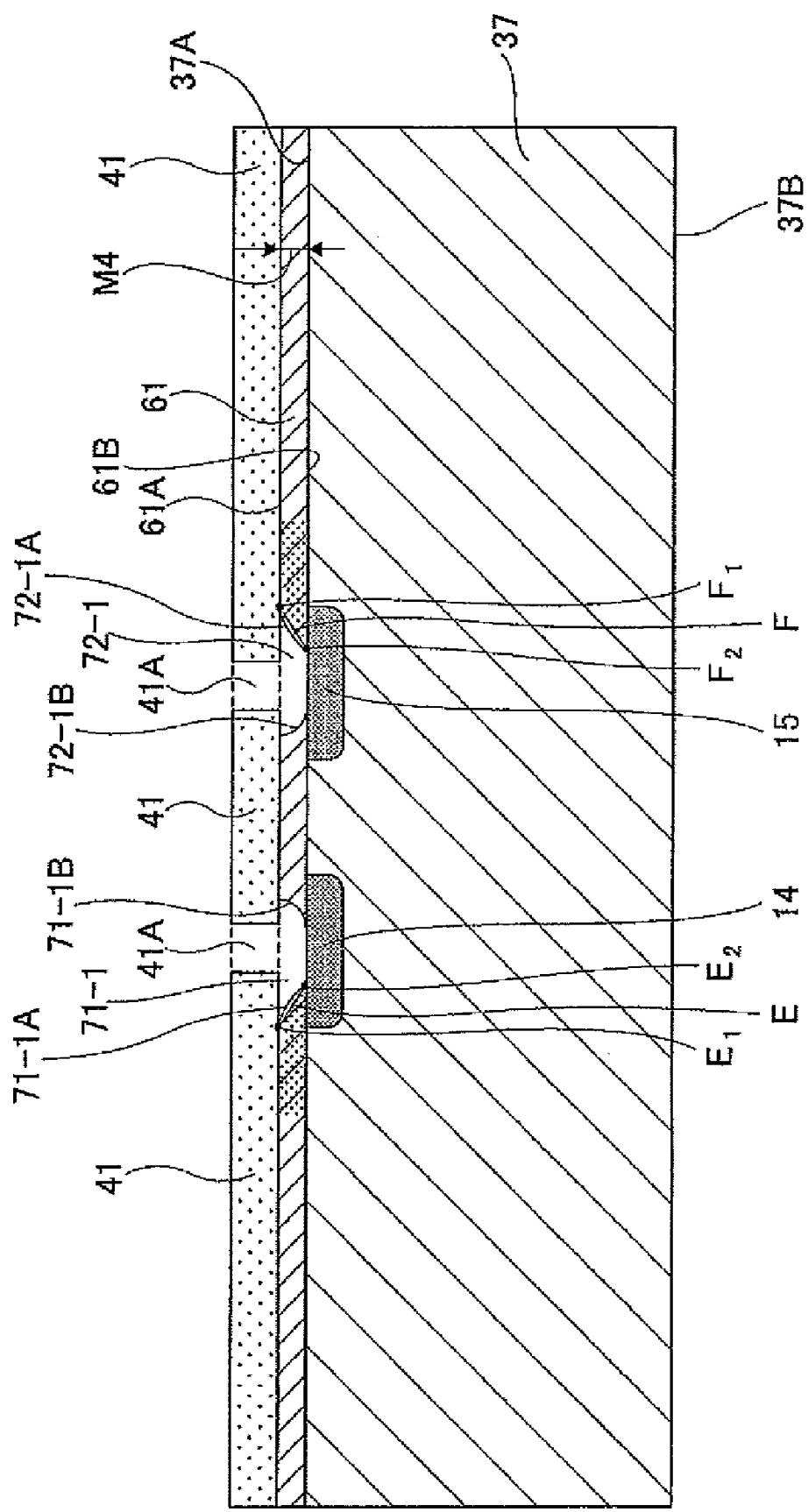
FIG. 42 is an illustration (example 5) showing a fabrication process of the semiconductor pressure sensor related to the third embodiment of the present invention.

In a process of FIG. 42, the impurity doped insulating film 61 is etched by wet-etching process using the resist film 41 as the mask until the first and second resistor 14 through 17 are exposed, so that the penetrating parts 71-1, 71-2, 72-1, 72-2, 73-1, 73-2, 74-1, 74-2 are formed (penetrating parts formation process).

In this manner, the impurity doped insulating film 61 having doped regions which correspond to parts forming the side planes 71-1A, 71-2A, 72-1A, 72-2A, 73-1A, 73-2A, 74-1A, 74-2A of the penetrating parts 71-1, 71-2, 72-1, 72-2, 73-1, 73-2, 74-1, 74-2 is etched by wet-etching process, so that the penetrating parts 71-1, 71-2, 72-1, 72-2, 73-1, 73-2, 74-1, 74-2 are formed. As a result, the impurity doped insulating film 61 can have the etching rate at a part of the top surface 61A side of the impurity doped insulating film 61 being greater than the etching rate at a part near the bottom 61B side of the impurity doped insulating film 61, thus the side planes 71-1A, 71-2A, 72-1A, 72-2A, 73-1A, 73-2A, 74-1A, 74-2A of the penetrating parts 71-1, 71-2, 72-1, 72-2, 73-1, 73-2, 74-1, 74-2 can be formed to have gentle slopes.

Further, in the penetrating parts formation process, the side planes 71-1A, 71-2A, 72-1A, 72-2A, 73-1A, 73-2A, 74-1A, 74-2A of the penetrating parts 71-1, 71-2, 72-1, 72-2, 73-1, 73-2, 74-1, 74-2 are formed to have the line lengths of E, F, G, H being greater than the thickness M4 of the impurity doped insulating film 61 by a factor of a square root of two, in which the lines E, F, G, H are drawn between the crossing points $E_1$, $F_1$, $G_1$, $H_1$ where the orthogonal planes of the top plane 11A of the diaphragm 11 meet with the side planes 71-1A, 71-2A, 72-1A, 72-2A, 73-1A, 73-2A, 74-1A, 74-2A of the penetrating parts 71-1, 71-2, 72-1, 72-2, 73-1, 73-2, 74-1, 74-2 and the crossing points $E_2$, $F_2$, $G_2$, $H_2$ where the orthogonal planes of the top plane 11A of the diaphragm 11 meet with the bottoms of the side planes 71-1A, 71-2A, 72-1A, 72-2A, 73-1A, 73-2A, 74-1A, 74-2A of the penetrating parts 71-1, 71-2, 72-1, 72-2, 73-1, 73-2, 74-1, 74-2.

Like this manner, forming the side planes 71-1A, 71-2A, 72-1A, 72-2A, 73-1A, 73-2A, 74-1A, 74-2A of the penetrating parts 71-1, 71-2, 72-1, 72-2, 73-1, 73-2, 74-1, 74-2 to have the line lengths of E, F, G, H being greater than the thickness M4 of the impurity doped insulating film 61 by a factor of a square root of two, the angles formed between the side planes 71-1A, 71-2A, 72-1A, 72-2A, 73-1A, 73-2A, 74-1A, 74-2A of the penetrating parts 71-1, 71-2, 72-1, 72-2, 73-1, 73-2, 74-1, 74-2 and the bottom 61B of the impurity doped insulating film 61 can be formed being smaller than 45 degrees, in which the lines E, F, G, H are drawn between the crossing points $E_1$, $F_1$, $G_1$, $H_1$ where the orthogonal planes of the top plane 11A of the diaphragm 11 meet with the side planes 71-1A, 71-2A, 72-1A, 72-2A, 73-1A, 73-2A, 74-1A, 74-2A of the penetrating parts 71-1, 71-2, 72-1, 72-2, 73-1, 73-2, 74-1, 74-2 and the crossing points $E_2$, $F_2$, $G_2$, $H_2$ where the orthogonal planes of the top plane 11A of the diaphragm 11 meet with the bottoms of the side planes 71-1A, 71-2A, 72-1A, 72-2A, 73-1A, 73-2A, 74-1A, 74-2A of the penetrating parts 71-1, 71-2, 72-1, 72-2, 73-1, 73-2, 74-1, 74-2.

Figure 43:
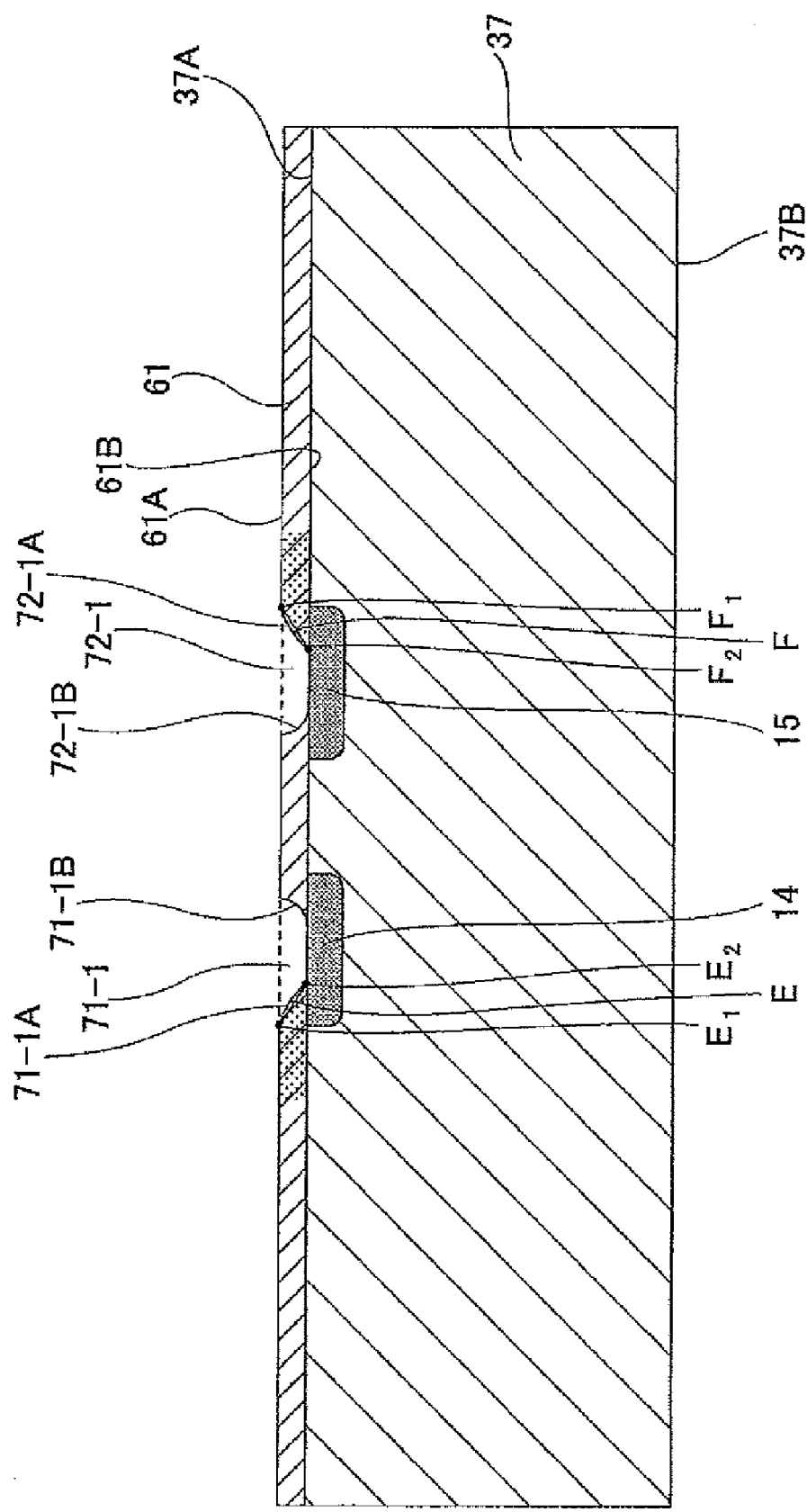
FIG. 43 is an illustration (example 6) showing a fabrication process of the semiconductor pressure sensor related to the third embodiment of the present invention.
Figure 44:
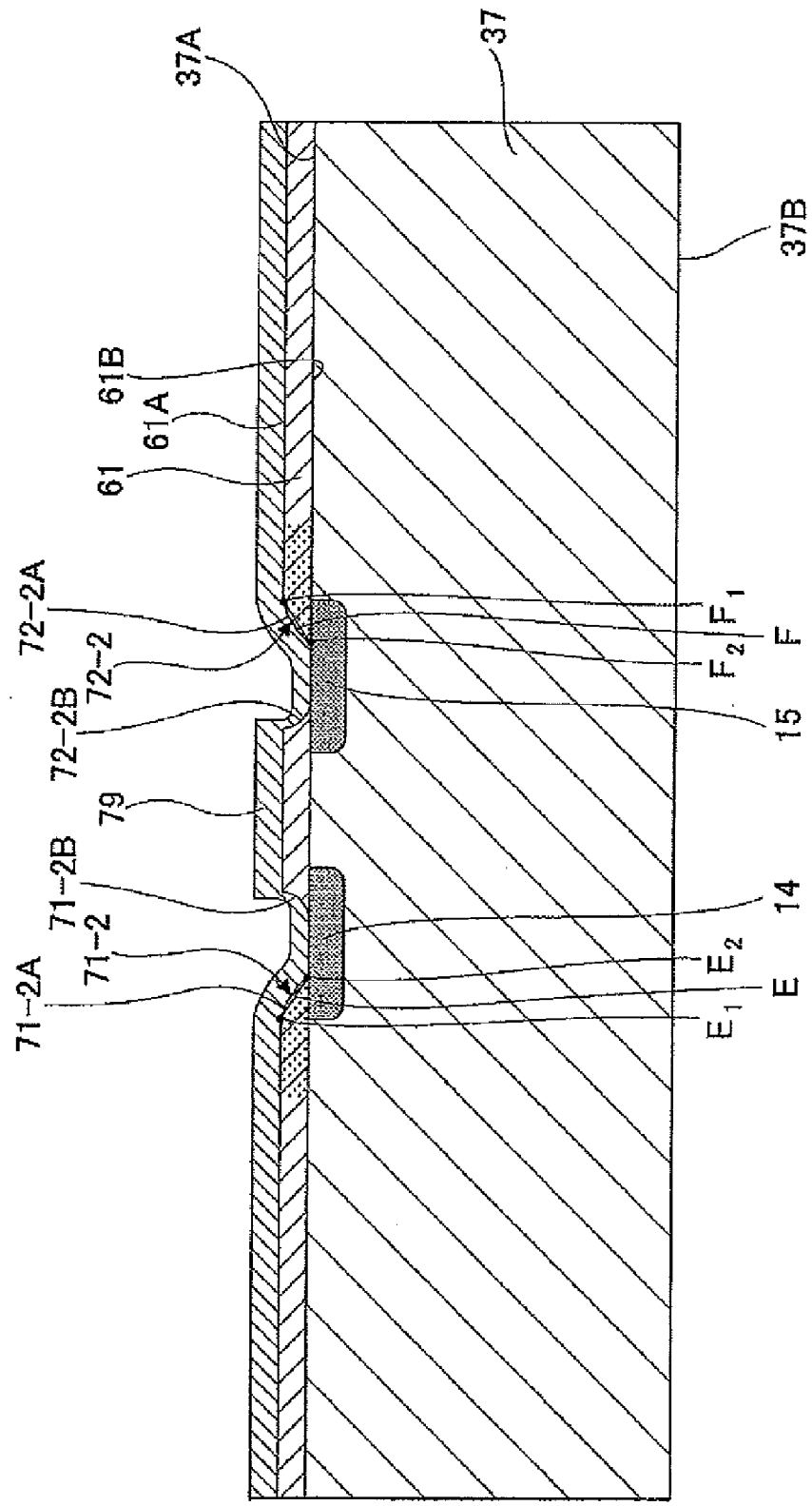
FIG. 44 is an illustration (example 7) showing a fabrication process of the semiconductor pressure sensor related to the third embodiment of the present invention.

Next in the process shown in FIG. 43, the resist film 41 shown in FIG. 42 is removed. In the process shown in FIG. 44, the metallic film 79 is formed to cover the structure of FIG. 39 (metallic film formation process). The metallic film 79 is patterned, and the wiring patterns 21 through 24 are formed. For the metallic film 79, for example, an Al film may be used. When an Al film is used for the metallic film 79, the metallic film 79 may be formed by a sputtering method, for example. For using Al film as the metallic film 79, the thickness of the metallic film 79 on the top surface 61A of the impurity doped insulating film 61 may be approximately 0.5 μm, for example.

Like this manner, the angle formed between the side planes 71-1A, 71-2A, 72-1A, 72-2A, 73-1A, 73-2A, 74-1A, 74-2A of the penetrating parts 71-1, 71-2, 72-1, 72-2, 73-1, 73-2, 74-1, 74-22 and the bottom 61B of the impurity doped insulating film 61 is equal or less than 45 degrees, and the metallic film 79 is formed for the side planes 71-1A, 71-2A, 72-1A, 72-2A, 73-1A, 73-2A, 74-1A, 74-2A of the penetrating parts 71-1, 71-2, 72-1, 72-2, 73-1, 73-2, 74-1, 74-2, and so that a sufficiently thick metallic film 79 (to be effective to prevent the wiring patterns 21 through 24 from forming discontinuities) can be formed for the side planes 71-1A, 71-2A, 72-1A, 72-2A, 73-1A, 73-2A, 74-1A, 74-2A of the penetrating parts 71-1, 71-2, 72-1, 72-2, 73-1, 73-2, 74-1, 74-2. Thereby, the wiring patterns 21 through 24 formed for the side planes 71-1A, 71-2A, 72-1A, 72-2A, 73-1A, 73-2A, 74-1A, 74-2A of the penetrating parts 71-1, 71-2, 72-1, 72-2, 73-1, 73-2, 74-1, 74-2 may be prevented from forming discontinuities.

Following this process, similar manufacturing processes shown in FIG. 19 through FIG. 21 described in the first embodiment are performed, and the wiring patterns 21 through 24, the protection film 26, the diaphragm 11, and the diaphragm support member 12 are formed, and then the semiconductor pressure sensor 60 is manufactured.

According to the semiconductor pressure sensor of this embodiment of the present invention, by making the lines E, F, G, H to be greater than the thickness M4 of the impurity doped insulating film 61 by a factor of a square root of two, in which the lines E, F, G, H are drawn between the crossing points $E_1$, $F_1$, $G_1$, $H_1$ where the orthogonal planes of the top plane 37A of the semiconductor substrate 37 meet with top ends of the side planes 71-1A, 71-2A, 72-1A, 72-2A, 73-1A, 73-2A, 74-1A, 74-2A of the penetrating parts 71-1, 71-2, 72-1, 72-2, 73-1, 73-2, 74-1, 74-2 and the crossing points $E_2$, $F_2$, $G_2$, $H_2$ where the orthogonal planes of the top plane 37A of the semiconductor substrate 37 meet with the bottoms of the side planes 71-1A, 71-2A, 72-1A, 72-2A, 73-1A, 73-2A, 74-1A, 74-2A of the penetrating parts 71-1, 71-2, 72-1, 72-2, 73-1, 73-2, 74-1, 74-2. As a result, the angles formed between the side planes 71-1A, 71-2A, 72-1A, 72-2A, 73-1A, 73-2A, 74-1A, 74-2A of the penetrating parts 71-1, 71-2, 72-1, 72-2, 73-1, 73-2, 74-1, 74-2 and the bottom 61E of the impurity doped insulating film 61 become smaller than 45 degrees. Thereby, a sufficiently thick metal film 79 (base material of the wiring patterns 21 through 24) can be formed at the side planes 71-1A, 71-2A, 72-1A, 72-2A, 73-1A, 73-2A, 74-1A, 74-2A of the penetrating parts 71-1, 71-2, 72-1, 72-2, 73-1, 73-2, 74-1, 74-2, so that the wiring patterns 21 through 24 formed at the side planes 71-1A, 71-2A, 72-1A, 72-2A, 73-1A, 73-2A, 74-1A, 74-2A of the penetrating parts 71-1, 71-2, 72-1, 72-2, 73-1, 73-2, 74-1, 74-2 can be prevented from forming discontinuities.

The preferred embodiments of the present invention are described above, however, the present invention is not limited to the specifically disclosed embodiments, and variations and modifications may be made without departing from the scope of the present invention. For example, for the semiconductor pressure sensors 10, 50, 60 of the first through third embodiments, one example is described that the penetrating parts 31-1, 31-2, 32-1, 32-2, 33-1, 33-2, 34-1, 34-2, 53-1, 53-2, 54-1, 54-2, 55-1, 55-2, 56-1, 56-2, 71-1, 71-2, 72-1, 72-2, 73-1, 73-2, 74-1, 74-2 are formed for the impurity doped insulating films 19, 51, 61 formed by impurity doping into the insulating film 39 however, the penetrating parts 31-1, 31-2, 32-1, 32-2, 33-1, 33-2, 34-1, 34-2, 53-1, 53-2, 54-1, 54-2, 55-1, 55-2, 56-1, 56-2, 71-1, 71-2, 72-1, 72-2, 73-1, 73-2, 74-1, 74-2 may be formed for the insulating film 39 with no impurity doping which have the same shapes as the case as the impurity doped insulating films 19, 51, 61. The present invention may be applied to a semiconductor pressure sensor and the semiconductor pressure sensor manufacturing method, in which the semiconductor pressure sensor includes a resistor formed on a diaphragm, an insulating film formed on the diaphragm and the resistor, a penetrating part exposing part of the top surface of the resistor, a wiring pattern formed to cover the part the top surface of the resistor exposed by the penetrating part through the top surface of the insulating film.

The present application is based on Japanese Priority Application No. 2007-219997 filed on Aug. 27, 2007, the entire contents of which are hereby incorporated herein by reference.

What is claimed is:

1. A semiconductor pressure sensor comprising:
   a diaphragm;
   a resistor provided on a top surface of the diaphragm;
   an insulating film formed on the diaphragm and the resistor having a penetrating part exposing a top surface of the resistor; and
   a wiring pattern formed from the top surface of the resistor exposed by the penetrating part to a top surface of the insulating film;
   wherein a distance between a first crossing part where a plane orthogonal to the top surface of the diaphragm meets a top end of a side plane of the penetrating part and a second crossing part where the plane orthogonal to the top surface of the diaphragm meets a bottom of the side plane of the penetrating part is equal or greater than a thickness of the insulating film by a factor of a square root of two.

2. A semiconductor pressure sensor comprising:
   a diaphragm;
   a resistor provided on a top surface of the diaphragm;
   an insulating film formed on the diaphragm and the resistor having a penetrating part exposing a top surface of the resistor; and
   a wiring pattern formed from the top surface of the resistor exposed by the penetrating part to a top surface of the insulating film;
   wherein the wiring pattern is formed on the top surface of the resistor and a part of the side plane of the penetrating part from which the wiring pattern extends in an extended direction, and a distance at the part of the side plane of the penetrating part between a first crossing part where a plane orthogonal to the top surface of the diaphragm meets a top end of the side plane of the penetrating part and a second crossing part where the plane orthogonal to the top surface of the diaphragm meets a bottom of the side plane of the penetrating part is equal or greater than a thickness of the insulating film by a factor of a square root of two.

3. The semiconductor pressure sensor as claimed in claim 1, wherein the insulating film includes an impurity and a concentration of the impurity is higher at a top side of the insulating film than the concentration at a bottom side of the insulating film.

4. The semiconductor pressure sensor as claimed in claim 1, wherein a protection film is formed to cover the top surface of the insulating film and the wiring pattern.

5. A semiconductor pressure sensor manufacturing method comprising the steps of:
   (a) providing a diaphragm and a resistor formed on a top of the diaphragm and a wiring pattern electrically connected to the resistor;
   (b) forming the resistor on a top side of a semiconductor substrate to be used for the diaphragm;
   (c) forming an insulating film to cover the resistor and the top of the semiconductor substrate;
   (d) doping an impurity into the insulating film from a top side of the insulating film to form an impurity doped insulating film formed of the insulating film and the impurity;
   (e) forming a resist film having an opening to expose a top surface of the impurity doped insulating film and the opening is positioned to correspond to a formation region of a penetrating part;
   (f) etching the impurity doped insulating film by a wet etching process using the resist film as a mask until the resistor is exposed to form the penetrating part;
   (g) forming a metallic film to cover a part of the impurity doped insulating film and the resistor exposed by the penetrating part and the top surface of the impurity doped insulating film, after removing the resist film; and
   (h) patterning the metallic film to form the wiring pattern.

6. The semiconductor pressure sensor manufacturing method as claimed in claim 5, wherein in the step of (f), a distance between a first crossing part where a plane orthogonal to the top surface of the diaphragm meets a top end of a side plane of the penetrating part and a second crossing part where the plane orthogonal to the top surface of the diaphragm meets a bottom of the side plane of the penetrating part is equal or greater than a thickness of the insulating film by a factor of a square root of two.

7. The semiconductor pressure sensor manufacturing method as claimed in claim 5, wherein in the step of (d), when the impurity is doped into the insulating film, the impurity is prevented from being doped into the semiconductor substrate.

8. The semiconductor pressure sensor manufacturing method as claimed in claim 5, wherein in the step of (d), the impurity is doped into the entire insulating film.

9. The semiconductor pressure sensor manufacturing method as claimed in claim 5, wherein in the step of (d), the wiring pattern is formed on the top surface of the resistor and a part of the side plane of the penetrating part from which the wiring pattern extends in an extended direction, and the impurity is doped into only the part of the side plane of the impurity doped insulating film.

* * * * *